(12) United States Patent
Miyama et al.

(10) Patent No.: US 6,808,766 B1
(45) Date of Patent: Oct. 26, 2004

(54) LIQUID CRYSTAL ALIGNMENT AGENT AND LIQUID CRYSTAL DEVICE USING THE LIQUID CRYSTAL ALIGNMENT AND METHOD FOR ALIGNMENT OF LIQUID CRYSTAL MOLECULES

(75) Inventors: Yukihiro Miyama, Funabashi (JP); Takayasu Nihira, Funabashi (JP); Hideyuki Endo, Funabashi (JP); Hiroyoshi Fukuro, Funabashi (JP); Yu Nagase, Sagamihara (JP); Eiich Akiyama, Yamato (JP); Nobukatsu Nemoto, Machida (JP)

(73) Assignees: Nissan Chemical Industries, Ltd., Tokyo (JP); Sagami Chemical Research Center, Sagamihara (JP)

( * ) Notice: Subject to any disclaimer, the term of this patent is extended or adjusted under 35 U.S.C. 154(b) by 0 days.

(21) Appl. No.: 09/763,294

(22) PCT Filed: Aug. 25, 1999

(86) PCT No.: PCT/JP99/04575

§ 371 (c)(1),
(2), (4) Date: Feb. 21, 2001

(87) PCT Pub. No.: WO00/13058

PCT Pub. Date: Mar. 9, 2000

(30) Foreign Application Priority Data

Aug. 26, 1998 (JP) .......................................... 10-240491

(51) Int. Cl.⁷ .............................................. C09K 19/00
(52) U.S. Cl. ....................... 428/1.25; 428/1.2; 428/1.26
(58) Field of Search .................... 428/1.1, 1.2, 1.25, 428/1.26, 1.27, 1.28, 1.3, 1.6; 349/123, 134, 135

(56) References Cited

U.S. PATENT DOCUMENTS

| | | | |
|---|---|---|---|
| 5,250,214 A | * 10/1993 | Kanemoto et al. | 252/299.01 |
| 5,292,619 A | * 3/1994 | Okinoshima et al. | 430/283.1 |
| 5,441,845 A | * 8/1995 | Okinoshima et al. | 430/191 |
| 6,025,895 A | * 2/2000 | Yazaki et al. | 349/86 |
| 6,063,829 A | * 5/2000 | Endou et al. | 522/164 |
| 6,274,695 B1 | * 8/2001 | Endou et al. | 528/170 |
| 6,340,506 B1 | * 1/2002 | Buchecker et al. | 428/1.26 |
| 6,451,960 B1 | * 9/2002 | Gibbons et al. | 428/1.1 |
| 6,583,835 B1 | * 6/2003 | Yoshida et al. | 349/124 |

FOREIGN PATENT DOCUMENTS

| | | |
|---|---|---|
| JP | 61-47932 A | 3/1986 |
| JP | 2-2515 A | 1/1990 |
| JP | 2-19836 A | 1/1990 |
| JP | 4-2844 A | 1/1992 |
| JP | 4-97139 A | 3/1992 |
| JP | 4-116557 A | 4/1992 |
| JP | 4-172320 A | 6/1992 |
| JP | 4-245224 A | 9/1992 |
| JP | 4-284421 A | 10/1992 |
| JP | 4-288365 A | 10/1992 |
| JP | 4-296820 A | 10/1992 |
| JP | 4-311926 A | 11/1992 |
| JP | 5-53513 A | 3/1993 |
| JP | 6-43458 A | 2/1994 |

OTHER PUBLICATIONS

H. Ikeno et al., "Electrooptic Bistability of a Ferroelectric Liquid Crystal Device Prepared Using Polyimide Langmuir–Blodgett Orientation Films", Jpn. J. Appl. Phys., 27, 475 (1988).

W. M. Gibbons et al., "Surface–mediated Alignment of Nematic Liquid Crystals With Polarized Laser Light", Nature, 351, 49 (1991).

Y. Kawanishi et al., "Nematic Homogeneous Alignment Regulated By The Polarization Photochromism Of Surface Azobenzenes", Mol. Cryst. Liq. Cryst., 218, 153 (1992).

M. Shadt et al., "Surface–Induced Parallel Alignment Of Liquid Crystals By Linearly Polymerized Photopolymers", Jpn. J. Appl. Phys., 31, 2155 (1992).

Y. Iimura et al., "Alignment Control Of A Liquid Crystal On a Photosensitive Polyvinylalcohol Film", Jpn. J. App. Phys., 32, L93 (1993).

T.H. Mourey et al., "N–Methylation Of Wholly Aromatic Polyamides For Size–Exclusion Chromatography", J. Appl. Polym. Sci., 45, 1983 (1992).

M. Takayanagi et al., "N–Substituted Poly (p–Phenylene Terephthalamide)", J. Polym. Sci., Polym. Chem. Ed., 19, 1133 (1981).

* cited by examiner

*Primary Examiner*—Mark F. Huff
*Assistant Examiner*—Jennifer R. Sadula
(74) *Attorney, Agent, or Firm*—Oliff & Berridge, PLC

(57) ABSTRACT

A liquid crystal alignment agent comprising a polymer having a specific unit structure, and a method for alignment of liquid crystal molecules by light irradiation without any rubbing treatment, provides liquid crystal alignment films with higher heat sensitivity, heat stability and light resistance.

16 Claims, No Drawings

LIQUID CRYSTAL ALIGNMENT AGENT AND LIQUID CRYSTAL DEVICE USING THE LIQUID CRYSTAL ALIGNMENT AND METHOD FOR ALIGNMENT OF LIQUID CRYSTAL MOLECULES

TECHNICAL FIELD

The present invention relates to a liquid crystal alignment agent, a liquid crystal device produced by using the liquid crystal alignment agent thereof, and a method for alignment of liquid crystal molecules by using the liquid crystal alignment agent. In more detail, the present invention relates to a novel liquid crystal alignment agent used in a method of aligning liquid crystal molecules comprising irradiating the surface of a thin polymer film with light and aligning the liquid crystal molecules without any rubbing treatment, a liquid crystal device and a method for alignment of liquid crystal molecules by using the liquid crystal alignment agent. The liquid crystal alignment agent comprising a polymer having a specific unit structure has characteristics such that the resulting liquid crystal alignment films realize high sensitivity, high heat stability and high light resistance compared to the prior art.

BACKGROUND ART

Liquid crystal display devices are display devices utilizing electrooptical changes of liquid crystal. Attention has been drawn to their features such that the devices are small in size and light in weight, and power consumption is small. Accordingly, in recent years, they have undergone remarkable developments as display devices for various displays. Among them, an electric field effect type (TN type) is representative, wherein nematic liquid crystal having a positive dielectric anisotropy is used, liquid crystal molecules are aligned in parallel with substrates at the respective interfaces of a pair of mutually opposing electrode substrates, and the two substrates are combined so that the alignment directions of liquid crystal molecules will cross each other.

With such a TN type liquid crystal display device, it is important to align the long axial directions of liquid crystal molecules uniformly in parallel with the substrate surface and to align the liquid crystal molecules with a constant tilt alignment angle (hereinafter referred to as a pre-tilt angle) to the substrate.

As typical methods for aligning liquid crystal molecules in such a manner, two methods have heretofore been known. The first method is a method wherein an inorganic substance such as silicon oxide is vapor-deposited from an oblique direction to the substrate to form an inorganic film on the substrate, so that the liquid crystal molecules will be aligned in the direction of vapor-deposition. This method is not industrially efficient, although constant alignment with a predetermined tilt angle can be obtained.

The second method is a method wherein an organic coating film is formed on the substrate surface, and the film surface is rubbed in a predetermined direction with a cloth, for example of nylon or polyester, so that the liquid crystal molecules are aligned in the rubbing direction. An organic coating film (called liquid crystal alignment film or alignment film) is usually formed by coating the liquid crystal alignment agent over the surface of a substrate. By this method, constant alignment can be obtained relatively easily, and this method is industrially most commonly employed. As the organic film, polyvinyl alcohol, polyoxyethylene, polyamide or polyimide may, for example, be mentioned. However, polyimide is most commonly employed from the viewpoint of the mechanical strength, chemical stability, thermal stability, etc. As typical examples of polyimide used for such liquid crystal alignment films, those disclosed in JP-A 61-47932 may be mentioned.

The treating method for liquid crystal alignment by rubbing polyimide film is an industrially useful method that is simple and excellent in productivity. The demands for high precision and high performance of liquid crystal display devices have increased and new display systems corresponding to such demands have been developed. For example, a STN (Super Twisted Nematic) system wherein the twist angle of a TN type liquid crystal display is increased, an AM (Active Matrix) system wherein switching elements are formed for individual electrodes, and a FLC (ferroelectric) or AFLC (antiferroelectric) system wherein ferroelectric liquid crystal or antiferroelectric liquid crystal is employed, may be mentioned as such examples. However, various problems of the rubbing method have been pointed out. In the STN system, contrast is high and scratches on the alignment film surface formed by rubbing become display defects. In the FLC or AFLC system, it is difficult to satisfy both high speed response and uniform alignment of smectic liquid crystal only by simple rubbing treatment. In the AM system, the mechanical force or static electricity due to rubbing is likely to destroy the switching elements, and dusting by rubbing tends to lead to display defects. Since the AM system in particular drives liquid crystals with semiconductor devices such as TFT (thin film transistor) and basically requires absolute cleanliness in its semiconductor technology, the a process such as rubbing is not strictly speaking the best method in practical industrial production.

For the purpose of solving such problems, a so-called "rubbing-less" alignment method, wherein liquid crystals are aligned without rubbing, has been studied and various methods have been proposed. For example, a method wherein photochromic molecules are introduced to the alignment film surface so that molecules on the alignment film surface are aligned by light (JP-A-4-2844), a method wherein molecular chains constituting an alignment film are aligned by means of a LB film (Langmuir-Blodgett film) (S. Kobayashi et al, Jpn. J. Appl. Phys., 27,475 (1988)), and a method wherein an alignment film is press-bonded on a preliminary alignment-treated substrate to transfer the alignment (JP-A-6-43458) have been studied. However, when industrial productivity is taken into account, these methods can not be said to be useful as substitutes for the rubbing method.

Various methods have been proposed wherein periodic irregularities are artificially formed on the alignment film surface and liquid crystal molecules are aligned along such irregularities. The most simple method of this type is a method wherein a replica having periodic irregularities is preliminary prepared and a thermoplastic film is heated and pressed thereon to transfer the irregularities onto the film (JP-A-4-172320, JP-A-4-296820, JP-A-4-311926 etc.). By this method, it is certainly possible to prepare a film having periodic irregularities on its surface efficiently, but it has been impossible to obtain practical reliability as high as a polyimide film used in the rubbing method. A method having high reliability has been proposed in which a light with high energy, such as electron rays (JP-A4-97139), α-rays (JP-A-2-19836), X-rays (JP-A-2-2515) or eximer laser (JP-A-5-53513), is applied to a polyimide film to form periodic, irregularities on the film surface. However, to use a light source of such high energy can not hardly be said to be an efficient treating method for alignment when industrial production, where the alignment treatment is continuously carried out uniformly over the entire surface of a large size substrate, is taken into consideration.

On the other hand, as an efficient method for forming periodic irregularities on the surface of a polyimide film having high reliability, a photolithographic method may be mentioned. The polyimide is used as an insulating film for semiconductors by virtue of its high insulating property and excellent electrical characteristics. In recent years, a so-called photosensitive polyimide has been developed which is a polyimide having a photocurable nature by itself. There has been an attempt to form periodic irregularities by a photolithographic method using this photocurable polyimide. By this method, irregularities have certainly been formed on the surface of the polyimide film, but since the photocurable polyimide was initially developed as an insulating film, the properties to align liquid crystals have been inadequate. Further, it has been necessary to apply a buffer coating layer (JP-A-4-245224). Consequently, the process has been complex and can not be regarded as an efficient treating method for alignment which can be a substitute for the rubbing method when industrial productivity is taken into consideration.

As a new treating method for alignment which has recently been found, a method has been proposed in which polarized ultraviolet rays, etc. are applied to a polymer film surface to align liquid crystal molecules without carrying out a rubbing treatment. The following reports are available as such examples.

W. M. Gibbons et al., Nature, 351, 49 (1991), Y. Kawanishi et al., Mol. Cryst. Loq. Cryst., 218, 153 (1992), M. Shadt et al., Jpn. J. Appl. Phys. 31, 2155 (1992), and Y. Iimura et al., Jpn. J. Appl. Phys. 32, L93 (1993).

These methods are characterized in that liquid crystals are aligned in a predetermined direction by irradiation of polarized light without requiring a conventional rubbing treatment. These methods have merits such that they are free from problems such as static electricity and scratches on the film surface by the rubbing method, and the process is simple when industrial production is taken into consideration.

The liquid crystal alignment method using irradiation of polarized light proposed here is considered to be an attractive new treatment method for liquid crystal alignment without requiring rubbing treatment, although it is still in a fundamental research stage.

The use of polymer compounds with light reacting radicals at the side chain of the polymer molecules as the raw materials in aligning liquid crystal film has been proposed in the reports up to this point because of the necessity in getting photochemical sensitivity against polarized light. Polyvinyl cinnamate may be a typical example of such material. Cinnamate as such manifests anisotropy by dimerizing at the side chain, initiated by light irradiation, leading to aligning liquid crystals in this case. In another embodiment reported, aligning liquid crystal molecules in a certain direction can be achieved by irradiating polarized light over the film surface in which low molecular weight dichroism azo dyestuff are dispersed into polymer materials. Further, the possibility of the alignment of liquid crystal molecules by irradiation with polarized ultraviolet rays and the like over the specific polyimide film has been reported. In this instance, the alignment of liquid crystals may be manifested by the decomposition of the main chain of polyimides in a defined direction.

Polymer material systems with light reacting radicals introduced to the side chain of a polymer, exemplified by polyvinyl cinnamate, do not show sufficient heat resistance against the alignment, and thus, is not fully reliable in a practical aspect of production yet. In regard to the dispersion of low molecular weight dichroism dyestuff, stability against heat and light is a problem awaiting solution for the dispersion system in view of the practical aspects, as dyestuff that align liquid crystals are themselves of low molecular weight. In addition, although polyimides themselves show high reliability for heat resistance in the method of irradiating polarized ultraviolet rays on specific polyimides, the real possibility of not getting full dependability for future practical use still exists as its alignment mechanism is thought to be resulting from the decomposition with light. Moreover, decreased productivity can be expected due to the high energy for light irradiation required for the satisfactory alignment of liquid crystals.

In these respects, materials proposed up to now for liquid crystal alignment with the irradiation of light are not satisfactory in regard to their alignment strength and stability, in addition to their sensitivity. Therefore, practical use of rubbing-less alignment with light irradiation is an important issue to be considered at present.

DISCLOSURE OF INVENTION

An object of the present invention relates to a liquid crystal alignment agent, that can align liquid crystals without a rubbing treatment of the liquid crystal alignment film, by light irradiation over the liquid crystal alignment film. Another object of the present invention relates to a liquid crystal alignment agent of a polymer material system with a specific unit structure, with which uniform and stable alignment of liquid crystals can be effectively achieved, with their high heat stability and high light resistance in regard to the alignment attained.

Inventors finally accomplished the present invention as a result of their eager effort to solve the problems described above. That is to say that the present invention relates to a liquid crystal alignment agent that forms a liquid crystal alignment film comprising of a thin alignment film over a substrate, where irradiation of light or electron rays align liquid crystal molecules without any rubbing treatment, and said liquid crystal alignment agent comprises of a polymer compound having a structure shown in the general formula (1)–(7) below

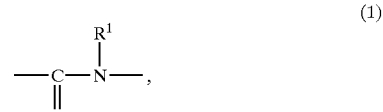

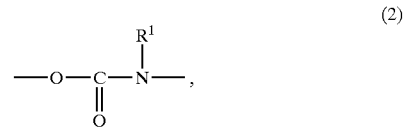

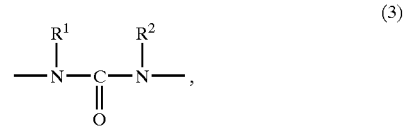

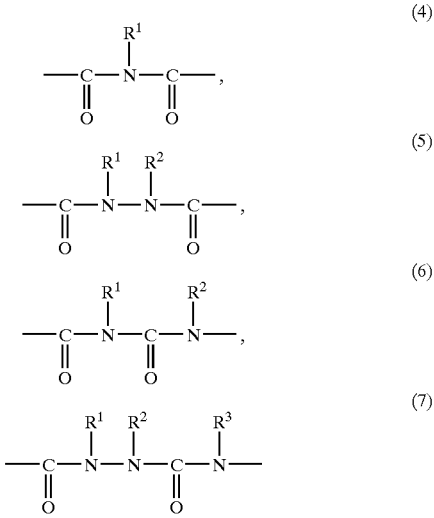

wherein $R^1$, $R^2$ and $R^3$ are independently of each other hydrogen, alkyl, substituted alkyl, aryl or propagyl in the main chain of polymer compound with number average molecular weight of 1,000–300,000, and said structure makes a direct bond with either a divalent or trivalent aromatic group at both ends of said structure or with a divalent or trivalent aromatic group making a direct bond at one end while at the other end forming a direct bond with a divalent or trivalent alicyclic hydrocarbon group. The present invention also relates to liquid crystal elements by the use of said liquid crystal alignment agent and also methods of aligning liquid crystals by the use of said liquid crystal alignment agent.

As stated above, not only the initial alignment of liquid crystals alone but also more effective and stable alignment are necessary in order for the practical application of aligning liquid crystals by the irradiation of polarized light from the standpoint of reliability and productivity. In preparing practical industrial application, the selection of a polymer structure having high heat and light stability as well as finding the liquid crystal alignment agent from a polymer material system with broader selection latitude are desirable.

The liquid crystal alignment agent in the present invention relates to the thin polymer film coated and formed on an electrode substrate such as glass or plastic film, so as to align the liquid crystals and to control the pre-tilt angle. Namely, the liquid crystal alignment agent in the present invention is applied and cured to a transparent substrate, such as a transparent glass or plastic film, as combined with a transparent electrode so as to form the thin polymer film, and then irradiating light or electron rays over the film in order to produce a liquid crystal alignment film without the necessity of rubbing treatment. The liquid crystal alignment agent in the present invention is under normal circumstances used in the form of a solution.

The thin polymer film formed with the liquid crystal alignment agent of the present invention, in which having structural characteristics of at least one structure shown in the general formula (1)–(7) in the main chain of the polymer compound forming said thin polymer film, and a divalent or trivalent aromatic group forming the direct bond at both ends of said structure, or either a divalent or trivalent aromatic group making the direct bond at one end while at the other end forming the direct bond with a divalent or trivalent alicyclic hydrocarbon group, so as to achieve effective and uniform as well as stable liquid crystal alignment with the irradiation with light or electron rays, is important in order to achieve the object of the present invention. It is also preferred to have 20 to 100 mole % of the unit structure of the polymer in the structure for the effective liquid crystal alignment. The aromatic or alicyclic group described above can have a substituting group. It is also preferred that the glass transition point of the polymer should be 200° C. or higher in order to obtain heat stability of alignment. At the same time, the thin polymer film formed on the substrate can chemically change with the irradiation of light and the resulting reaction product can have the glass transition point of 200° C. or higher. Radicals that induce a dimerization reaction or isomerization reaction, such as the radicals shown in the general formula of (8)–(17)

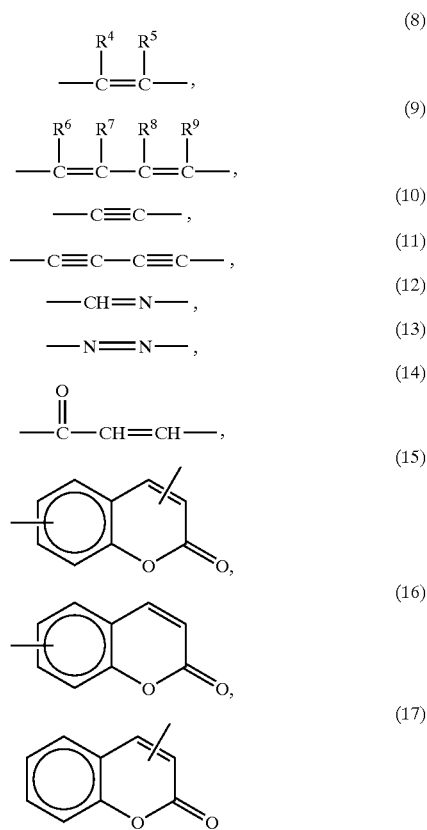

wherein $R^4$, $R^5$, $R^6$, $R^7$, $R^8$ and $R^9$ are independently of each other hydrogen, halogen, alkyl, substituted alkyl, substituted alkoxy, carboxyl, alkoxycarbonyl or cyano group; are not necessary.

Preferred examples of an alkyl group of substituting radicals shown in the general formula of (1)–(7) described above can be a lower alcohol such as methyl, ethyl, propyl, i-propyl, butyl, i-butyl, s-propyl and t-butyl, in addition to generally used long chain alkyl having up to 24 carbon atoms. Also, preferred examples of substituted alkyl are such as trifluoromethyl, 2,2,2-trifluoroethyl, perfluoroethyl, 3,3, 3-trifluoropropyl, perfluoropropyl, hexafluoro-i-propyl, 3,3, 4,4,4-pentafluorobutyl and perfluorobutyl of lower alkyl groups containing fluorine, generally used fluorine containing long chain alkyl of up to about 24 carbon atoms, and benzyl and benzyl substituted with halogen, alkyl, alkoxy or alkoxycarbonyl on the benzene ring.

There are no limitations for the polymer compounds of the present invention, as long as the polymer compounds have structural characteristics of at least one structure shown above in the general formula (1)–(7), and divalent or trivalent aromatic groups forming the direct bond at the both ends of said structure, or either a divalent or trivalent aromatic group making the direct bond at one end while at the other end forming the direct bond with a divalent or trivalent alicyclic hydrocarbon, but polyamide, polyurethane, polyurea or polyimide precursor having any one of the structures described above in the general formula of (1)–(7), or polyimide obtained by chemical or heat imidation of a polyimide precursor, are preferred from the view point described above.

Preferred examples of polymer compounds are polyimide with divalent organic radicals shown in the general formula (18) or the formula (19a) and (19b)

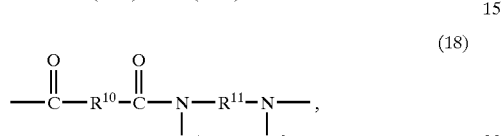
(18)

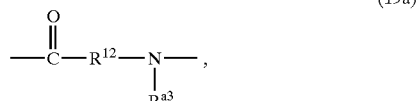
(19a)

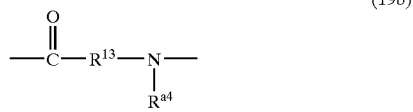
(19b)

wherein $R^{10}$, $R^{11}$, $R^{12}$ and $R^{13}$ are of general formulas (20)–(23)

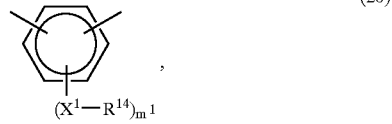
(20)

(21)

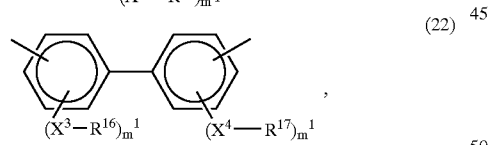
(22)

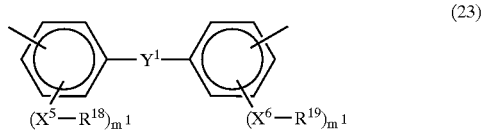
(23)

wherein $X^1$, $X^2$, $X^3$, $X^4$, $X^5$ and $X^6$ are independently of each other a single bond, O, $CO_2$, OCO, $CH_2O$, NHCO or CONH; $R^{14}$, $R^{15}$, $R^{16}$, $R^{17}$, $R^{18}$ and $R^{19}$ are independently of each other hydrogen, halogen, $C_1$–$C_{24}$alkyl, $C_1$–$C_{24}$alkyl containing fluorine, aryl, propargyl, phenyl or substituted phenyl; $Y^1$ is O, S, CO, $CO_2$, $SO_2$, $CH_2$, NH, NHCO, $Y^2$—$Ar^1$—$Y^3$, $Y^4$—$(CH^2)$ $n^1$—$Y^5$ or Y6—$Ar^2$—$R^{20}$—$Ar^3$—$Y^7$; $Y^2$, $Y^3$, $Y^4$, $Y^5$, $Y^6$ and $Y^7$ are independently of each other O, S, CO, $CO_2$, $SO_2$, $CH_2$, NH or NHCO; $n^1$ is an integer of 1 to 10; $R^{20}$ is $C_1$–$C_5$ straight or branched lower alkylene, fluoroalkylene or alkylenedioxy; and further $Ar^1$, $Ar^2$ and $Ar^3$ are independently of each other in the general formulas (24), (25) or (26)

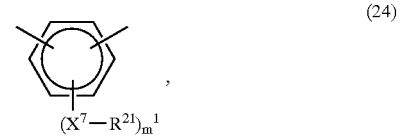
(24)

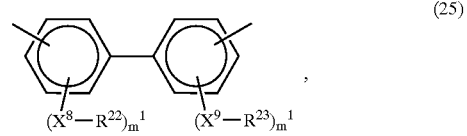
(25)

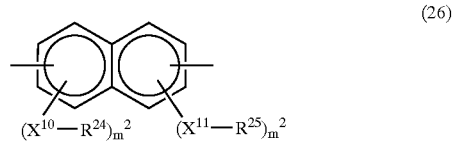
(26)

wherein $X^7$, $X^8$, $X^9$, $X^{10}$ and $X^{11}$ are independently of each other single bond, O, $CO_2$, OCO, $CH_2O$, NHCO or CONH; $R^{21}$, $R^{22}$, $R^{23}$, $R^{24}$ and $R^{25}$ are independently of each other hydrogen, halogen, $C_1$–$C_{24}$alkyl, $C_1$–$C_{24}$alkyl containing fluorine, aryl, propargyl, phenyl or substituted phenyl; $m^1$ is an integer of 1–4 and $m^2$ is an integer of 1–3, but with the proviso that when $R^{14}$, $R^{15}$, $R^{16}$, $R^{17}$, $R^{18}$, $R^{19}$, $R^{21}$, $R^{22}$, $R^{23}$, $R^{24}$ and $R^{25}$ are hydrogen or halogen, then $X^1$, $X^2$, $X^3$, $X^4$, $X^5$, $X^6$, $X^7$, $X^8$, $X^9$, $X^{10}$ and $X^{11}$ are single bond, and $Ra^1$, $Ra^2$, $Ra^3$ and $Ra^4$ are independently of each other hydrogen, alkyl, substituted alkyl, aryl or propargyl.

Further, when practicality and generality are considered, $R^{10}$ and $R^{11}$ in the general formula (18) described above, or $R^{12}$ and $R^{13}$ in the general formula (19a) and (19b), are independently of each other selected from in the general formula (27)–(41) described below

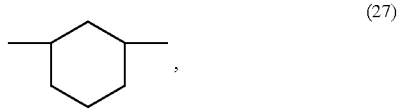
(27)

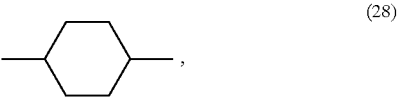
(28)

(29)

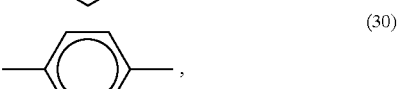
(30)

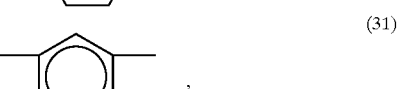
(31)

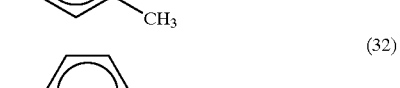
(32)

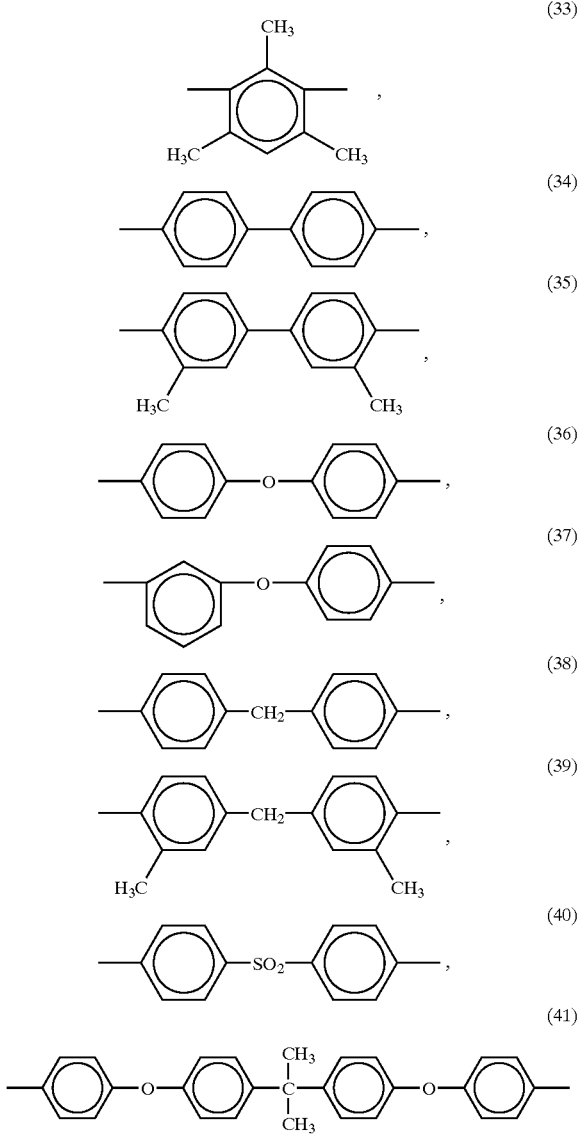

wherein, the $C_1$–$C_{24}$ alkyl group of $R^{14}$, $R^{15}$, $R^{16}$, $R^{17}$, $R^{18}$, $R^{19}$, $R^{21}$, $R^{22}$, $R^{23}$, $R^{24}$ and $R^{25}$ in the general formula of (20)–(26) described above can be a lower alkyl group such as methyl, ethyl, propyl, i-propyl, butyl, i-butyl, s-butyl or t-butyl, and additionally generally used long chain alkyl, and an alkyl group containing alicyclic hydrocarbon group such as cyclohexyl and bicyclohexyl. Fluorine containing $C_1$–$C_{24}$ alkyl groups include fluorine containing lower alkyls such as trifluoromethyl, 2,2,2-trifluoroethyl, perfluoroethyl, 3,3,3-trifluoropropyl, perfluoropropyl, hexafluoro-i-propyl, 3,3,4,4,4-pentafluorobutyl and perfluorobutyl, and additionally generally used long chain alkyl containing fluorine.

The substituting groups in the substituted phenyl radical are for example halogen, alkyl, alkyl containing fluorine, alkoxy, alkoxy containing fluorine, alkoxycarbonyl or alkoxycarbonyl containing fluorine.

The radicals of $R^{a1}$, $R^{a2}$, $R^{a3}$ and $R^{a4}$ in the general formulas (18), (19a) and (19b) described above are the same as the radicals of $R^1$ in the general formula (1). Polyamide described above with radicals $R^{a1}$, $R^{a2}$, $R^{a3}$ and $R^{a4}$ other than hydrogen can be obtained by the methods described below.

They can be obtained by introducing desired radicals with a preferred ratio by the use of known polymer reactions at the N of an amide radical of polyamide in which $R^{a1}$, $R^{a2}$, $R^{3a}$ and $R^{a4}$ are hydrogen (see T. H. Mourey et al., J. Appl. Polym. Sci., 45, 1983 (1992), and M. Takayanagi et al., J. Polym. Sci., Polym. Chem. Ed., 19, 1133 (1981)).

It is also possible to prepare that the desired substituting radical can be introduced at the N of a diamine monomer compound described below and the desired compound can be prepared by the polymerization reaction by using the obtained compound as a monomer.

Examples of monomer compounds for the production of the di-carboxylic acid component corresponding to $R^{10}$ in the general formula (18) above are aromatic group or aromatic containing di-carboxylic acid and their acid halide and alkylesterification product such as terephthalic acid, isophthalic acid, 2-methyl-isophthalic acid, 4-methyl-isophthalic acid, 5-methyl-isophthalic acid, 5-aryloxyisophthalic acid, 5-aryloxycarbonylisophthalic acid, 5-propergyloxyisophthalic acid, 5-acetyloxyisophthalic acid, 5-benzoylaminoisophthalic acid, tetrafluoroisophthalic acid, methylterephthalic acid, tetraorthoterephthalic acid, tetrafluoroisophthalic acid, methyterephthalic acid, tetrafluoroterephthalic acid, 2,6-naphthalene dicarboxylic acid, 1,6-naphthalene dicarboxylic acid, 2,6-anthracene dicarboxylic acid, 1,6-anthracene dicarboxylic acid, 4,4'-dicarboxy biphenyl, 3,4'-dicarboxy biphenyl, 2,3'-dicarboxy biphenyl, 2,4'-dicarboxy biphenyl, 4,4'-dicarboxy diphenylether, 3,4'-dicarboxy diphenylether, 2,3'-dicarboxy diphenylether, 2,4'-carboxy diphenylether, 3,3'-dicarboxy diphenylether, 3,3'-dimethyl-4,4'-dicarboxy biphenyl, 4,4'-dimethyl-3,3'-dicarboxy biphenyl, 2,2'-dimethyl-4,4'-dicarboxy biphenyl, 3,3'-dimethoxy-4,4'-dicarboxy biphenyl, 4,4'-dimethoxy-3,3'-dicarboxy biphenyl, 2,2'-dimethoxy-4,4'-dicarboxy biphenyl, 4,4'-dicarboxy benzophenone, 3,4'-dicarboxy benzophenone, 3,3'-dicarboxy benzophenone, 4,4'-dicarboxy diphenylmethane, 3,4'-dicarboxy diphenylmethane, 3,3'-dicarboxy diphenylmethane, 3,3'-dimethyl-4,4'-dicarboxy diphenylmethane, 2,2'-dimethyl 4,4'-dicarboxy diphenylmethane, 4,4'-dimethyl-3,3'-dicarboxy diphenylmethane, 3,3'-dimethoxy-4,4'-dicarboxy diphenylmethane, 2,2'-dimethoxy-4,4'-dicarboxy diphenylmethane, 4,4'-dimethoxy-3,3'-dicarboxy diphenylmethane, 4,4'-dicarboxy benzanilide, 3,4'-dicarboxy benzanilide, 4,4'-dicarboxy diphenylsulfon, 3,4'-dicarboxy diphenylsulfon, 3,3'-dicarboxy diphenylsulfone, 2,2-bis (4-carboxyphenyl) propane, 1,4-bis (4-carboxyphenoxy) benzene, 1,3-bis (4-carboxyphenoxy) benzene, 1,3-bis (4-carboxybenzamide) benzene, 1,4-bis (4-carboxybenzamide) benzene, bis (4-carboxyphenoxyphenyl) methane, 4,4'-bis (4-carboxyphenoxy) diphenylsulfone, 2,2-bis [4(4carboxyphenoxyphenyl] propane, 2,2-bis (4-carboxyphenyl) hexafluoropropane, 2,2-bis [4-(4-carboxyphenoxy) phenyl] hexafluoropropane, 1,5-bis (4-carboxyphenyl) pentane, 1,4-bis (4-carboxyphenyl) butane, 1,3-bis (4-carboxyphenyl) propane, di (4-carboxyphenyl) pentane-1,5-dioate, di (4-carboxyphenyl) hexane-1,6 dioate, di (4-carboxyphenyl) heptane-1,7-dioate and further alicyclic dicarboxylic acid and their acid halide and alkylesterification compounds such as 1,3-dicarboxy cyclohexane, 1,4-dicarboxy cyclohexane, 1,2-dicarboxy cyclobutane, 1,3-dicarboxy cyclobutane, bis (4-carboxycyclohexyl) methane, bis (4-carboxy-3-methylcyclohexyl) methane, bis (4-carboxycyclohexyl) ether or bis (4-carboxy-3-methylcyclohexyl) ether, or the mixture of more than two of these compounds can be used.

In addition, it is preferred to use di-carboxylic acid and their derivatives such as 1,3-dicarboxycyclohexane, 1,4-dicarboxycyclohexane, isophthalic acid, terephthalic acid, 4-methylisophthalic acid, methyl terephthalic acid, 4,4'-dicarboxy biphenyl, 3,3'-dimethyl-4,4'-dicarboxy biphenyl, 4,4'-dicarboxy diphenylether, 3,4'-dicarboxy diphenylether, 4,4'-dicarboxy diphenylmethane or 3,3'-dimethyl-4,4'-dicarboxy diphenylmethane, from the standpoint of sensitivity to the light reaction, as well as the easy availability of raw materials.

Examples of monomer compounds for the production of the diamine component corresponding to $R^{11}$ in general formula (18) above are aromatic group or aromatic containing diamine compound such as p-phenylenediamine, m-phenylenediamine, 2-methyl-m-phenylenediamine, 4-methyl-m-phenylenedianine, 5-methyl-m-phenylenediarnine, 2,4,6-trimethyl-m-phenylenediamine, 5-aryloxy-m-phenylenediamine, 5-aryloxyrnethyl-m-phenylenediamine, methyl-pphenylenedianiine, 2,5-dimethyl-p-phenylenediamine, 2,6-naphthalenediarnine, 1,6-naphthalenediamine, 2,6-anthracenediamine, 1,6-anthracenediamine, 2,7-diaminofluorene, 4,4'-diaminobiphenyl, 3,4'-diaminobiphenyl, 2,3'-diaminobiphenyl, 2,4'-diaminobiphenyl, 4,4'-diaminodiphenylether, 3,4'-diaminodiphenylether, 2,3'-diaminodiphenylether, 2,4'-diaminodiphenylether, 3,3'-diaminodiphenylether, 4,4'-diaminodiphenylsulfide, 3,3'-dimethyl-4,4'-diaminobiphenyl, 4,4'-dimethyl-3,3'-diaminobiphenyl, 2,2'-dimethyl-4,4'-diaminobiphenyl, 3,3'-dimethoxy4,4'-diaminobiphenyl, 4,4'-dimethoxy-3,3'-diaminobiphenyl, 2,2'-dimethoxy-4,4'-diaminobiphenyl, 4,4'-diaminobenzophenone, 3,4'-diaminobenzophenone, 3,3'-diaminobenzophenone,. 4,4'-diaminodiphenylmethane, 3,4'-diaminodiphenylmethane, 3,3'-diaminodiphenylmethane, 3,3'-dimethyl-4,4'-diaminodiphenylmethane, 4,4'-dimethyl-3,3'-diaminodiphenylmethane, 2,2'-dimethyl-4,4'-diaminodiphenylmethane, 3,3',5,5'-tetramethyl-4,4'-diaminodiphenylmethane, 3,3'-dimethoxy-4,4'-diaminodiphenylmethane, 4,4'-dimethoxy-3,3'-diaminodiphenylmethane, 2,2'-dimethoxy-4,4'-diaminodiphenylmethane, 4,4'-diaminodiphenylmethane, 4,4'-diaminodiphenylamine, 3,4'-diaminodiphenylamine, 4,4'-diaminobenzanilide, 3,4'-diaminobenzanilide, 4,4'-diaminodiphenylsulfone, 3,4'-diaminodiphenylsulfone, 3,3'-diaminodiphenylsulfone, 2,2'-diaminodiphenylpropane, 1,4-bis (4-aminophenoxy) benzene, 1,3-bis (4-aminophenoxy) benzene, 1,3-bis (4-aminobenzamide) benzene, 1,4-bis (4-aminobenzamide) benzene, 4,4'-(4-aminophenoxyphenyl) methane, 4,4'-bis (4-aminophenoxy) diphenylsulfone, 2,2-bis [4-(4-aminophenoxy) phenyl] propane, 2,2-bis (4-aminophenyl) hexafluoropropane, 2,2-bis [4-(4-aminophenoxy) phenyl] hexafluoropropane, 1,5-bis (4-aminophenyl) pentane, 1,4-bis (4-aminophenyl) butane, 1,3-bis (4aminophenyl) propane, di (4-aminophenyl) pentane-1,5-dioate, di (4-aminophenyl) hexane-1,6-dioate or di (4-aminophenyl) heptane-1,7-dioate. At the same time, diamine having a long chain alkyl radical, such as 4,4'-diamino-3-dodecylphenylether or 1-dodecyloxy-2,4-diaminobenzene, can be used in order to elevate the pre-tilt angle. The mixture of more than two kinds can also be used.

The use of diamine compound such as p-phenylenediamine, m-phenylenediamine, methyl-p-phenylenediamnine, 4-methyl-m-phenylenediamine, 2,4,6-trimethyl-m-phenylenediamine, 4,4'-diamninobiphenyl, 3,3'-dimethyl-4,4'-diaminobiphenyl, 4,4'-diamninodiphenylether, 4,4'-diaminodiphenylmethane, 3,3'-dimethyl-4,4'-diaminodiphenylmethane, 4,4'-diaminodiphenylsulfone, 2,2-bis [4-(4-aminophenoxy) phenyl] propane is preferred from the standpoint of sensitivity to the photo reaction as well as the easy availability of raw materials.

Examples of monomer compounds for the production of the aminocarboxylic acid component corresponding to $R^{12}$ and $R^{13}$ in the general formula (19a) and (19b) above are an aromatic group or an aromatic group containing aminocarboxylic acid compound, such as m-aminobenzoic acid, p-aminobenzoic acid, 4-methyl-m-aminobenzoic acid, 3-methyl-p-aminobenzoic acid, 2-amino-6carboxynaphthalene, 1-amino-5-carboxynaphthalene, 1-amino-6-carboxyanthracene, 2-amino-7-carboxyanthracene, 4-(4-aminophenyl) benzoic acid, 3-(4-aminophenyl) benzoic acid, 4-(3-aminophenyl) benzoic acid, 4-(4-aminophenoxy) benzoic acid, 3-(4-aminophenoxy) benzoic acid, 4-(3-aminophenoxy) benzoic acid, 4-amino4'-carboxybenzophenone, 3-amino-4'-carboxybenzophenone, 4-amino-3'-carboxybenzophenone, 4-(4-amino-3-methylphenyl) o-toluic acid, 4-(4-amino-2-methylphenyl) o-toluic acid, 4-aminophenyl-4-carboxyphenylmethane, 3-aminophenyl-4-carboxyphenylmethane, 4-aminophenyl-3-carboxyphenylmethane, 4-amino-4'-carboxydiphenylmethane, 4-aminophenyl-4-carboxyphenylsulfone, 3-aminophenyl-4-carboxyphenylsulfone, 4-aminophenyl-3-carboxyphenylsulfone, 2,2-(4-aminophenyl-4-carboxyphenyl) propane, 2,2-(3-aminophenyl-4-carboxyphenyl) propane, 2,2-(4-aminophenyl-3-carboxyphenyl) propane, 4-aminophenyl-4-carboxybenzanilide, 3-amino-4'-carboxybenzanilide, 4-amino-3'-carboxybenzanilide, 4-[3-(4-aminophenoxy) phenoxy] benzoic acid, 4-[4-(4-aminophenoxy) phenoxy] benzoic acid, 1-(4-aminobenzamide)-3-(4-carboxybenzamide) benzene, 1-(4-aminobenzamide)-4-(4-carboxybenzamide) benzene, 4-[4-(4-aminophenoxy) phenyl] benzoic acid, 4-[4-{4-(4-aminophenoxy) phenyl} phenoxy] benzoic acid, 4-[4-[2-{4-(4-aminophenoxy) phenyl} isopropylidene] phenoxy] benzoic acid, 4-[4-[2-{4-(4-aminophenoxy) phenyl} hexafluoroisopropylidene] phenoxy] benzoic acid, 4-[4-(4-aminophenoxy) butoxy] benzoic acid, 4-[5-(4-aminophenoxy) pentyloxy] benzoic acid, 4-[6-(4-aminophenoxy) hexyloxy] benzoic acid, 4-[5-(4-aminophenoxy)-1,5-dioxopentyl] benzoic acid, 4-[6-(4-aminophenoxy)-1,6-dioxohexyl] benzoic acid or 4-[7-(4-aminophenoxy)-1,7-dioxoheptyl] benzoic acid, and in addition alicyclic aminocarboxylic acid such as 3-aminocyclohexane carboxylic acid, 4-aminocyclohexane carboxylic acid, 1-aminocyclobutane carboxylic acid, 2-aminocyclobutane carboxylic acid, 4-(4-aminocyclohexylmethyl) cyclohexane carboxylic acid, 4-(4-amino-3-methylcyclohexylmethyl)-3-methyl-cyclohexane carboxylic acid, 4-(4-aminocyclohexyloxy) cyclohexane carboxylic acid or 4-(4-amino-3-methylcyclohexyloxy)-3-methyl-cyclohexane carboxylic acid. In addition, the mixture of more than two of these compounds can be used.

The use of amino carboxylic acid compound such as p-amino benzoic acid, m-amino benzoic acid, methyl-p-amino benzoic acid, 4methyl-m-amino benzoic acid, 4-(4-aminophenoxy) benzoic acid, 3,3'-dimethyl-4-(4'-aminophenyl) benzoic acid, 4-(4-aminophenyl) benzoic acid, (4-amilnophenyl-4'-carboxyphenyl) methane, 3,3'-dimethyl-(4-aminophenyl-4'-carboxyphenyl) methane or 4-aminophenyl-4-carboxyphenylsulfone is preferred from the standpoint of sensitivity to the photo reaction as well as the easy availability of raw materials.

The amount of the repeating unit structure consisting of the structure with a divalent or trivalent aromatic group forming the direct bond at the amide group, or either a divalent or trivalent aromatic group making the direct bond at one end while at the other end forming the direct bond with a divalent or trivalent alicyclic hydrocarbon, is preferably 20–100 mole %, and more preferably 50–100 mole %, from the consideration in achieving stable liquid crystal-alignment.

Polyamide as a polymer compound of the present invention, can have the structure with the direct bond with a divalent or trivalent aromatic group at both ends of the amide group, or either a divalent or trivalent aromatic group making the direct bond at one end while at the other end forming the direct bond with a divalent or trivalent alicyclic hydrocarbon. Dicarboxylic acid, diamine and aminocarboxylic acid without aromatic or alicyclichydrocarbon groups can also be used together in combination with the compounds listed above. Positively identified example are oxalic-acid, malonic acid, succinic acid, glutaric acid, adipic acid, pimelic acid, suberic acid, azelaic acid, sebacic acid, 1,9-nonanedicarboxylic acid or 1,10-decanedicarboxylic acid and their acid halide, acid anhydride or alkylesterification compound as the dicarboxylic acid component. The mixture of more than two compounds can also be used. In addition, the component of the diamine compound can be an aliphatic diamine such as 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane or 1,10-diaminodecane, and further diaminosiloxane such as m-xylylenediamine, p-xylylenediamine or

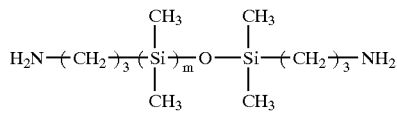

wherein m is an integer of 1–10. One or the mixture of more than two compounds selected from these diamine compounds can be used.

Aliphatic aminocarboxylic acid components are for example 3-aminopropionic acid, 4-aminobutyric acid, 5-aminopentanoic acid, 6-amnohexanoic acid, 7-aminoheptanoic acid, 8-aminooctanoic acid, 9-aminononanoic acid, 10-aminodecanoic acid or 11-aminoundecanoic acid as the aminocarboxylic acid component, and the mixture of more than two compounds selected from these amninocarboxylic acids can be used.

The ways to synthesize these polyamides have no limitations. In general, the final product can be obtained either by a polycondensation reaction in organic solvent upon charging an equimolar ratio of dicarboxylic acid or their derivatives and diamine, by a polycondensation reaction with one kind of aminocarboxylic acid or by a copolymerization reaction with more than, two kinds of aminocarboxylic acis.

These polycondensation reactions proceed well under the existence of a condensation agent., Examples of condensation agents used herewith are triphenyl phosphite, tetrachlorosilane or dimethylchlorosilane among others when dicarboxylic acid or aminocarboxylic acid are used as monomers, or trimethylamine, pyridine or N,N-dimethylaniline among others when dicarboxylic acid halide are used as monomer. Reactions should preferably be carried out in organic solvent, and solvents normally used in the embodiments are for example, N,N-dimethyl formamide, N,N-dimethyl acetoamide, N-methyl-2-pyrrolidone, N-methyl caprolactam, tetrahydrofuran, dioxane, toluene, chloroform, dimethylsulfoxide, tetramethy urea, pyridine, dimethysulfone, hexamethylphosphoramide, and butyllactone or cresol.

The preferable temperature range of carrying out the condensation reaction is about −100° C. to 200° C.

On the other hand, when said dicarboxylic acid anhydride or alkylester compounds are used as a monomer, the polycondensation reaction in general proceeds well by mixing diamine compounds and then melting in vaccuo without the use of said condensation agent and solvent.

It is important that the number-average molecular weight of the polyamide obtained by the method of preparation described above is between 1,000–300,000, more preferably between 3,000–300,000, in order to make full use of the polymer characteristics. Molecular weight can be determined by the known methods such as gel permeation chromatography, osmometry, light dispersion, and viscometric molecular weight determination.

When the polyamide film is to be formed, said polyamide film can be formed by applying polymerization solution directly over the substrate and heated. In addition, they can be used after pouring the formed polyamide solution into an over excess amount of poor solvents, such as water or methanol, and re-dissolved into the solvent after precipitation recovery. The diluting solutions of said polyamide solution and/or solvent in which the polyamide is re-dissolved after precipitation recovery have no limitation as long as they can dissolve polyamide.

Examples of such solvents are 2-pyrrolidone, N-methyl pyrrolidone, N-ethyl pyrrolidone, N-vinyl pyrrolidone, N,N-dimethyl acetoamide, N,N-dimethyl formamide or γ-butyllactone. They can be used by itself or a mixture thereof. In addition, even when said solvent alone can not give homogenous solution, the solvent can be added and used within the range in which a homogeneous solution can be obtained. Example of such are ethyl cellosolve, butyl cellosolve, ethyl carbitol, butyl carbitol, ethyl carbitolacetate or ethyleneglycol.

The liquid solution is applied on the substrate, thereby forming the polyamide film over the substrate by the evaporation of solvent. Temperature for this purpose is adequate if the solvent can evaporate, and the preferred temperature is normally 80–200° C.

The liquid solution of the liquid crystal-aligning agent thus obtained in the present invention is applied on the substrate by a method such as spincoat or offset printing, thereby forming the thin polymer film by heating under the conditions described above. The thickness of the thin polymer film formed has no special limitation, but 10–3,000 nm is preferred for use in the ordinary liquid crystal alignment film.

Next, light or electron rays are irradiated over the surface of said thin polymer film. There is no limitation for the wavelength of light used, but in general the range preferred is between 100 nm and 400 nm. More preferably, appropriate wavelength should be selected as such with a filter and the like depending on the kind of polymer used. In addition, the duration of light irradiation in general ranges from a couple of minutes to a couple of hours, but it is possible to select a suitable time for the polymer to be used.

Further, the way to irradiate has no limitation, but it is preferred to use polarized light in order to obtain the uniform liquid crystal alignment. In this case, the way to irradiate polarized ultraviolet light has no special limitation radiation can be done with polarized phase being rotated or irradiation can also be done more than twice after changing the angles of incidence of the polarized ultraviolet rays. Even non-polarized ultraviolet rays may be irradiated at the certain inclination angle from the normal of the substrate as long as practical polarization can be achieved.

The filmed sides of two substrates thus obtained after irradiation with polarized light are positioned facing each other and thereby aligning the liquid crystal molecules by holding the liquid crystals tightly The alignment of the liquid crystals thus obtained is heat stable.

Good examples of polymer compounds of the present invention include polyimide precursor in the general formula (42a) and (42b) below

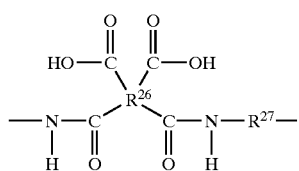

(42a)

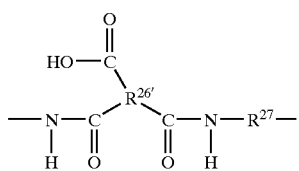

(42b)

wherein $R^{26}$ is a tetravalent organic radical, $R^{26'}$ is a trivalent organic radical, and $R^{27}$ is a divalent or trivalent aromatic group or a divalent organic radical having an amide group bonded with alicyclic hydrocarbon, and a polyimide obtained by chemical or heat imidization of said polymide precursor.

The radical $R^{27}$ of the compound in the general formula (42a) and (42b) is preferably selected from the radicals below in the general formula (43)–(48)

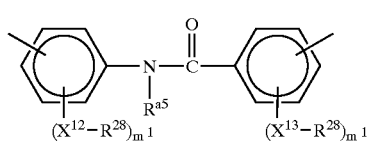

(43)

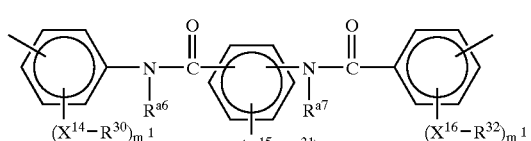

(44)

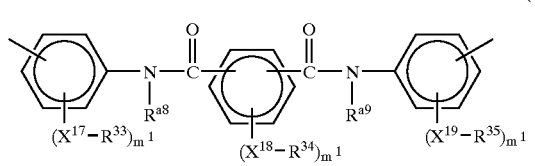

(45)

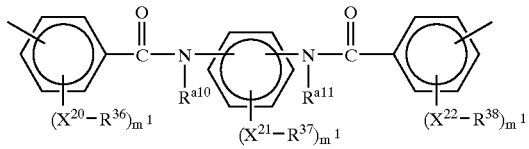

(46)

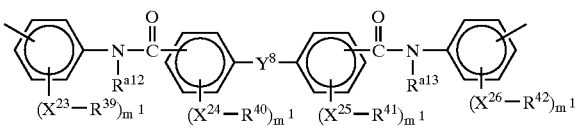

(47)

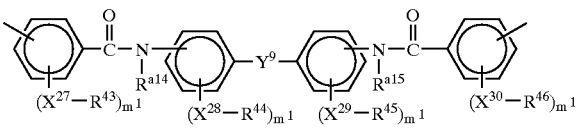

(48)

wherein $X^{12}$–$X^{30}$ are independently of each other single bond, O, $CO_2$, OCO or $CH_2O$; $R^{28}$–$R^{46}$ are independently of each other hydrogen, halogen, $C_1$–$C_{24}$ alkyl, $C_1$–$C_{24}$ alkyl containing fluorine, aryl, propargyl, phenyl or substituted phenyl; $R^{a5}$–$R^{a15}$ are independently of each other hydrogen, alkyl, substituted alkyl, aryl or propargyl; $Y^8$ and $Y^9$ are O, S, $SO_2$, $CH_2$, NH, NHCO or CONH; and $m^1$ is an integer of 1–4; with the proviso that when $R^{28}$–$R^{46}$ are hydrogen or halogen, $X^{12}$–$X^{30}$ are single bond.

The alkyl radical of $C_1$–$C_{24}$ on $R^{28}$–$R^{46}$ in the general formula above are in addition lower alkyl such as methyl, ethyl, propyl, i-propyl, butyl, i-butyl, s-butyl and t-butyl, and alkyl group including alicyclic hydrocarbon such as normally used long chain alkyl and cyclohexyl or bicyclohexyl radical. Examples of fluorine containing alkyl radicals are in addition fluorine containing lower alkyl such as trifluoromethyl, 2,2,2-trifluoroethyl, perfluoroethyl, 3,3,3-trifluoropropyl, perfluoropropyl, hexafluoro-i-propyl, 3,3,4,4,4-pentafluorobutyl and perfluorobutyl, and normally used long chain fluorine containing alkyl radical. Examples of a substituting radical for substituted phenyl are halogen, alkyl, fluorine containing alkyl, alkoxy, fluorine containing alkoxy, alokoxycarbonyl or fluorine containing alkoxycarbonyl.

The radical of $R^{a5}$–$R^{a15}$ in the general formula above are the same as the radical of $R^1$ in the general formula (1) above. The polyimide precursor above, and the polyimide having a radical other than hydrogen at radical of $R^{a5}$–$R^{a15}$, can be produced by introducing a desired substituting radical in advance at the N position of the amide radical of a diamine monomer compound exemplified below, and by carrying out a polymerization reaction using the thus obtained compound above as a monomer.

In addition, preferred examples of the radical $R^{27}$ is a radical in the general formula (49)–(56)

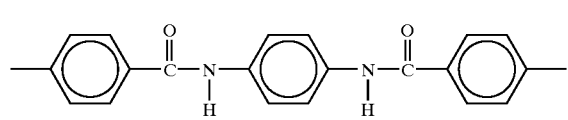
(49)

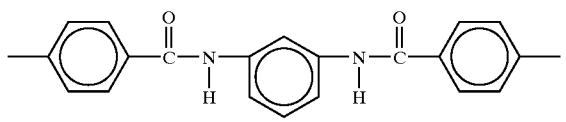
(50)

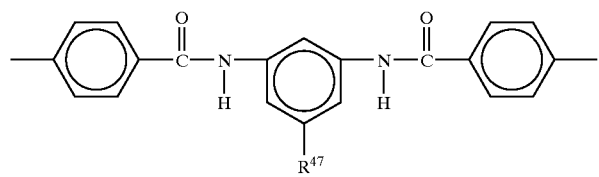
(51)

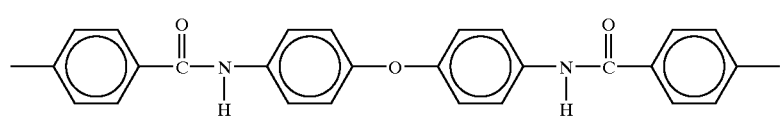
(52)

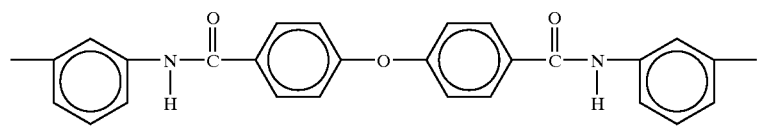
(53)

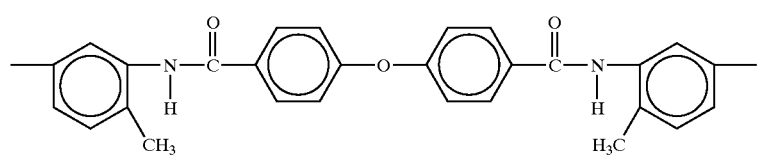
(54)

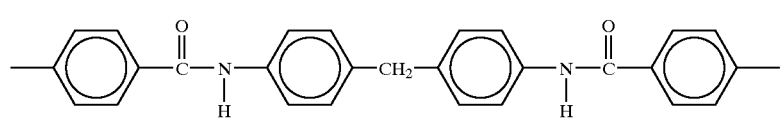
(55)

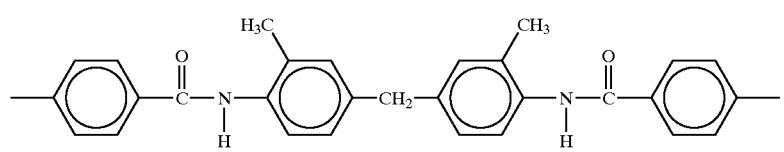
(56)

wherein $R^{47}$ in the formula (51) is halogen, $C_1$–$C_{24}$ alkyl, $C_1$–$C_{24}$ alkoxy or $C_1$–$C_{24}$ alkoxycarbonyl.

The $C_1$–$C_{24}$ alkyl radicals of $R^{47}$ in the general formula (51) above are in addition a lower alkyl such as methyl, ethyl, propyl, i-propyl, butyl, i-butyl, s-butyl and t-butyl, and an alkyl group including alicyclic hydrocarbon such as normally used long chain alkyl, and cyclohexyl or bicyclohexyl. Examples of $C_1$–$C_{24}$ alkoxyl radicals are in addition methoxy, ethoxy, propoxy, i-propoxy, butoxy, i-butoxy, s-butoxy and t-butoxy, and alkoxy radical including alicyclic hydrocarbon such as long chain alkoxy and cyclohexyl or bicyclohexyl. The $C_1$–$C_{24}$ alkoxycarbonyl radicals are in addition methoxycarbonyl, ethoxycarbonyl, propoxycarbonyl, i-propoxycarbonyl, butoxycarbonyl, i-butoxycarbonyl, s-butoxycarbonyl and t-butoxycarbonyl, and alkoxycarbonyl including alicyclic hydrocarbon such as long chain alkoxycarbonyl and cyclohexyl or bicyclohexyl radical.

Typical examples of a monomer compound in producing the tetracarboxylic acid component corresponding to $R^{26}$ in the general formula (42a) above are 1,2,3,4-cyclobutane tetracarboxylic acid, 1,2,3,4-cyclopentane tetracarboxylic acid, 2,3,4,5-tetrahydrofuran tetracarboxylic acid, 1,2,4,5-cyclohexane tetracarboxylic acid, 1-(3,4-dicarboxycyclohexyl) succinic acid, 3,4-dicarboxy-1,2,3,4-tetrahydro-1-naphthalene succinic acid, pyromellitic acid, 2,3,6,7-naphthalene tetracarboxylic acid, 1,2,5,6-naphthalene tetracarboxylic acid, 1,4,5,8-naphthalene tetracarboxylic acid, 2,3,6,7-anthracene tetracarboxylic acid, 1,2,5,6-anthracec tetracarboxylic acid, 3,3',4,4'-biphenyl tetracarboxylic acid, 2,3,3',4'-biphenyl tetracarboxylic acid, bis (3,4-dicarboxyphenyl) ether, 3,3',4,4'-benzophenone tetracarboxylic acid, bis (3,4-dicarboxyphenyl) sulfone, bis (3,4-dicarboxyphenyl) methane, 2,2-bis (3,4-dicarboxyphenyl) propane, 1,1,1,3,3,3-hexafluoro-2,2-bis (3,4-dicarboxyphenyl) propane, bis (3,4-dicarboxyphenyl) dimethylsilane, bis (3,4-dicarboxyphenyl) diphenylsilane, 2,3,4,5-pyridine tetracarboxylic acid, their dianhydride and their dicarboxylic acid diacidhalide, and aliphatic tetracarboxylic acid such as 1,2,3,4-butane tetracarboxylic acid, their dianhydride and their dicarboxylic acid diacidhalide. One or more than two kinds of these tetracarboxylic acid and their derivatives can be used as the mixture.

Typical examples of monomer compounds in making the tricarboxylic acid component corresponding to $R^{26'}$ in the general formula (42b) above are 1,2,3-cyclobutane tricarboxylic acid, 1,2,3-cyclopentane tricarboxylic acid, 1,2,4-cyclopentane tricarboxylic acid, 2,3,4-tetrahydrofuran tricarboxylic acid, 2,3,5-tetrahydrofuran tricarboxylic acid, 1,2,4-cyclohexane tricarboxylic acid, 1-(3-carboxycyclohexyl) succinic acid, 1-(4-carboxycyclohexyl) succinic acid, trimellitic acid, 2,3,6-naphthalene tricarboxylic acid, 1,2,5-naphthalene tricarboxylic acid, 1,2,6-naphthalene tricarboxylic acid, 1,4,8-naphthalene tricarboxylic acid, 2,3,6-anthracene tricarboxylic acid, 1,2,5-anthracene tricarboxylic acid, 4-(3,4-dicarboxyphenyl) benzoic acid, 3-(3,4-dicarboxyphenyl) benzoic acid, 4-(3,4-dicarboxyphenoxy) benzoic acid, 3-(3,4-dicarboxyphenoxy) benzoic acid, 3,4,4'-benzophenone tricarboxylic acid, 4-carboxyphenyl-3',4'-dicarboxyphenylsulfone, 4-carboxyphenyl-3',4'-dicarboxyphenylmethane and their anhydride and dicarboxylic acid acid halide, and aliphatic tricarboxylic acid such as 1,2,4-butane tricarboxylic acid and their anhydride and these dicarboxylic acid acid halide. In addition, one or more than two compounds selected from these tricarboxylic acid and their derivatives can be used in the mixture.

Typical examples of a monomer compound in making the diamine component of $R^{27}$ in the general formula (42a) and (42b) above are 4,4'-diaminobenzanilide, 3,4'-diaminobenzanilide, 1,3-di [4aminobenzamide] benzene, 1,4-di [4-aminobenzamide] benzene and diamine in the general formula as illustrated below.

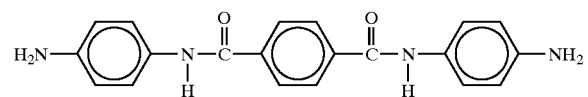
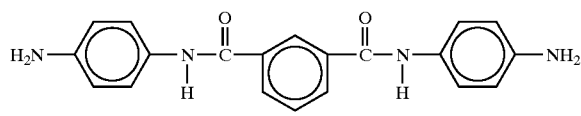
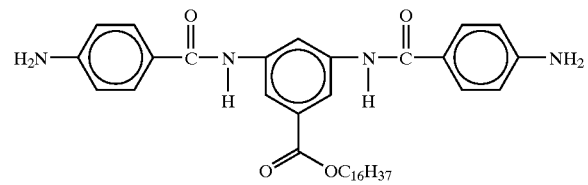
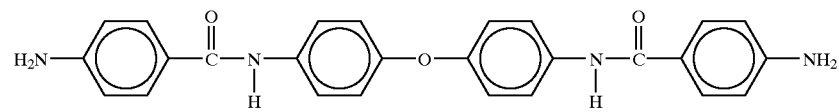
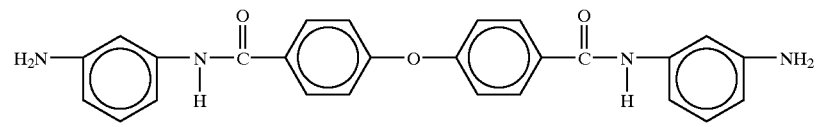
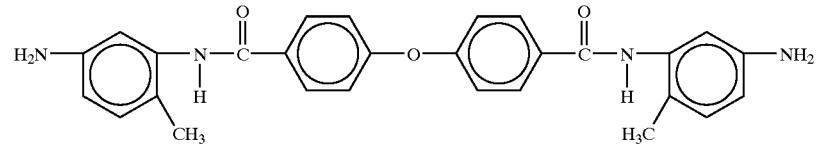
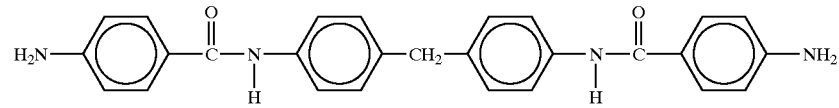
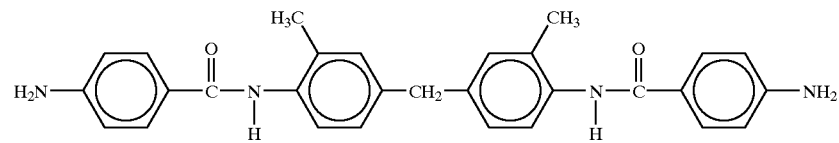

More than two kinds of diamine component can be also mixed for the use.

Additionally, it is preferred to include 4,4'-diaminobenzanilide, 1,3-di [4-aminobenzamide] benzene and diamine components as shown in the general formula below from the viewpoint of stability for liquid crystal alignment.

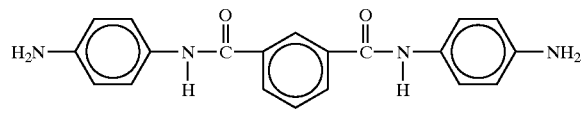

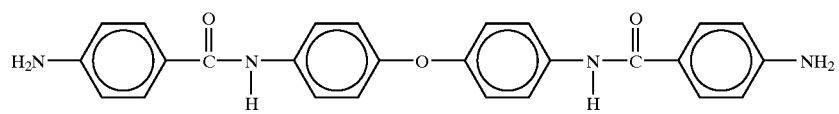

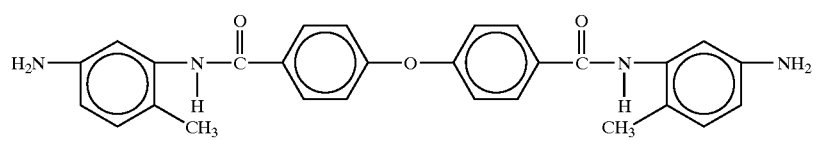

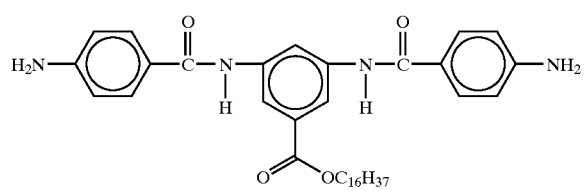

The repeating unit structure having a divalent or trivalent aromatic group forming the direct bond at the both ends of the amide radical described above, or either a divalent or trivalent aromatic group making the direct bond at one end while at the other end forming the direct bond with a divalent or trivalent alicyclic hydrocarbon, are preferably included as much as 20 to 100 mole %, more preferably 50 to 100 mole %, of the total polymer component in view of the stabilization of liquid crystal-alignment.

Further, diamine components generally used in polyimide synthesis can be used as long as they are within the range of manifesting the effect of the present invention. Typical examples as such are aromatic diamines such as p-phenylene diamine, m-phenylene diamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, 4,4'-diaminodiphenylmethane, 4,4'-diaminodiphenylether, 2,2-bis (4-aminophenyl) propane, bis (4-amino-3,5-diethylphenyl) methane, 4,4'-diaminodiphenylsulfone, 4,4'-diaminobenzophenone, 2,6-diaminonaphthalene, 1,4-bis (4-aminophenoxy) benzene, 1,4-bis (4-aminophenyl) benzene, 9,10-bis (4-aminophenyl) anthracene, 1,3-bis (4-aminophenoxy) benzene, 4,4'-di (4-aminophenkxy) diphenylsulfone, 2,2-bis [4-(4-aminophenoxy) phenyl] propane, 2,2-bis (4-aminophenyl) hexafluoropropane and 2,2-bis [4-(4-aminophenoxy) phenyl] hexafluoropropane, alicyclic-diamines such as bis (4-aminocyclohexyl) methane and bis (4-amino-3-methylcyclohexyl) methane, and aliphatic diamine such as 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane and 1,10-diaminodecane, and in addition, diamino siloxanes such as m-xylelenediamine, p-xylelenediamine or the general formula

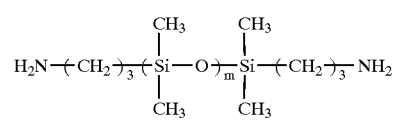

wherein m is an integer of 1–10.

Moreover, diamines having a long chain alkyl group, such as 4,4'-diamino-3-dodecyldiphenylether and 1-dodecyloxy-2,4-diaminobenzene, can be used in order to elevate the pre-tilt angle. One or more than two kinds of these diamine components can be used in the mixture.

The method of preparation of these polyimides has no special limitations. In general, tetracarboxylic acid and their derivatives are reacted with diamine and polymerized to yield a polyimide precursor and then imidization is done by ring closure. Tetracarboxylic acid dianhydride is in general used as the tetracarboxylic acid and their derivatives for this purpose. The ratio of tetracarboxylic acid dianhydride mole number and the total mole number of diamine is preferably 0.8 to 1.2. The more this molar ratio approaches closer to 1, the more the polymerization degree of the polymer becomes, as in a general polycondensation reaction.

When polymerization degree is too small, the strength of the polyimide film is unsatisfactory for the use and liquid crystal alignment becomes unstable. But if polymerization degree becomes too large, workability during the polyimide film formation may be poor. Therefore, it is important that the number-average molecular weight of polyimide according to the present invention is preferably 1,000 to 300,000, more preferably 3,000 to 300,000, in order to manifest the special characteristics of the polymer. The molecular weight can be determined by the known methods such as gel permeation chromatography, osmometry, light dispersion method, and viscometric molecular weight determination.

The methods of reaction/polymerization of tetracarboxylic acid dianhydride and diamine have no specific limitations, and in general, first class diamine and tetracarboxylic acid dianhydride are reacted in an organic polar solvent such as N-methyl-2-pyrrolidone, N,N-dimethylacetoamide or N,N-dimethylformamide to yield a polyimide precursor and then imidization through dehydration ring closure.

The polymerization reaction temperature of tetracarboxylic acid and their derivatives and diamine can be an optional temperature selected from −20–150° C., but most preferably −5–100° C. In addition, this polyimide precursor can be imidized by heat dehydration at 100–400° C. or by chemical imidization by the use of an imidization catalyst such as triethylamine/acetic anhydride, as done under the normal condition.

When the polyimide film is to be formed, said polyimide film can be formed by applying polyimide precursor solution directly over the substrate and imidizing by heating. The polymerization solutions described above itself can be used as the polyimide precursor solution for this occasion, or they can be used after pouring the formed polyimide precursor solution into an over excess amount of poor solvents such as water or methanol, and re-dissolved into the solvent after precipitation recovery. The diluting solutions of said polyimide precursor solution and/or solvent in which polyimide is re-dissolved after precipitation recovery have no limitation as long as they can dissolve the polyimide precursor.

Typical examples of such solvent are N-methyl-2-pyrrolidone, N,N-dimethylacetoamide and N,N-dimethylformamide. They can be used alone or they can be used in a mixture. What is more, even when said solvent alone can not give a homogenous solution, the solvent can be added and used within the range in which a homogeneous solution can be obtained. Examples of such are ethyl cellosolve, butyl cellosolve, ethyl carbitol, butyl carbitol, ethyl carbitolacetate or ethyleneglycol.

The temperature for heat imidization over the substrate is an optional temperature selected from 100–400° C., and most preferably in the range of 150–350° C.

On the other hand, when polyimide is dissolved in solvent, a polyimide precursor solution obtained by reacting tetracarboxylic acid dianhydride and diamine can be used as the polyimide solution after imidization.

The polyimide solutions thus obtained can be used as they are or they can be used after precipitating in poor solvents such as methanol or ethanol, isolating and re-dissolving into the suitable solvent for the use.

The solvent in which the obtained polyimide is re-dissolved can be any solvent without any limitation as long as they can dissolve the polyimide obtained. Examples of such can be 2-pyrrolidone, N-methyl-2-pyrrolidone, N-ethylpyrrolidone, N-vinylpyrrolidone, N,N-dimethylacetoamide, N,N-dimethylformamide and γ-butyllactone.

Any other solvent which alone can not solubilize polyimide can be added to the solvent described above within the range of which they do not affect solubility. Any solvent which can not give a homogenous solution can be used within the range in which homogeneous solution can be obtained. Examples of such are ethyl cellosolve, butyl cellosolve, ethyl carbitol, butyl carbitol, ethyl carbitolacetate and ethyleneglycol.

The liquid solution can be applied on the substrate, thereby forming the polyimide film over the substrate by the evaporation of solvent. Adequate temperature for this purpose is at which the solvent can evaporate, and the preferred temperature is normally 80–200° C.

The liquid solution of the liquid crystal-alignment agent thus obtained in the present invention is applied on the substrate by a method such as spincoat or decalcomania process printing, thereby forming the thin polymer film by heat calcination under the conditions described above. The thickness of the thin polymer film formed has no special limitation, but 10–3,000 nm is preferred for the use in ordinary liquid crystal-alignment film.

Next, light or electron rays are irradiated over the surface of said thin polymer film. There is no limitation for the wavelength of light utilized, but in general the range preferred is between 100 nm and 400 nm. More preferably, appropriate wavelength should be selected by an appropriate device such as a filter depending on the kind of polymer used. In addition, the duration of light irradiation in general ranges from a couple of minutes to a couple of hours, but it is possible to select a suitable wavelength for the polymer to be used.

Further, the way to irradiate has no limitation, but it is preferred to use polarized light in order to obtain the uniform liquid crystal-alignment. In this case, the way to irradiate polarized ultraviolet light has no special limitation. Irradiation can be done with the polarized phase being rotated, and irradiation can also be done more than twice after changing the angles of incidence of the polarized ultraviolet rays. Even non-polarized ultraviolet rays may be irradiated at the certain inclination angle from the normal of the substrate as long as practical polarization can be achieved.

The filmed sides of two substrates thus obtained after irradiation with polarized light are positioned facing each other and thereby aligning the liquid crystal molecules by holding the liquid crystals tightly. The alignment of the liquid crystals thus obtained is heat stable.

A preferred example of a polymer compound according to the present invention is a polyurethane having the repeating unit shown in general formula (57) below

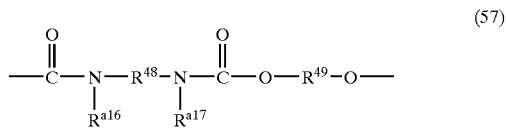
(57)

wherein $R^{48}$ and $R^{49}$ are independently of each other selected from groups shown in the general formula (58)–(69) below

(58)

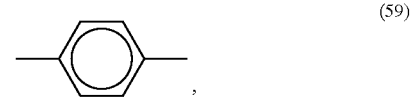
(59)

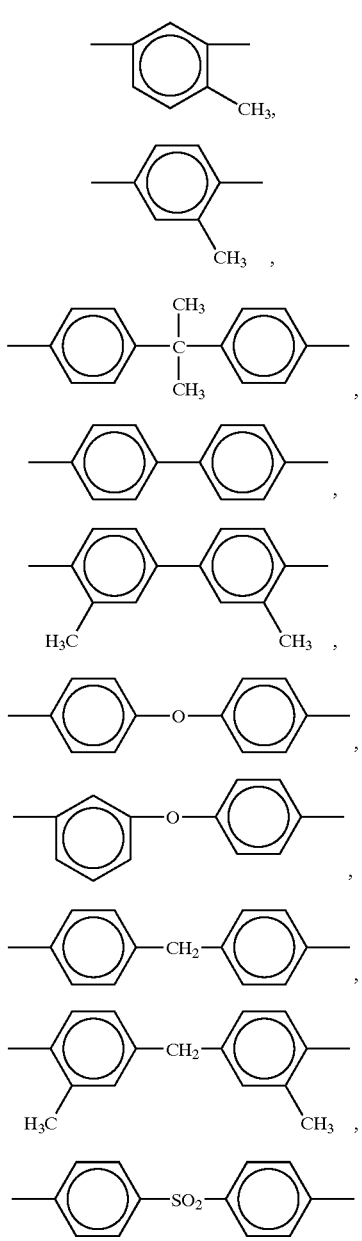

wherein $R^{a16}$ and $R^{a17}$ are independently of each other hydrogen, alkyl, aryl or propagyl.

The radicals $R^{a16}$ and $R^{a17}$ in the general formula above are the same as the radicals $R^1$ in the general formula (2) above. The polyurethane with a radical $R^{a16}$ and $R^{a17}$ that is a radical other than hydrogen can be obtained by introducing the desired radical at the preferred ratio at the N position of the urethane radical in polyurethane having the radical $R^{a16}$ and $R^{a17}$ which are hydrogen by using the known polymer reaction (T. H. Mourey et al., J. Appl. Polym. Sci., 45, 1983 (1992) and M. Takayanagi et al., J. Polym. Sci., Polym. Chem. Ed., 19, 1133 (1981)).

Typical examples of a monomer compound in forming diisocyanate corresponding to $R^{48}$ in the general formula (57) above are 1,3-phenylene diisocyanate, 1,4-phenylene diisocyanate, 4-methyl-1,3-phenylene diisocyanate, 5-methyl-1,4-phenylene diisocyanate, 2,2-bis(isocyanatephenyl) propane, 4,4'-diisocyanate biphenyl, 3,3'-dimethyl-4,4'-diisocyanate biphenyl, 4,4'-diisocyanate diphenylether, 3,4'-diisocyanate diphenylether, 4,4'-diisocyanate dipheylmethane, 3,3'-dimethyl-4,4'-diisocyanate diphenylmethane, 4,4'-diisocyanate diphenylsulfone, 1,3-cyclohexane diisocyanate and 1,4-cyclohexane diisocyanate. In addition, the mixture of more than two of these kinds can be used.

On the other hand, typical examples of a monomer compound in forming diol component corresponding to $R^{49}$ in the general formula (57) above are resorcinol, hydroquinone, 4-methylresorcinol, 5-methylhydroquinone, bisphenol A, 4,4'-biphenol, 3,3'-dimethyl-4,4'-biphenol, 4,4'-dihydroxy diphenylether, 3,4'-dihydroxy diphenylether, 4,4'-dihydroxy diphenylmethane, 3,3'-dimethyl-4,4'-dihydroxy diphenylmethane, 4,4'-dihydroxy diphenylsulfone, 1,3-cyclohexane diol and 1,4-cyclohexane diol as preferred example.

Polyurethane as the polymer compound of the present invention can have the structure with a divalent or trivalent aromatic group forming the direct bond at the urethane radical, or either a divalent or trivalent aromatic group making the direct bond at one end while at the other end forming the direct bond with a divalent or trivalent alicyclic hydrocarbon. Diisocyanate compound or diol compound without aromatic or alicyclic hydrocarbon can be used together in combination. Positively identified examples as such are tetramethylene diisocyanate, pentamethylene diisocyanate, hexamethylene diisocyanate, octamethylene diisocyanate and m-xylylene diisocyanate as the diisocyanate compound. The mixture of more than two of these kinds can be also used. What is more, examples of a diol compound are ethyleneglycol, trimethyleneglycol, tetramethyleneglycol, pentamethyleneglycol, hexamethyleneglycol, diethyleneglycol, triethyleneglycol, m-xylyleneglycol and p-xylyleneglycol. One or more than two kinds of these diol components can be mixed for the use.

The ways to synthesize these polyurethanes have no special limitation. They can be obtained in general by charging an equal mole amount of diisocyanate and diol and carrying out a polyaddition reaction in an organic solvent. These polyaddition reactions can proceed well with a catalyst and the catalyst preferably used here may be for example triethyemine, tributylamine, diisobutylamine, dibutylamine, diethylamine, pyridine and 2,6-dimethylpyridine.

The reaction is preferably carried out in an organic solvent and typical examples of the solvent used are N,N-dimethylformamide, N,N-dimethylacetoamide, N-methyl-2-pyrrolidone, N-methylcaprolactam, tetrahydrofuran, dioxane, toluene, chloroform, dimethylsulfoxide, tetramethylurea, pyridine, dimethylsulfone, hexamethylphsphoramide, butyllactone and cresol.

The preferable range of the polyaddition reaction is the reaction temperature of −20–200° C.

It is important that the number-average molecular weight of the polyurethane obtained by the method of the preparation described above is preferably 1,000 to 300,000, more preferably 3,000 to 300,000, in order to manifest the special characteristics of the polymer. The molecular weight can be determined by the known methods such as gel permeation chromatography, osmometry, light dispersion method, and viscometric molecular weight determination.

When a polyurethane film is to be formed, said polyurethane film can be formed by applying polyurethane solution directly over the substrate and heated. In addition, they can be used after pouring the formed polyurethane solution into an over excess amount of poor solvents such as water or methanol, and re-dissolve into the solvent after precipitation recovery. The diluting solutions of said polyurethane solution and/or solvent in which polyurethane is re-dissolved after precipitation recovery have no limitation as long as they can dissolve polyurethane.

Typical examples of such solvents are 2-pyrrolidone, N-methyl-2-pyrrolidone, N-ethylpyrrolidone, N-vinylpyrrolidone, N,N-dimethylacetoamide, N,N-dimethylformamide or γ-butyllactone. They can be used by itself or a mixture thereof. In addition, even when said solvent alone can not give a homogenous solution, the solvent can be added and used within the range in which a homogeneous solution can be obtained. Examples of such are ethyl cellosolve, buty cellosolve, ethyl carbitol, butyl carbitol, ethyl carbitol acetate and ethylenglycol.

The liquid solution is applied on the substrate, thereby forming the polyurethane film over the substrate by the evaporation of the solvent. Temperature for this purpose is adequate if the solvent can evaporate and the preferred temperature is normally 80–200° C.

The liquid solution of the liquid crystal aligning agent thus obtained in the present invention is applied on the substrate by a method such as spincoat or decalcomania process printing, thereby forming the thin polymer film by heating under the conditions described above. The thickness of the thin polymer films formed have no special limitation, but 10–3,000 nm is preferred for the use in the ordinary liquid crystal alignment film.

Light or electron rays are subsequently irradiated over the surface of said thin polymer film. There is no limitation for the wavelength of light utilized, but in general the range preferred is between 100 nm and 400 nm. More preferably, appropriate wavelength should be selected by an appropriate device such as filter depending on the kind of polymer used. In addition, the duration of light irradiation in general ranges from a couple of minutes to a couple of hours, but it is possible to select a suitable length of time for the polymer to be used.

Further, the ways to irradiate have no limitation, but it is preferred to use polarized light in order to obtain the uniform liquid crystal alignment. In this case, the ways to irradiate polarized ultraviolet light have no special limitation. Irradiation can be done with the polarized phase being rotated, and irradiation can also be done more than twice after changing the angles of incidence of the polarized ultraviolet rays. Even non-polarized ultraviolet rays may be irradiated at the certain inclination angle from the normal of the substrate as long as practical polarization can be achieved.

The filmed sides of two substrates thus obtained after irradiation with polarized light are positioned facing each other and thereby aligning the liquid crystal molecules by holding the liquid crystals tightly. The alignment of the liquid crystals thus obtained is heat stable.

Good examples of polymer compounds of the present invention are polyurea having the repeating unit shown in the general formula (70) below

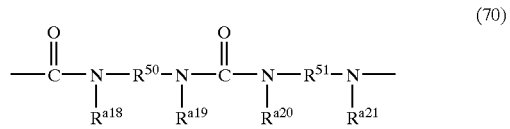

(70)

wherein $R^{50}$ and $R^{51}$ are independently of each other selected from a group in the general formula (58)–(69), and $R^{a18}$–$R^{a21}$ are hydrogen, alkyl, substituted alkyl, aryl or propargyl.

The radical $R^{a18}$–$R^{a21}$ in the general formula above are the same as the radicals $R^1$ and $R^2$ in the general formula (3) described above. The polyurea with radicals $R^{a18}$–$R^{a21}$ whose radicals are other than hydrogen can be obtained by introducing desired the radical at the preferred ratio at the N position of the urea radical in the polyurea having radical $R^{a18}$–$R^{a21}$ which are hydrogen by using the known polymer reaction (T. H. Mourey et al., J. Appl. Polym. Sci., 45, 1983 (1992) and M. Takayanagi et al., J. Polym. Sci., Polym. Chem. Ed., 19, 1133 (1981)).

Typical examples of monomer compounds in forming the diisocyanate component corresponding to $R^{50}$ in the general formula (70) above are 1,3-phenylene diisocyanate, 1,4-phenylene diisocyanate, 4-methyl-1,3-phenylene diisocyanate, 5-methyl-1,4-phenylene diisocyanate, 2,2-bis (isocyanatephenyl) propane, 4,4'-diisocyanate diphenyl, 3,3'-dimethyl-4,4'-diisocyanate diphenyl, 4,4'-diisocyanate diphenylether, 3,4'-diisocyanate diphenylether, 4,4'-diisocyanate diphenylmethane, 3,3'-dimethyl-4,4'-diisocyanate diphenylmethane, 4,4'-diisocyanate diphenylsulfone, 1,3-cyclohexane diisocyanate and 1,4-cyclohexane diisocyanate. The mixture of more than two of these kinds can be used.

On the other hand, typical examples of monomer compounds in forming the diamine component corresponding to $R^{51}$ in the general formula (70) above are m-phenylene diamine, p-phenylene diamine, 4-methyl-m-phenylene diamine, 5-methyl-p-phenylene diamine, 2,2-bis (4-aminophenyl) propane, 4,4'-diaminediphenyl, 4,4'-diamino-3,3'-dimethylphenyl, 4,4'-diamino diphenylether, 3,4'-diamino diphenylether, 4,4'-diamino diphenylmethane, 4,4'-diamino-3,3'-dimethyl diphenylmethane, 4,4'-diamino diphenylsulfone and 1,3-cyclohexane diamine. Moreover, the mixture of more than two of these kinds can be used.

Polyurea as a polymer compound of the present invention can have the structure with a divalent or trivalent aromatic group forming the direct bond at the urea group, or either a divalent or trivalent aromatic group making the direct bond at one end while at the other end forming the direct bond with a divalent or trivalent alicyclic hydrocarbon. Diisocyanate compound and diamine compound can be used together in combination as long as they do not have an aromatic or alicyclichydrocarbon group. Positively identified examples as such are tetramethylene diisocyanate, pentamethylene diisocyanate, hexamethylene diisocyanate, octamethylene diisocyanate and m-xylylene diisocyante, and the mixture of more than two of these kinds can also be used. Furthermore, aliphatic diamine such as 1,2-diaminoethane, 1,3-diamino propane, 1,4-diamino butane, 1,5-diamino pentane, 1,6-diamino hexane, 1,7-diamino heptane, 1,8-diamino octane, 1,9-diamino nonane and 1,10-diamino decane as the diamine compound in addition to m-xylylenedianine and p-xylylenediamine. One or the mixture of more than two of these diamine components can be used.

The ways to synthesize these polyurea have no limitation. In general, the final products can be obtained by the polyaddition reaction in an organic solvent upon charging an equimolar ratio of diisocyanate and diamine. Solvents normally used in the embodiments are for example N,N-dimethyl formamide, N,N-dimethyl acetoamide, N-methyl-2-pyrrolidone, N-methyl caprolactam, tetrahydrofuran, dioxane, toluene, chloroform, dimethylsulfoxide, tetramethyl urea, pyridine, dimethylsulfone, hexamethylphosphoramide, butyllactone and cresol.

The preferable range of the polyaddition reaction temperature is under the normal circumstances in the range of −20° C. and 150° C.

It is important that the number-average molecular weight of polyurea obtained by the method of preparation described above is between 1,000–300,000, more preferably between 3,000–300,000, in order to make the full use of the polymer characteristics. Molecular weight can be determined by the known methods such as gel permeation chromatography, osmometry, light dispersion, and viscometric molecular weight determination.

When polyurea film is to be formed, said polymer solution may be directly applied over the substrate and heated to form the polyurethane film. In addition, they can be used after pouring the formed polyurea solution into an over excess amount of poor solvents such as water or methanol, and re-dissolved into the solvent after precipitation recovery. The diluting solutions of said polyurea solution and/or solvent in which the polyurea is re-dissolved after precipitation recovery have no limitation as long as they can dissolve polyurea.

Examples of such solvents are 2-pyrrolidone, N-methyl-2-pyrrolidone, N-ethyl pyrrolidone, N-vinyl pyrrolidone, N,N-dimethyl acetoamide, N,N-dimethyl formamide or γ-butyllactone. They can be used by itself or a mixture thereof. In addition, even when said solvent alone can not give a homogenous solution, the solvent can be added and used within the range in which a homogeneous solution can be obtained. Example of such are ethyl cellosolve, butyl cellosolve, ethyl carbitol, butyl carbitol, ethyl carbitolacetate or ethyleneglycol.

The liquid solution can be applied on the substrate, thereby forming the polyurea film over the substrate by the evaporation of solvent. The temperature for this purpose is adequate if the solvent can evaporate, and the preferred temperature is normally 80–200° C.

The liquid solution of the liquid crystal-alignment agent thus obtained in the present invention is applied on the substrate by a method such as spincoat or decalcomania process printing, thereby forming the thin polymer film by heat calcination under the conditions described above. The thickness of the thin polymer film formed has no special limitation, but 10–3,000 nm is preferred for the use in the ordinary liquid crystal alignment film.

Light or electron rays are subsequently irradiated over the surface of said thin polymer film. There is no limitation for the wavelength of light utilized, but in general the range preferred is between 100 nm and 400 nm. More preferably, the appropriate wavelength should be selected by an appropriate device such as a filter depending on the kind of polymer used. In addition, the duration of light irradiation is in general ranging from a couple of minutes to a couple of hours, but it is possible to select a suitable length of time for the polymer to be used.

Further, the ways to irradiate have no limitation, but it is preferred to use polarized light in order to obtain the uniform liquid crystal-alignment. In this case, the ways to irradiate polarized ultraviolet light have no special limitation. Irradiation can be done with the polarized phase being rotated, and irradiation can also be done more than twice after changing the angles of incidence of the polarized ultraviolet rays. Even non-polarized ultraviolet rays may be irradiated at the certain inclination angle from the normal of the substrate as long as practical polarization can be achieved.

The filmed sides of two substrates thus obtained after irradiation with polarized light are positioned to facing each other and thereby aligning the liquid crystal molecules by holding the liquid crystals tightly. The alignment of the liquid crystals thus obtained is heat stable.

BEST MODE FOR CARRYING OUT THE INVENTION

The present invention is described further in more details by showing the examples, references and comparative examples, but the invention is not limited to the particular embodiments described herein.

EXAMPLE 1–3

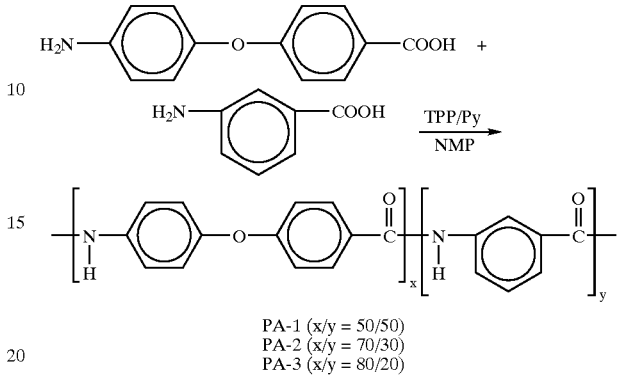

PA-1 (x/y = 50/50)
PA-2 (x/y = 70/30)
PA-3 (x/y = 80/20)

Under nitrogen gas atmosphere, 4-(4-aminophenoxy) benzoic acid (abbreviated as APBA hereafter) and m-amino benzoic acid (abbreviated as MABA hereafter) are mixed together to respective fixed molar ratio, and N-methylpyrrolidone (abbreviated as NMP hereafter) and 1.2 equivalent of pyridine based on total monomer as well as 1.2 equivalent of triphenyl phosphite (abbreviated as Py hereafter) are added, and stirred for the predetermined time after heated to 100° C. Monomer used and described above, amounts of reagent chemicals and solvents, and reaction time are summarized in Table 1 below. Obtained reaction solution is diluted to 7% as to the total solid with the addition of NMP, and then the mixture is poured into excess methanol and polymer precipitated were filtered and dried. The procedures above were repeated, purified, and each polyamide shown in the structural formulas PA-1 to PA-3 above were obtained. Yield of obtained polyamide, number-average molecular weight and weight-average molecular weight obtained through the gel permeation chromatography are shown in Table 2.

TABLE 1

| Example | Amount of APBA g (mmol) | Amount of MABA g (mmol) | Amount of Py ml | Amount of TPP ml | Amount of NMP ml | Reaction time hr |
|---|---|---|---|---|---|---|
| 1 | 27.507 (120) | 16.457 (120) | 23.29 | 75.47 | 146.56 | 10 |
| 2 | 0.4814 (2.1) | 0.1234 (0.9) | 0.29 | 0.94 | 1.96 | 8 |
| 3 | 0.5501 (2.4) | 0.0823 (0.6) | 0.29 | 0.94 | 2.12 | 8 |

TABLE 2

| Example | Polymer No. | Polymer yield (g) | Number-average molecular weight | Weight-average molecular weight |
|---|---|---|---|---|
| 1 | PA-1 | 33.28 | $3.08 \times 10^4$ | $5.59 \times 10^4$ |
| 2 | PA-2 | 0.54 | $2.11 \times 10^4$ | $3.96 \times 10^4$ |
| 3 | PA-3 | 0.55 | $1.85 \times 10^4$ | $3.87 \times 10^4$ |

EXAMPLE 4

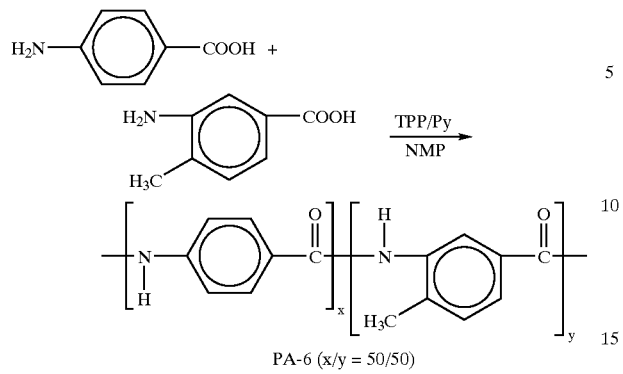

PA-6 (x/y = 50/50)

Under nitrogen gas atmosphere, 0.92 g (4 mmol) of APBA and 0.60 g (4 mmol) of 4-methyl-m-aminobenzoic acid (abbreviated as Me-MABA hereafter) were dissolved in 4.75 ml of NMP, and 0.78 ml of Py and 2.52 ml of TPP were added into, this liquid solution and stirred for 19 hours after heated to 100° C. Obtained reaction liquid solution was diluted with 11.6 ml of NMP and poured into excess methanol, and polymer precipitated were filtered and dried. The procedures above were repeated and purified, and 1.49 g of polyamide shown in the structural formula PA-4 above was obtained. Number-average molecular weight and weight-average molecular weight of PA-4 obtained through the gel permeation chromatography were $1.06 \times 10^4$ and $1.89 \times 10^4$, respectively.

EXAMPLE 5

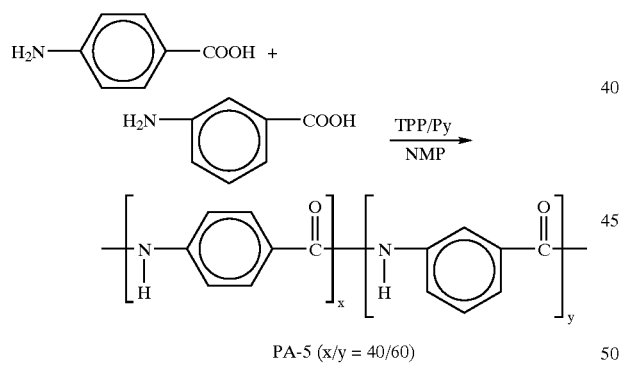

PA-5 (x/y = 40/60)

Under argon gas atmosphere, 0.20 g (1.458 mmol) of p-amino benzoic acid (abbreviated as PABA hereafter) and 0.30 g (2.188 mmol) of MABA were dissolved in 1.31 ml of NMP, and 0.31 ml of Py and 1.00 ml of TPP were added into this liquid solution and stirred for 18 hours after heated to 100° C. The reaction liquid solution thus obtained was diluted with 4 ml of NMP and then poured into 50 ml of excess methanol, and polymer precipitated were filtered and dried. The procedures above were repeated and purified, and 0.412 g of polyamide shown in the structural formula PA-5 was obtained. Number-average molecular weight and weight-average molecular weight of PA-5 obtained through the gel permeation chromatography were $6.74 \times 10^3$ and $1.26 \times 10^4$, respectively.

EXAMPLE 6

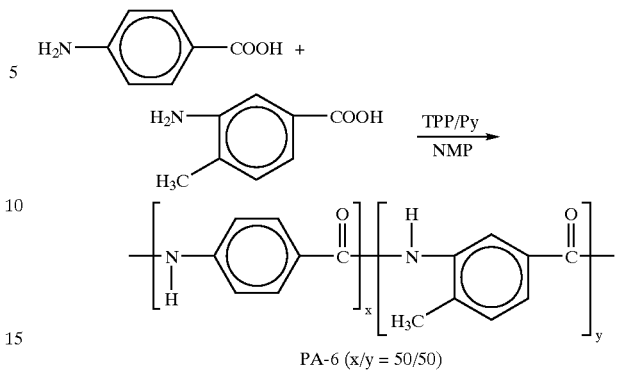

PA-6 (x/y = 50/50)

Under argon gas atmosphere, 0.27 9 (2.0 mmol of PABA and 0.30 9 (2.0 mmol) of Me-MABA were dissolved in 1.33 ml of NMP, and 0.39 ml of Py and 1.26 ml of TPP were added into this liquid solution and stirred for 18 hours after heated to 100° C. Reaction liquid solution thus obtained was diluted with 4 ml of NMP and then poured into 50 ml of excess methanol, and polymer precipitated were filtered and dried. The procedures above were repeated and purified, and 0.480 g of polyamide shown in the structural formula PA-6 above was obtained. Number-average molecular weight and weight-average molecular weight of PA-6 obtained through the gel permeation chromatography were $7.56 \times 10^3$ and $2.52 \times 10^4$, respectively.

EXAMPLE 7

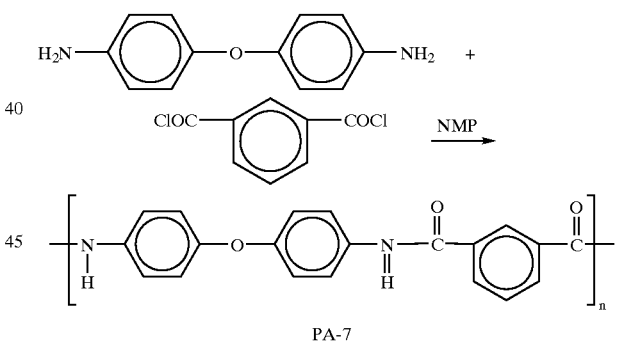

PA-7

Under argon gas atmosphere, 2.03 g (10.0 mmol) of isophthalic acid dichloride and 2.00 g (10.0 mmol) of 4,4'-diaminodiphenylether were each dissolved to the concentration of 1.0 mol/l in NMP and mixed at −78° C. and frozen. The liquid solution was then gradually heated to room temperature to melt and stirred for 30 minutes at room temperature. Reaction liquid solution thus obtained was diluted with 30 ml of NMP and then poured into excess methanol, and polymer precipitated were filtered and dried. The procedures described above were repeated and purified, and 3.85 g of polyamide shown in the structural formula PA-7 was obtained. Number-average molecular weight and weight-average molecular weight of PA-7 obtained through the gel permeation chromatography were $1.40 \times 10^4$ and $2.90 \times 10^4$, respectively.

EXAMPLE 8

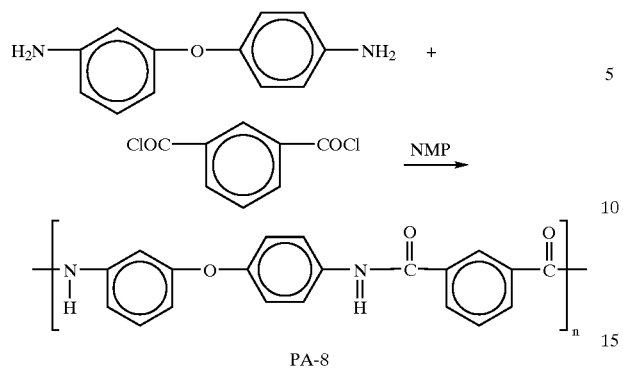

PA-8

Under argon gas atmosphere, 2.03 g (10.0 mmol) of isophthalic acid dichloride and 2.00 g (10.0 mmol) of 3,4'-diaminodiphenylether were each dissolved to the concentration of 1.0 mol/l in NMP, and mixed at −78° C. and frozen. The liquid solution was then gradually heated to room temperature to melt and stirred for 15 minutes at room temperature. Reaction liquid solution thus obtained was diluted with 30 ml of NMP and then poured into excess methanol, and polymer precipitated were filtered and dried. The procedures described above were repeated and purified, and 3.82 g of polyamide shown in the structural formula PA-8 was obtained. Number-average molecular weight and weight-average molecular weight of PA-8 obtained through the gel permeation chromatography were $1.32 \times 10^4$ and $2.98 \times 10^4$, respectively.

EXAMPLE 9

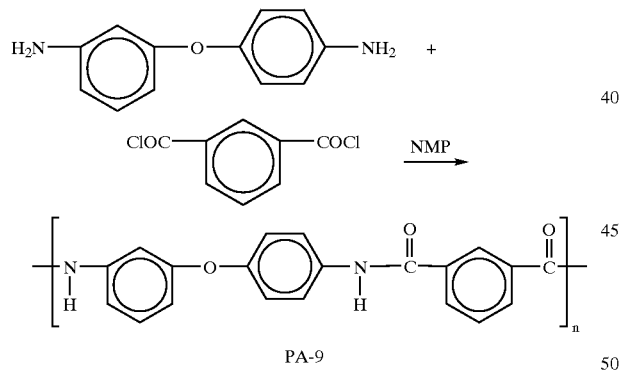

PA-9

Under argon gas atmosphere, 2.03 g (10.0 mmol) of isophthalic acid dichloride and 2.00 g (10.0 mmol) of 3,4'-diaminodiphenylether were each dissolved to the concentration of 1.0 mol/l in NMP, and mixed at −78° C. and frozen. The liquid solution was then gradually heated to room temperature to melt and stirred for one hour at room temperature. Reaction liquid solution thus obtained was diluted with 30 ml of NMP and then poured into excess methanol, and polymer precipitated were filtered and dried. The procedures described above were repeated and purified, and 3.71 g of polyamide shown in the structural formula PA-9 was obtained. Number-average molecular weight and weight-average molecular weight of PA-9 obtained through the gel permeation chromatography were $1.33 \times 10^4$ and $2.59 \times 10^4$, respectively.

EXAMPLE 10

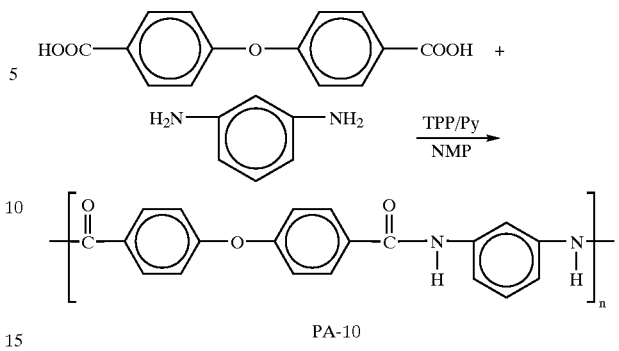

PA-10

Under flowing nitrogen gas, 1.29 g (5.0 mmol) of 4,4'-dicarboxyphenylether and 0.54 g (5.0 mmol) of m-phenylenediamine were dissolved in 5.55 ml of NMP, and 0.97 ml of Py and 3.14 ml of TPP were added into this liquid solution and stirred for 6 hours after heated to 80° C. Obtained reaction liquid solution was diluted with 14 ml of NMP and then poured into excess methanol, and polymer precipitated were filtered and dried. The procedures above were repeated and purified, and 1.72 g of polyamide shown in the structural formula PA-10 above was obtained. Number-average molecular weight and weight-average molecular weight of PA-10 obtained through the gel permeation chromatography were $1.32 \times 10^4$ and $2.88 \times 10^4$, respectively.

EXAMPLE 11

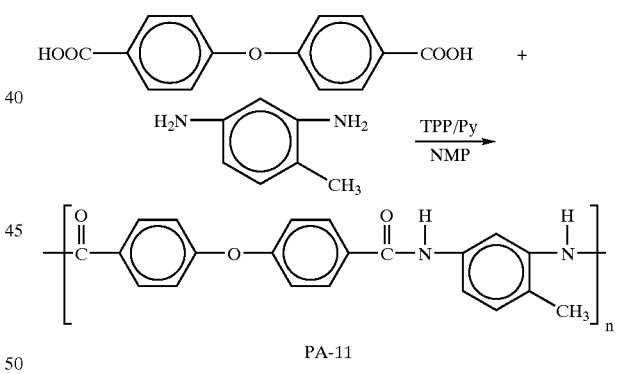

PA-11

Under flowing nitrogen gas, 1.29 9 (5.0 mmol) of 4,4'-dicarboxydiphenylether and 0.61 g (5.0 mmol) of 4-methyl-m-phenylenediamine were dissolved in 6.09 ml of NMP, and 0.97 ml of Py and 3.14 ml of TPP were added into this liquid solution and stirred for 17 hours after heated to 100° C. Obtained reaction liquid solution was diluted with 14.5 ml of NMP and then poured into excess methanol, and polymer precipitated were filtered and dried. The procedures above were repeated and purified, and 1.84 g of polyamide shown in the structural formula PA-11 above was obtained. Number-average molecular weight and weight-average molecular weight of PA-11 obtained through the gel permeation chromatography were $1.24 \times 10^4$ and $2.47 \times 10^4$, respectively.

EXAMPLE 12

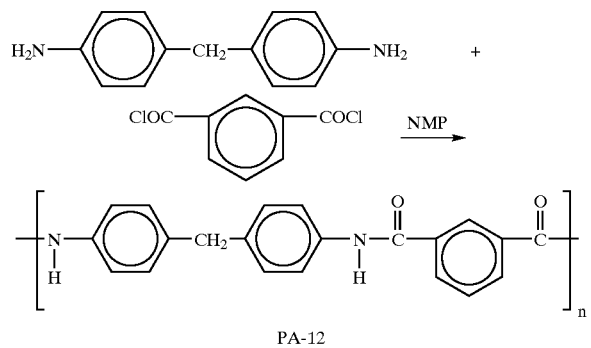

PA-12

Under argon gas atmosphere, 2.03 g (10.0 mmol) of isophthalic acid dichloride and 1.98 g (10.0 mmol) of 4,4'-diaminodiphenylmethane were each dissolved to the concentration of 1.0 mol/l in NMP, and mixed at −78° C. and frozen. The liquid solution was gradually heated to room temperature to melt and stirred for 30 minutes at room temperature. Reaction liquid solution thus obtained was diluted with 30 ml of NMP and then poured into excess methanol, and polymer precipitated were filtered and dried. The procedures described above were repeated and purified, and 3.61 g of polyamide shown in the structural formula PA-12 was obtained. Number-average molecular weight and weight-average molecular weight of PA-12 obtained through the gel permeation chromatography were $3.81 \times 10^3$ and $5.41 \times 10^3$, respectively.

EXAMPLE 13

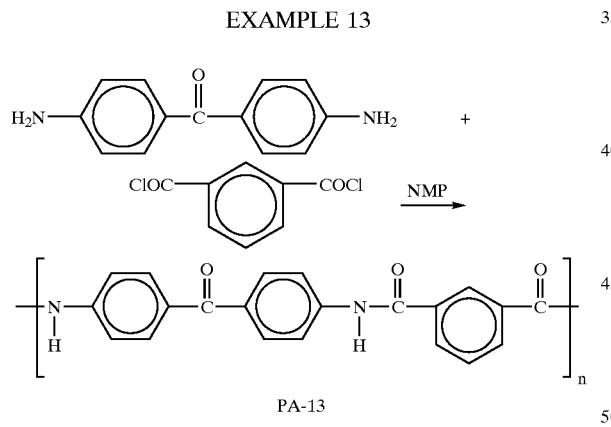

PA-13

Under argon gas atmosphere, 2.03 g (10.0 mmol) of isophthalic acid dichloride and 2.12 g (10.0 mmol) of 4,4'-diaminobenzophenone were each dissolved to the concentration of 1.0 mol/l in NMP, and mixed at −78° C and frozen. The liquid solution was gradually heated to room temperature to melt and stirred for 30 minutes at room temperature. Reaction liquid solution thus obtained was diluted with 32 ml of NMP and then poured into excess methanol, and polymer precipitated were filtered and dried. The procedures described above were repeated and purified, and 3.90 g of polyamide shown in the structural formula PA-13 was obtained. Number-average molecular weight and weight-average molecular weight of PA-13 obtained through the gel permeation chromatography were $3.31 \times 10^3$ and $5.55 \times 10^3$, respectively.

EXAMPLE 14

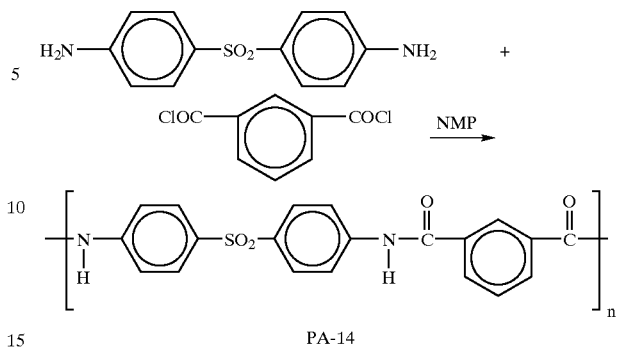

PA-14

Under argon gas atmosphere, 2.03 g (10.0 mmol) of isophthalic acid dichloride and 2.48 g (10.0 mmol) of 4,4'-diaminodiphenylsulfone were each dissolved to the concentration of 1.0 mol/l in NMP, and mixed at −78° C. and frozen. The liquid solution was gradually heated to room temperature to melt and stirred for three hours at room temperature. Reaction liquid solution thus obtained was diluted with 35 ml of NMP and then poured into excess methanol, and polymer precipitated were filtered and dried. The procedures described above were repeated and purified, and 4.19 g of polyamide shown in the structural formula PA-14 was obtained. Number-average molecular weight and weight-average molecular weight of PA-14 obtained through the gel permeation chromatography were $3.98 \times 10^3$ and $8.18 \times 10^3$, respectively.

EXAMPLE 15

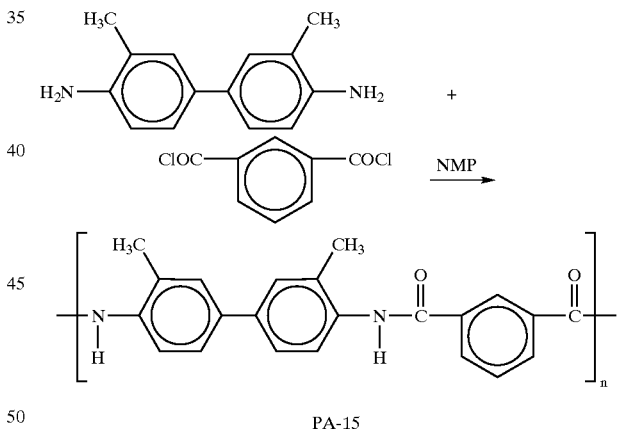

PA-15

Under argon gas atmosphere, 4.06 g (20.0 mmol) of isophthalic acid dichloride and 4.25 g (20.0 mmol) of 3,3'-dimethyl-4,4'-diaminobiphenyl were each dissolved to the concentration of 1.0 mol/l in NMP, and mixed at −78° C. and frozen. The liquid solution was then gradually heated to room temperature to melt and stirred for 30 minutes at room temperature. Reaction liquid solution thus obtained was diluted with 64 ml of NMP and then poured into excess methanol, and polymer precipitated were filtered and dried. The procedures described above were repeated and purified, and 7.65 9 of polyamide shown in the structural formula PA-15 was obtained. Number-average molecular weight and weight-average molecular weight of PA-15 obtained through the gel permeation chromatography were $6.67 \times 10^3$ and $1.23 \times 10^4$, respectively.

EXAMPLE 16

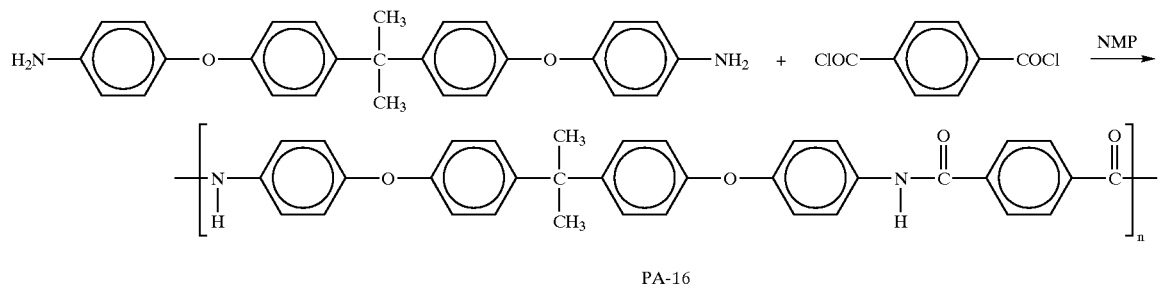

PA-16

Under argon gas atmosphere, 2.03 g (10.0 mmol) of terephthalic acid dichloride and 4.10 g (10.0 mmol) of 2,2-bis [4-(4-aminophenoxy) phenyl] propane were each dissolved to the concentration of 1.0 mol/l in, NMP, and mixed at −78° C. and frozen. The liquid solution was then gradually heated to room temperature to melt and stirred for one hour at room temperature. Reaction liquid solution thus obtained was diluted with 47 ml of NMP and then poured into excess methanol, and polymer precipitated were filtered and dried. The procedures described above were repeated and purified, and 5.58 g of polyamide shown in the structural formula PA-16 was obtained. Number-average molecular weight and weight-average molecular weight of PA-16 obtained through the gel permeation chromatography were $4.42 \times 10^4$ and $8.17 \times 10^4$, respectively.

EXAMPLE 17

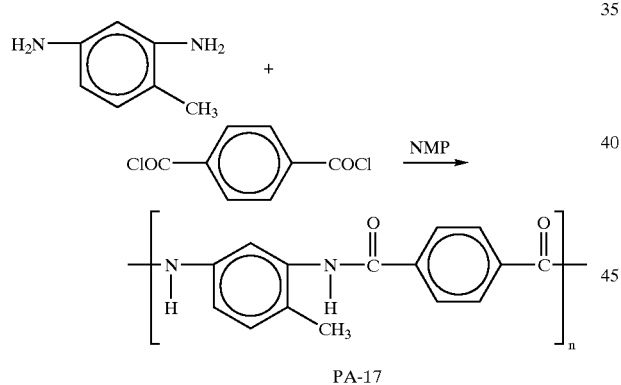

PA-17

Under argon gas atmosphere, 2.03 g (10.0 mmol) of terephthalic acid dichloride and 1.22 g (10.0 mmol) of 4-methyl-m-phenylenediamine were each dissolved to the concentration of 1.0 mol/l in NMP, and mixed at −78° C. and frozen. The liquid solution was then gradually heated to room temperature to melt and stirred for one hour at room temperature. Reaction liquid solution thus obtained was diluted with 25 ml of NMP and then poured into excess methanol, and polymer precipitated were filtered and dried. The procedures described above were repeated and purified, and 2.99 g of polyamide shown in the structural formula PA-17 was obtained. Number-average molecular weight and weight-average molecular weight of PA-17 obtained through the gel permeation chromatography were $9.33 \times 10^3$ and $1.74 \times 10^4$, respectively.

EXAMPLE 18

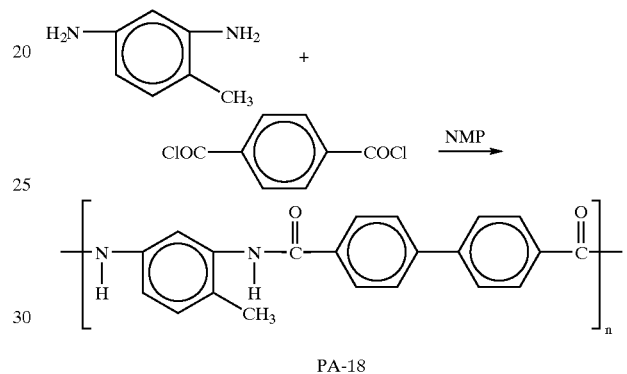

PA-18

Under argon gas atmosphere, 2.79 g (10.0 mmol) of 4,4'-di (chlorocarbonyl) biphenyl and 1.22 g (10.0 mmol) of 4-methyl-m-phenylenediamine were each dissolved to the concentration of 1.0 mol/l in NMP, and mixed at −78° C. and frozen. The liquid solution was then gradually heated to room temperature to melt and stirred for 30 minutes at room temperature. Reaction liquid solution thus obtained was diluted with 30 ml of NMP and then poured into excess methanol, and polymer precipitated were filtered and dried. The procedures described above were repeated and purified, and 3.73 g of polyamide shown in the structural formula PA-18 was obtained. Number-average molecular weight and weight-average molecular weight of PA-18 obtained through the gel permeation chromatography were $5.04 \times 10^3$ and $8.61 \times 10^3$, respectively.

EXAMPLE 19

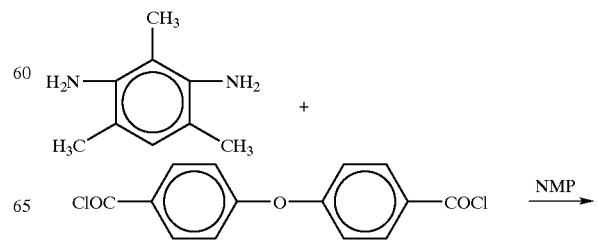

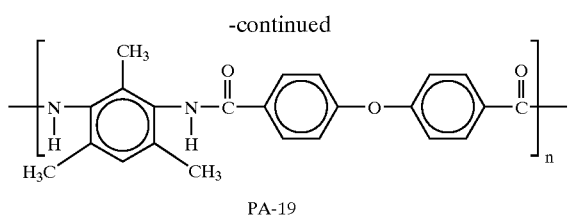

PA-19

Under argon gas atmosphere, 2.95 9 (10.0 mmol) of 4,4[1]-di (chlorocarbonyl) diphenylether and 1.50 g (10.0 mmol) of 2,4,6-trimethyl-m-phenylenediamine were each dissolved to the concentration of 1.0 mol/l in NMP, and mixed at −78° C. and frozen. The liquid solution was then gradually heated to room temperature to melt and stirred for one hour at room temperature. Reaction liquid solution thus obtained was diluted with 35 ml of NMP and then poured into excess methanol, and polymer precipitated were filtered and dried. The procedures described above were repeated and purified, and 3.56 g of polyamide shown in the structural formula PA-19 was obtained. -Number-average molecular weight and weight-average molecular weight of PA-19 obtained through the gel permeation chromatography were $9.48 \times 10^3$ and $1.55 \times 10^4$, respectively.

Reference 1

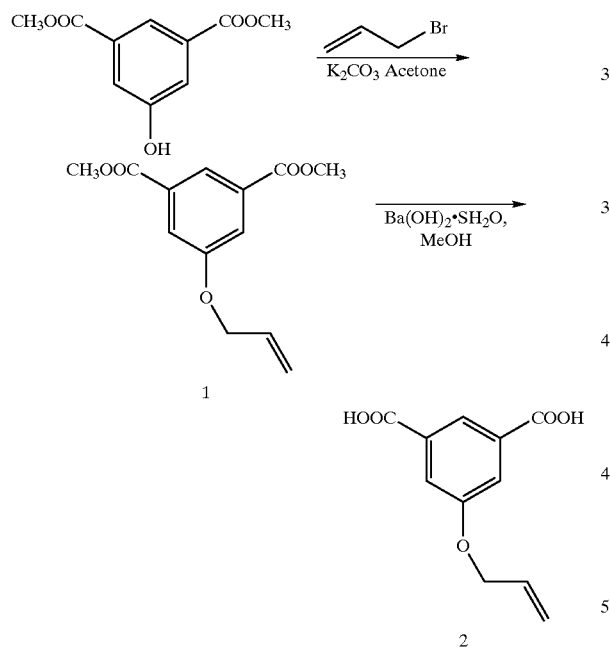

2.400 g (11.42 mmol) of dimethyl 5-hydroxyisophthalic acid, 1.4 g (11.6 mmol) of 3-bromopropene and 1.6 g (11.6 mmol) of potassium carbonate were dispersed in 40 ml of acetone and stirred for 15 hours at reflux temperature. The mixture was cooled to room temperature and filtered off insoluble salts after the addition of 150 ml of diethylether. The filtrate was concentrated and purified through the silicagelcolumn chromatography (developing solvent: diethylether/hexane=½), 2.612 g of dimethyl 5-allyloxyisophthalic acid in water-white solid powder was obtained (yield: 94.1%).

IR (KBr, cm$^{-1}$): 2955 (w), 1736 (s), 1595 (w), 1458 (w), 1437 (w), 1341, 1318 (w), 1252 (s), 1115 (w), 1044, 1011 (w), 928 (w), 876 (w), 756.

$^1$H-NMR δ(250 MHz, CDCl3, ppm): 3.94 (6H, s), 4.6 (2H, dt), 5.4 (2H, m), 6.0 (1H, m), 7.77 (2H, s), 8.3 (1H, s).

1.109 g (4.432 mmol) of dimethyl 5-allyloxyisophthalic acid obtained in the reaction above was dissolved in 50 ml of methanol, and mixed for 2.5 days at room temperature after the addition of 2.8 g (8.9 mmol) of barium hydroxide (octahydrate). Methanol was distilled off after acidification with 1N hydrochloric acid. Precipitate were washed with water after filtering off and 0.924 g of 5-allyloxyisophthalic acid shown in the structural formula 2 above in water-white powder was obtained on drying (Yield: 93.8%).

IR (KBr, cm$^{-1}$): 3100–2500 (br), 1692 (s), 1592, 1462, 1420, 1316, 1277 (s), 1127 (w), 1038, 939, 912, 762, 694.

$^1$H-NMR δ(500 MHz, Acetone-d$_6$, ppm): 4.744 (2H, dt, J=1.5, 5.1 Hz), 5.299 (1H, dd. J=1.5, 10.6 Hz), 5.474 (1H, dd, J=1.7, 17.3 Hz), 6.12 (1H, m), 7.787 (2H, d, J=1.4 Hz), 8.285 (1H, t), 11.5 (1H, bs).

Result of elementary analysis: (Molecular formula: $C_{11}H_{10}O_5$, Molecular weight: 222.20) Calculated value (%); C: 59.46, H: 4.54. Observed value (%): C: 59.53, H: 4.51.

EXAMPLE 20

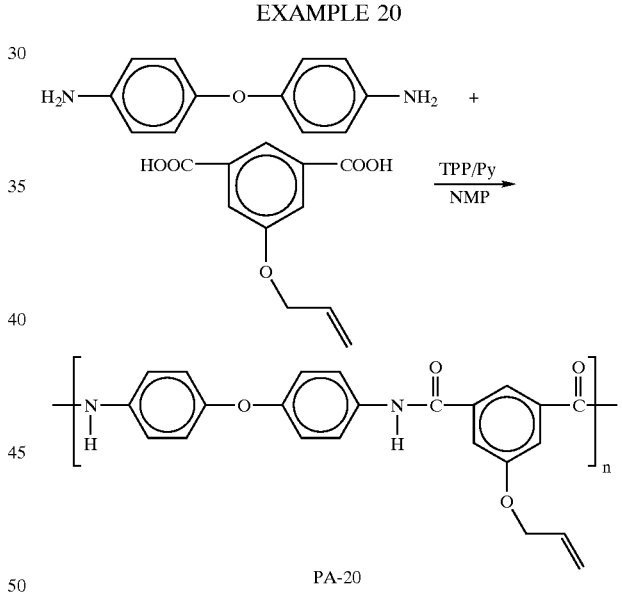

PA-20

Under flowing nitrogen gas, 0.44 g (2.0 mmol) of 5-allyloxyisophthalic acid obtained in Reference 1 above and 0.40 g (2.0 mmol) of 4,4'-diaminodiphenylether were dissolved in 2.84 ml of NMP, and 0.39 ml of Py and 1.26 ml of TPP were added into this liquid solution and stirred for 6 hours after heated to 100° C. Obtained reaction liquid solution was diluted with 6.4 ml of NMP and then poured into excess methanol, and polymer precipitated were filtered and dried. The procedures above were repeated and purified, and 0.80 g of polyamide shown in the structural formula PA-20 above was obtained. Number-average molecular weight and weight-average molecular weight of PA-20 obtained through the gel permeation chromatography were $5.99 \times 10^3$ and $1.33 \times 10^4$, respectively.

EXAMPLE 21

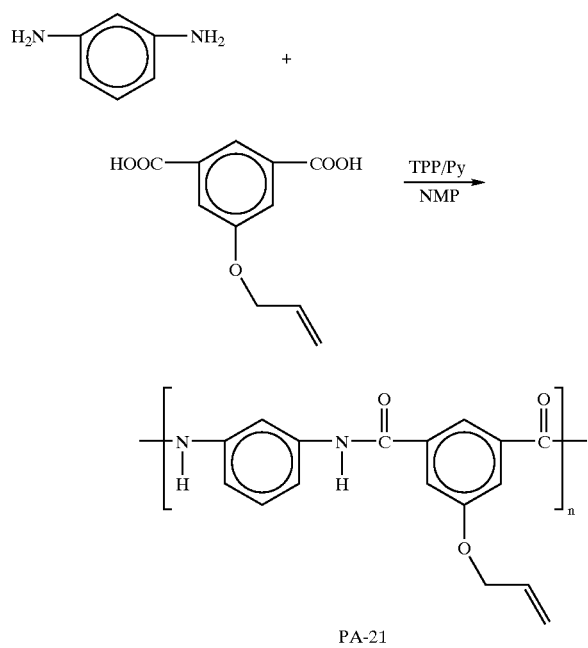

PA-21

Under flowing nitrogen gas, 0.44 g (2.0 mmol) of 5-allyloxyisophthalic acid obtained in Reference 1 above and 0.22 g (20 mmol) of m-phenylenediamine were dissolved in 1.82 ml of NMP, and 0.39 ml of Py and 1.26 ml of TPP were added into this liquid solution and stirred for 6 hours after heated to 100° C. Obtained reaction liquid solution was diluted with 5.0 ml of NMP and then poured into excess methanol, and polymer precipitated were filtered and dried. The procedures above were repeated and purified, and 0.64 g of polyamide shown in the structural formula PA-21 above was obtained. Number-average molecular weight and weight-average molecular weight of PA-21 obtained through the gel permeation chromatography were $8.20 \times 10^3$ and $1.42 \times 10^4$, respectively.

EXAMPLE 22

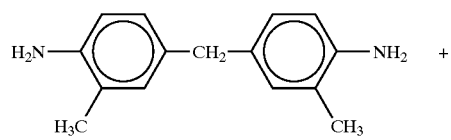

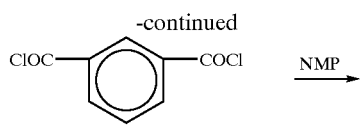

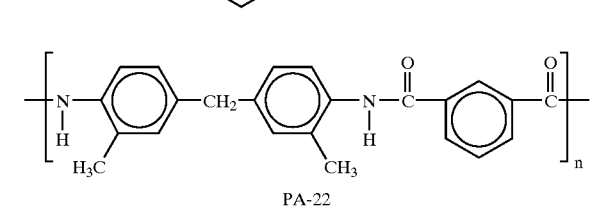

PA-22

Under argon gas atmosphere, 2.03 g (10.0 mmol) of isophthalic acid dichloride and 2.26 g (10.0 mmol) of 3,3'-dimethyl-4,4'-diaminodiphenylmethane were each dissolved to the concentration of 1.0 mol/l in NMP, and mixed at −78° C. and frozen. The liquid solution was then gradually heated to room temperature to melt and stirred for 4 hours at room temperature. Reaction liquid solution thus obtained was diluted with 32 ml of NMP and then poured into excess methanol, and polymer precipitated were filtered and dried. The procedures described above were repeated and purified, and 3.90 g of polyamide shown in the structural formula PA-22 was obtained. Number-average molecular weight and weight-average molecular weight of PA-22 obtained through the gel permeation chromatography were $1.76 \times 10^4$ and $6.71 \times 10^4$, respectively.

EXAMPLE 23

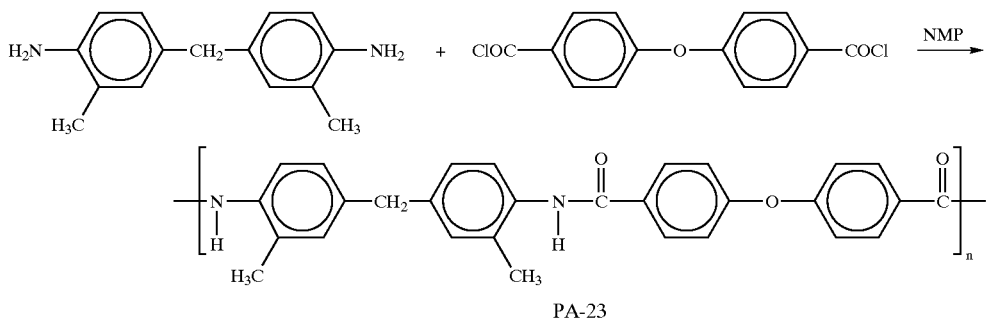

PA-23

Under argon gas atmosphere, 2.95 g (10.0 mmol) of 4,4'-di (chlorocarbonyl) diphenylether and 2.26 g (10.0 mmol) of 3,3'-dimethyl-4,4'-diaminodiphenylmethane were each dissolved to the concentration of 1.0 mol/l in NMP, and mixed at −78° C. and frozen. The liquid solution was then gradually heated to room temperature to melt and stirred for 4 hours at room temperature. Reaction liquid solution thus obtained was diluted with 39 ml of NMP and then poured into excess methanol, and polymer precipitated were filtered and dried. The procedures described above were repeated and purified, and 4.95 g of polyamide shown in the structural formula PA-23 was obtained. Number-average molecular weight and weight-average molecular weight of PA-23 obtained through the gel permeation chromatography were $1.58 \times 10^4$ and $4.01 \times 10^4$, respectively.

EXAMPLE 24

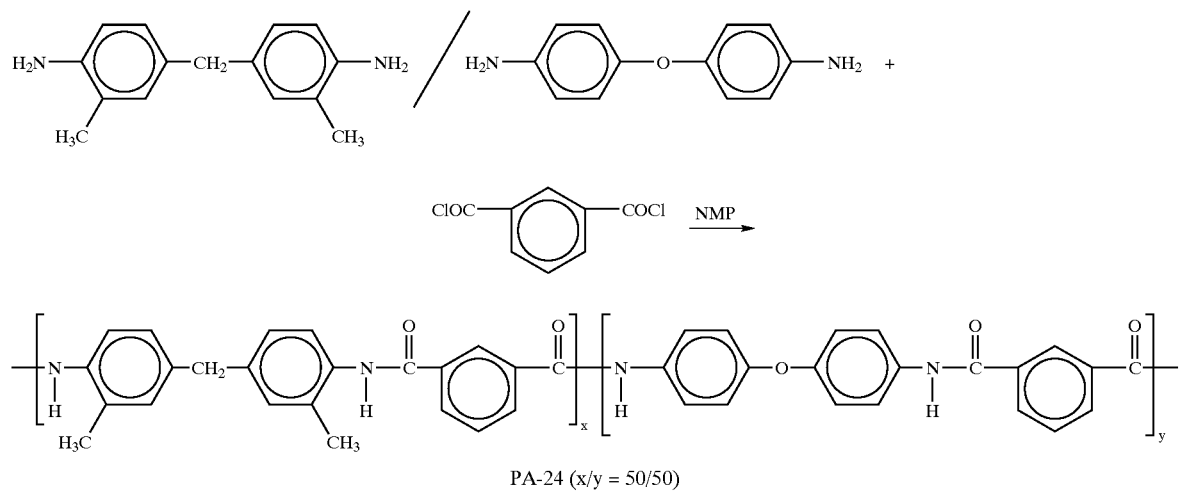

PA-24 (x/y = 50/50)

Under argon gas atmosphere, 2.03 g (10.0 mmol) of isophthalic acid dichloride and 1.13 g (5.0 mmol) of 3,3'-dimethyl-4,4'-diaminodiphenylmethane as well as 1.00 g (5.0 mmol) of 4,4'-diaminodiphenylether were each dissolved to the concentration of 1.0 mol/l in NMP, and mixed at −78° C. and frozen. The liquid solution was then gradually heated to room temperature to melt and stirred for 4 hours at room temperature. Reaction liquid solution thus obtained was diluted with 31 ml of NMP and then poured into excess methanol, and polymer precipitated were filtered and dried. The procedures described above were repeated and purified, and 3.91 g of polyamide shown in the structural formula PA-24 was obtained. Number-average molecular weight and weight-average molecular weight of PA-24 obtained through the gel permeation chromatography were $1.72 \times 10^4$ and $4.39 \times 10^4$, respectively.

5.16 g (3.9 mmol) of 2-amino-4-nitrotoluene was dissolved in 10 ml of NMP, and cooled in an ice bath. 5.00 g (16.9 mmol) of 4,4'-di (chlorocarbonyl) diphenylether dissolved in 20 ml of NMP was added to this solution drop-wise over 20 minutes and further stirred for 1.5 hours while bringing back to room temperature. The liquid solution was poured into 500 ml of ice water and precipitate produced were dispersed in the mixed solvent with 20 ml of NMP and 100 ml of ethanol, washed upon heating and filtered, and 7.38 g of 4.4'-di [N-(2-methyl-5-nitrophenyl) carbonylamino] diphenylether in white powder was obtained (Yield: 82.7%).

IR (KBr, cm$^{-1}$): 3274, 1655 (s), 1595, 1524 (s), 1499, 1476 (w), 1350 (s), 1321, 1252 (s), 1170(w), 1076 (w), 1013 (w), 885 (w), 822 (w), 739 (w), 658 (w).

$^1$H-NMR δ(500 MHz, DMSO-d$_6$, ppm): 2.51 (6H, s), 7.24 (4H, d, J=8.7 Hz), 7.58 (2H, d, J-8.5 Hz), 8.04 (2H, dd, Reference 2

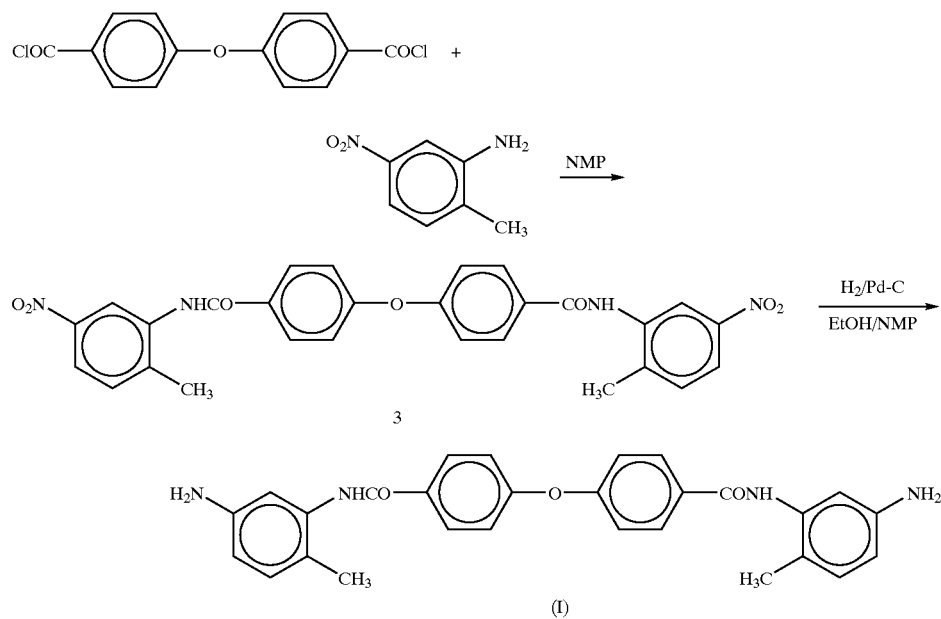

(I)

J=2.4, 8.4 Hz), 8.10 (4H, d, J=8.7 Hz), 8.35 (2H, d, J=2.3 Hz), 10.15 (2H, s).

Result of elementary analysis: (Molecular formula: $C_{28}H_{22}O_7$, Molecular weight: 526.50) Calculated value (%); C: 63.87, H: 4.22, N: 10.64. Observed value (%): C: 63.83, H: 4.15, N: 10.56.

3.00 g (5.70 mmol) of 4,4'-di [N-(2-methyl-5-nitrophenyl) carbonylamino] diphenylether obtained in the reaction above was dissolved into the solvent mixture with 50 ml of ethanol and 80 ml of NMP, and then 0.240 g of 5% Pd carbon powder were dispersed. The mixture was thoroughly deaerated under the reduced pressure at −78° C., and then stirred for 6.5 hours after the system was replaced with hydrogen gas and temperature was brought back to room temperature. Precipitate obtained after removing catalyst with Celite and removing solvent by distillation under the reduced pressure was dispersed in 50 ml of ethanol, washed upon heating at 80° C. and filtered, 2.50 g of 4,4'-di [N-(2-methyl-5-aminophenyl) carbonylamino] diphenylether shown in the structural formula (I) above in white powder was obtained (Yield: 94.0%).

IR (KBr, cm$^{-1}$): 3427, 3345, 3275 (br), 1655 (s), 1601, 1586, 1543 (s), 1505 (s), 1493, 1454, 1327 (w), 1281, 1258 (s), 1169, 1107 (w), 1011 (w), 897 (w), 856 (w), 843, 681.

$^1$H-NMR δ(500 MHz, DMSO-d$_6$, ppm): 2.06 (6H, s), 4.90 (4H, s), 6.40 (2H, dd, J=2.2, 8.1 Hz), 6.60 (2H, d, J=2.1 Hz), 6.88 (2H, d, J=8.1 Hz), 7.17 (4H, d, J=8.7 Hz), 8.03 (4H, d, J=8.7 Hz), 9.63 (2H, s).

Result of elementary analysis: (Molecular formula: $C_{28}H_{26}N_4O_3$, Molecular weight: 466.53) Calculated value (%); C: 69.68, H: 6.28, N: 17.41. Observed value (%) C: 69.90, H: 6.40, N: 17.14.

Experiment 25.

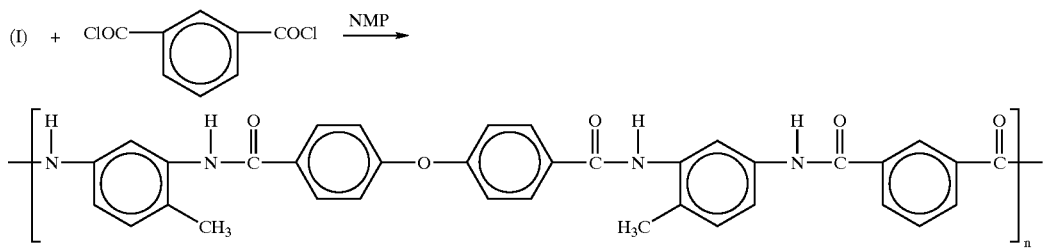

PA-25

Under argon gas atmosphere, 1.02 g (5.0 mmol) of isophthalic acid dichloride and 2.33 g (5.0 mmol) of 4,4'-di [N-(2-methyl-5-aminophenyl) carbonylamino] diphenylether obtained in Reference 2 above were each dissolved to the concentration of 1.0 mol/l in NMP, and mixed at −78° C. and frozen. The liquid solution was then gradually heated to room temperature to melt and stirred for 4 hours at room temperature. Reaction liquid solution thus obtained was diluted with 25.0 ml of NMP and then poured into excess methanol, and polymer precipitated were filtered and dried. The procedures described above were repeated and purified, and 3.15 g of polyamide shown in the structural formula PA-25 was obtained. Number-average molecular weight and weight-average molecular weight of PA-25 obtained through the gel permeation chromatography were 1.61 ×10$^4$ and 3.05×10$^4$, respectively.

Reference 3

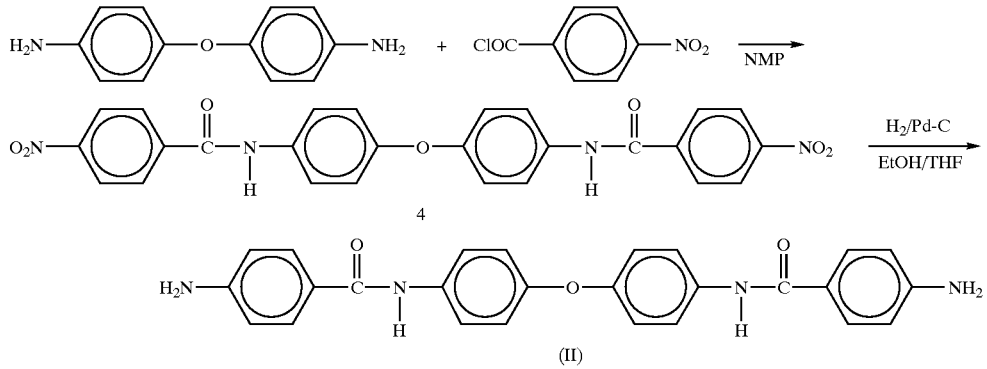

5.00 g (25.0 mmol) of 4,4'-diaminodiphenylether was dissolved in 30 ml of NMP and cooled in an ice bath. 9.78 g (52.7 mmol) of 4-nitrobenzoic acid in 30 ml of NMP was added to the solution by drop-wise over one hour and stirred for two hours while bringing back to room temperature. The solution was poured into 500 ml of ice water and the precipitate produced was recovered and washed thoroughly with water. The precipitate in the solvent mixture of acetic acid/THF was purified by recrystallization, 11.63 g of 4,4'-di (4-nitrobenzamide) diphenylether shown in the structural formula 4 above was obtained in white powder (Yield: 93.4%).

IR (KBr, cm$^{-1}$): 3360, 2924,1649 (s), 1603 (s), 1539 (s), 1507 (s), 1408 (w), 1350, 1327, 1253, 1225, 1096 (w), 1015 (w), 870, 853, 826, 698 (w).

$^1$H-NMR δ(500 MHz, DMSO-d$_6$, ppm): 7.06 (4H, d, J=8.9 Hz), 7.80 (4H, d, J=8.9), 8.19 (4H, d, J=8.8 Hz), 8.38 (4H, d, J=8.8 Hz), 10.61 (2H, s).

Result of elementary analysis: (Molecular formula: C$_{26}$H$_{18}$N$_4$O$_7$, Molecular weight: 498.45) Calculated value (%); C: 62.65, H: 3.65, N: 12.84. Observed value (%): C: 62.60, H: 3.54, N: 12.19.

3.50 9 (7.02 mmol) of 4,4'-di (4-nitrobenzamide) diphenylether was dissolved in the solvent mixture with 100 ml ethanol and 300 ml of THF, and 0.38 g of 5% Pd-carbon powder was dispersed into this solution. The solution was thoroughly deaerated under the reduced pressure at −78° C., and then stirred for 18 hours after the system was replaced with hydrogen gas and temperature was brought back to room temperature. The precipitate obtained after removing catalyst with Celite and removing solvent by the distillation under the reduced pressure was purified by re-crystallization after dissolving in the solvent mixture of ethanol/THF, 2.98 g of 4,4'-di (4-aminobenzamide) diphenylether shown in the structural formula (II) above was obtained in white powder (Yield: 96.8%).

IR (KBr, cm$^{-1}$): 3440, 3347, 3288 (br), 3210, 1609 (s), 1570 (w), 1501 (s), 1406, 1310, 1269, 1223 (s), 1182, 876 (w), 841, 766 (w), 689 (w).

$^1$H NMR δ(500 MHz, DMSO-d$_6$, ppm): 5.73 (4H, s), 6.59 (4H, d, J=8.6 Hz), 6.96 (4H, d, J=9.0 Hz), 7.72 (8H, m), 9.76 (2H, s).

Result of elementary analysis: (Molecular formula: C$_{26}$H$_{22}$N$_4$O$_3$, Molecular weight: 438.48) Calculated value (%); C: 71.21, H: 5.07, N: 14.60. Observed value (%): C: 71.01, H: 5.24, N: 14.33.

EXAMPLE 26

Under argon gas atmosphere, 1.02 g (5.0 mmol) of isophthalic acid dichloride and 2.19 g (5.0 mmol) of 4,4'-di (4-aminobenzamide) diphenylether obtained in Reference 3 shown in the formula (II) above were each dissolved to the concentration of 1.0 mol/l in NMP, and mixed at −78° C. and frozen. The liquid solution was then gradually heated to room temperature to melt and stirred for 4 hours at room temperature. Reaction liquid solution thus obtained was diluted with 24.0 ml of NMP and then poured into excess methanol, and polymer precipitated were filtered and dried. The procedures described above were repeated and purified, and 2.92 g of polyamide shown in the structural formula PA-26 was obtained. Number-average molecular weight and weight-average molecular weight of PA-26 obtained through the gel permeation chromatography were 1.91×10$^4$ and 4.08×10$^4$, respectively.

EXAMPLE 27

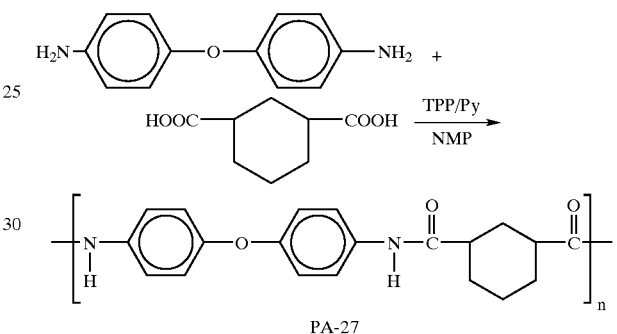

Under flowing nitrogen gas, 1.72 g (10.0 mmol) of 1,3dicarboxycyclohexane and 2.00 g (10.0 mmol) of 4,4'-diaminodiphenylether were dissolved in 24.67 ml of NMP, and 3.56 ml of Py and 7.45 ml of TPP were added into this liquid solution and stirred for 6 hours after heated to 80° C. Obtained reaction liquid solution was diluted with 28 ml of NMP and then poured into excess methanol, and polymer precipitated were filtered and dried. The procedures above were repeated and purified, and 3.15 g of polyamide shown in the structural formula PA-27 above was obtained. Number-average molecular weight and weight-average molecular weight of PA-27 obtained through the gel permeation chromatography were 4.45×10$^4$ and 8.23×10$^4$, respectively.

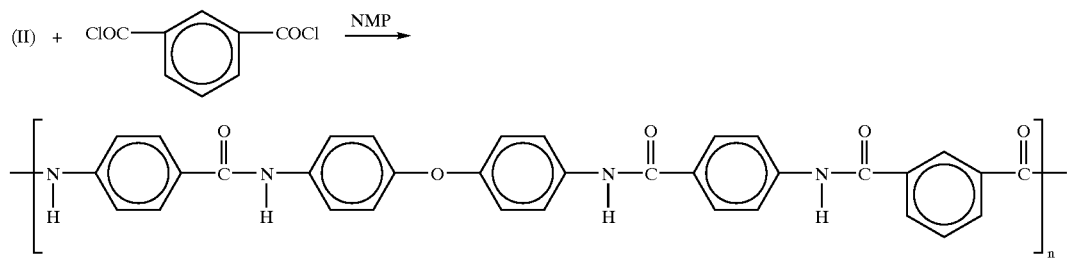

PA-26

EXAMPLE 28

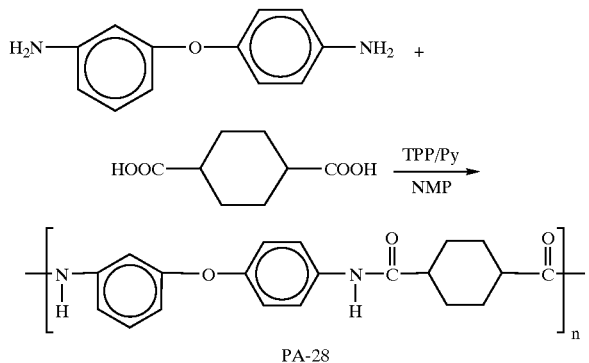

PA-28

Under flowing nitrogen, 1.72 g (10.0 mmol) of 1,4-dicarboxycyclohexane and 2.00 g (10.0 mmol) of 3,4'-diaminodiphenylether were dissolved in 24.67 ml of NMP, and 3.56 ml of Py and 7.45 ml of TPP were added into this liquid solution and stirred for 6 hours after heated to 80° C. Obtained reaction liquid solution was diluted with 28 ml of NMP and then poured into excess methanol, and polymer precipitated were filtered and dried. The procedures above were repeated and purified, and 3.05 g of polyamide shown in the structural formula PA-28 above was obtained. Number-average molecular weight and weight-average molecular weight of PA-28 obtained through the gel permeation chromatography were $2.14 \times 10^4$ and $4.35 \times 10^4$, respectively.

EXAMPLE 29

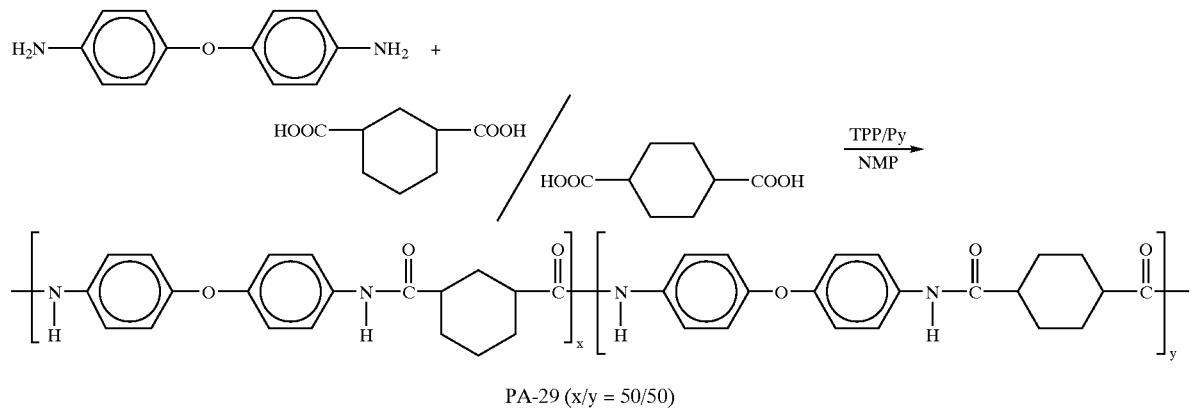

PA-29 (x/y = 50/50)

Under flowing nitrogen gas, 0.86 g (5.0 mmol) of 1,3dicarboxycyclohexane and 0.86 g (5.0 mmol) of 1,4-dicarboxylcyclohexane as well as 2.00 g (10.0 mmol) of 4,4'-diaminodiphenylether were dissolved in 24.67 ml of NMP, and 3.56 ml of Py and 7.45 ml of TPP were added into this liquid solution and stirred for 6 hours after heated to 80° C. Obtained reaction liquid solution was diluted with 28 ml of NMP and then poured into excess methanol, and polymer precipitated were filtered and dried. The procedures above were repeated and purified, and 2.98 g of polyamide shown in the structural formula PA-29 above was obtained. Number-average molecular weight and weight-average molecular weight of PA-29 obtained through the gel permeation chromatography were $3.76 \times 10^4$ and $5.96 \times 10^4$, respectively.

EXAMPLE 30

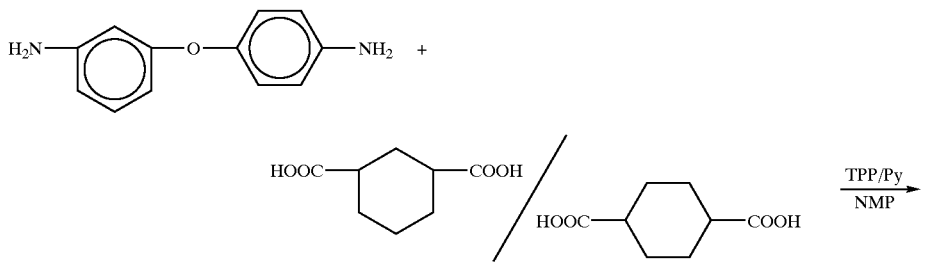

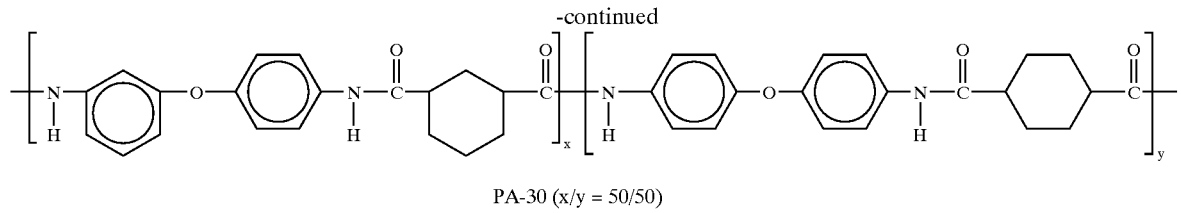

PA-30 (x/y = 50/50)

Under flowing nitrogen gas, 0.86 g (5.0 mmol) of 1,3-dicarboxycyclohexane and 0.86 g (5.0 mmol) of 1,4-dicarboxylcyclohexane as well as 2.00 g (10.0 mmol) of 3,4'-diaminodiphenylether were dissolved in 24.67 ml of NMP, and 3.56 ml of Py and 7.45 ml of TPP were added into this liquid solution and stirred for 6 hours after heated to 80° C. Obtained reaction liquid solution was diluted with 28 ml of NMP and then poured into excess methanol, and polymer precipitated were filtered and dried. The procedures above were repeated and purified, and 2.79 g of polyamide shown in the structural formula PA-30 above was obtained. Number-average molecular weight and weight-average molecular weight of PA-30 obtained through the gel permeation chromatography were $1.87 \times 10^4$ and $4.64 \times 10^4$, respectively.

EXAMPLE 31

Under argon gas atmosphere, 0.30 g of PA-1 obtained in Example 1 was dissolved in 6 ml of dimethylsulfoxide (abbreviated as DMSO hereafter), and 2 ml of 1N potassium hydroxide/methanol solution was added to this solution and stirred for one hour at room temperature. The solution was then stirred for additional 30 minutes at room temperature after the addition of 0.4 ml of iodomethane. The reaction solution thus obtained was poured into excess methanol, and polymer precipitated were filtered and dried to yield 0.27 g of polymer. $^1$H-NMR spectrum of polymer obtained was taken and revealed that the product was polyamide (called PA-31 hereafter) in which 31 mole % of amide radical at N position of the structure shown in PA-1 was substituted with methyl group. Number-average molecular weight and weight-average molecular weight of PA-31 obtained through the gel permeation chromatography were $1.43 \times 10^4$ and $2.96 \times 10^4$, respectively.

EXAMPLE 32

Under argon gas atmosphere, 0.80 g of PA-6 obtained in Example 6 was dissolved in 13 ml of DMSO, and 7 ml of 1N potassium hydroxide/methanol solution was added to this solution and mixed for one hour at room temperature. The solution was then stirred for additional 30 minutes at room temperature after the addition of 1.2 ml of iodomethane. The reaction solution thus obtained was poured into excess methanol, and polymer precipitated were filtered and dried to yield 0.88 g of polymer. $^1$H-NMR spectrum of polymer obtained was taken and revealed that the product was polyamide (called PA-32 hereafter) in which 24 mole % of amide radical at N position of the structure shown in PA-6 was substituted with methyl group. Number-average molecular weight and weight-average molecular weight of PA-32 obtained through the gel permeation chromatography were $5.63 \times 10^3$ and $8.47 \times 10^3$, respectively.

EXAMPLE 33

Under argon gas atmosphere, 110 mg (2.75 mmol) of sodium hydride (oil, 60%) was dispersed in 20 ml of DMSO and light yellow homogeneous solution was obtained after stirring the solution for one hour at 70° C. 0.86 g of polyamide PA-6 obtained in Example 6 was dissolved in the solution and stirred for additional 4 hours at room temperature. The solution was then stirred for additional 15 hours at room temperature after the addition of 0.5 ml of iodomethane (8.03 mmol), the reaction solution thus obtained was poured into excess methanol, and polymer precipitated were filtered and dried to yield 0.69 g of polymer. $^1$H-NMR spectrum of polymer obtained was taken and revealed that the product was polyamide (called PA-33 hereafter) in which 37 mole % of amide radical at N position of the structure shown in PA-6 was substituted with methyl group. Number-average molecular weight and weight-average molecular weight of PA-33 obtained through the gel permeation chromatography were $6.21 \times 10^3$ and $9.34 \times 10^3$, respectively.

Reference 4

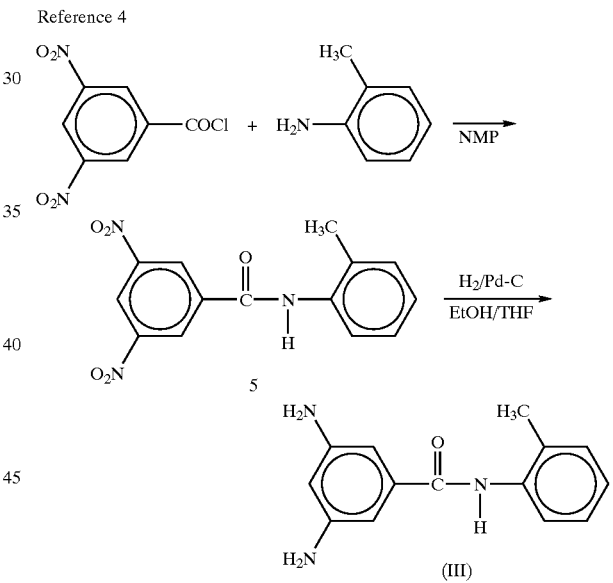

4.788 g (44.68 mmol) of 2-aminotoluene was dissolved in 14 ml of NMP and cooled in an ice bath. 10.3969 (45.10 mmol) of 3,5-dinitro benzoic acid chloride in 30 ml of NMP solution was added to the solution drop-wise over 20 minutes and stirred for additional one hour while bringing back to room temperature. The solution was poured into 500 ml of water and precipitate produced was recovered and washed thoroughly with water. The precipitate in the solvent mixture of chloroform/THF was purified by re-crystallization, and 10.20 g of 3,5dinitro-2'-methylbenzanilide shown in the structural formula 5 above was obtained in yellow needle shaped crystal (Yield: 75.8%).

IR (KBr, cm$^{-1}$): 3256, 3104, 1649 (s), 1586 (w), 1537 (s), 1491 (w), 1456, 1343 (s), 1312, 1275, 1165 (w), 1076, 914, 762, 729, 706.

$^1$H-NMR δ(500 MHz, DMSO-d$_6$, ppm): 2.26 (3H, s), 7.25 (2H, m), 7.34 (2H, m), 9.02 (1H, t, J=2.0 Hz), 9.17 (2H, d, J=1.9 Hz), 10.61 (1H, s).

Result of elementary analysis: (Molecular formula: $C_{14}H_{11}N_3O_5$, Molecular weight: 301.25) Calculated value (%); C: 55.81, H: 3.69, N: 13.94. Observed value (%): C: 55.94, H: 3.53, N: 13.83.

7.00 g (23.3 mmol) of 3,5-dinitro-2'-methylbenzanilide obtained in the reaction above was dissolved in the solvent mixture with 200 ml ethanol and 150 ml of THF, and 0.938 g of 5% Pd-carbon powder was dispersed in this solution. The solution was thoroughly deaerated under the reduced pressure at −78° C., and then stirred for 17 hours after the system was replaced with hydrogen gas and temperature was brought back to room temperature. Precipitate obtained after removing catalyst with Celite and concentrating was dispersed in ethyl acetate, washed and filtered, and 5.52 g of 3,5diamino-2'-methylbenzanilide shown in the structural formula (III) above in white powder was obtained (Yield: 98.4%).

IR (KBr, cm$^{-1}$): 3455, 3401, 3328 (s), 3237 (br), 2924 (s), 2855, 1634 (s), 1593 (s), 1512 (s), 1491 (s), 1368, 1273, 1198, 1117 (w), 992 (w), 839, 758, 683, 610.

$^1$H-NMR δ(500 MHz, DMSO-d$_6$, ppm): 2.21 (3H, s), 4.91 (2H, s), 5.99(1H, t, J=1.9 Hz), 6.33 (2H, d, J=1.9 Hz), 7.11 (1H, m), 7.18 (1H, m), 7.23 (1H, d. J=7.4 Hz), 7.32 (1H, d, J=7.3 Hz), 9.40(1H, s).

Result of elementary analysis: (Molecular formula: $C_{14}H_{15}N_3O$, Molecular weight: 241.29) Calculated value (%); C: 69.68, H: 6.28, N: 17.41. Observed value (%): C: 69.69, H: 6.41, N: 16.99.

EXAMPLE 34

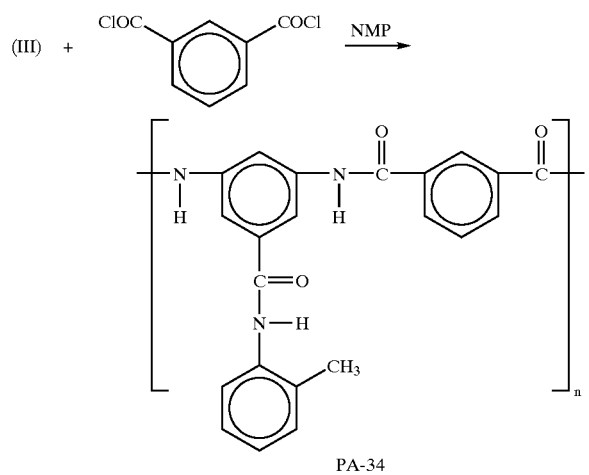

PA-34

Under argon gas atmosphere, 1.02 g (5.0 mmol) of isophthalic acid dichloride and 1.20 g (5.0 mmol) of 3,5-diamino-2'-methylbenzanilide obtained in Reference 4 shown in the formula (III) above were each dissolved to the concentration of 1.0 mol/l in NMP, and mixed at −78° C. and frozen. The liquid solution was then gradually heated to room temperature to melt and stirred for 4 hours at room temperature. Reaction liquid solution thus obtained was diluted with 17 ml of NMP and then poured into excess methanol, and polymer precipitated were filtered and dried. The procedures described above were repeated and purified, and 2.11 g of polyamide shown in the structural formula PA-34 was obtained. Number-average molecular weight and weight-average molecular weight of PA-34 obtained through the gel permeation chromatography were 2.43×10$^4$ and 4.45×10$^4$, respectively.

EXAMPLE 35

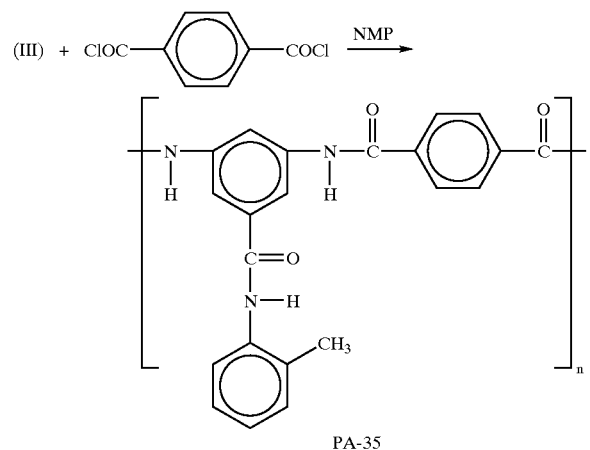

PA-35

Under argon gas atmosphere, 1.02 g (5.0 mmol) of terephthalic acid dichloride and 1.20 g (5.0 mmol) of 3,5-diamino-2'-methylbenzanilide obtained in Reference 4 shown in the formula (III) above were each dissolved to the concentration of 1.0 mol/l in NMP, and mixed at −78° C. and frozen. The liquid solution was then gradually heated to room temperature to melt and stirred for one hour at room temperature. Reaction liquid solution thus obtained was diluted with 17 ml of NMP and then poured into excess methanol, and polymer precipitated were filtered and dried. The procedures described above were repeated and purified, and 2.15 g of polyamide shown in the structural formula PA-35 was obtained. Number-average molecular weight and weight-average molecular weight of PA-35 obtained through the gel permeation chromatography were 1.57×10$^4$ and 3.63×10$_4$, respectively.

EXAMPLE 36

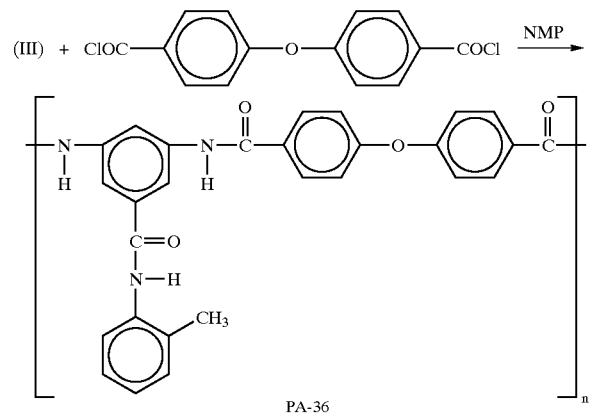

PA-36

Under argon gas atmosphere, 1.48 g (5.0 mmol) of 4,4'-di (chlorocarbonyl) diphenylether and 1.20 g (5.0 mmol) of 3,5-diamino-2'-methylbenzanilide obtained in Reference 4 shown in the formula (III) above were each dissolved to the concentration of 1.0 mol/l in NMP, and mixed at −78° C. and frozen. The liquid solution was then gradually heated to room temperature to melt and stirred for one hour at room temperature. Reaction liquid solution thus obtained was diluted with 19 ml of NMP and then poured into excess methanol, and polymer precipitated were filtered and dried. The procedures described above were repeated and purified, and 2.63 g of polyamide shown in the structural formula PA-36 was obtained. Number-average molecular weight and weight-average molecular weight of PA-36 obtained through the gel permeation chromatography were $2.24 \times 10^4$ and $4.28 \times 10^4$, respectively.

Reference 5

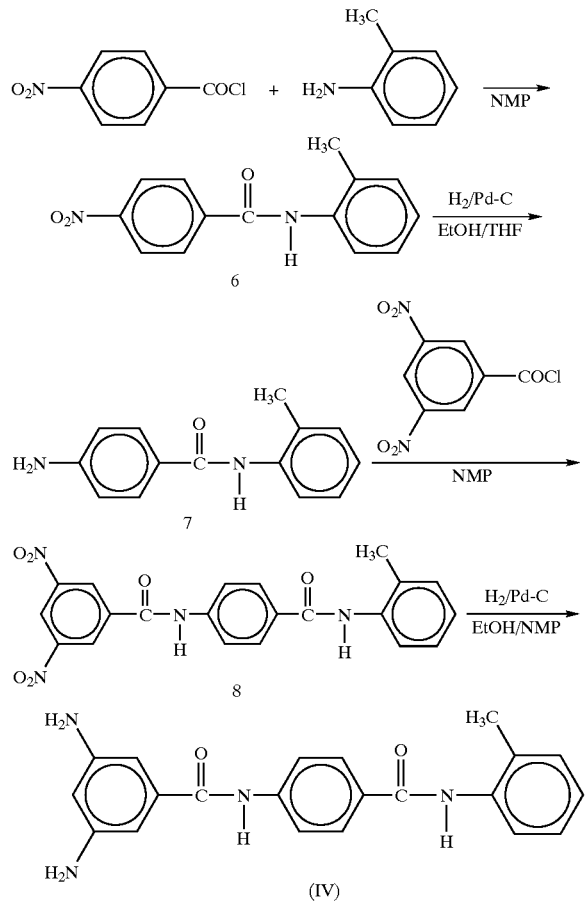

1.743 g (16.10 mmol) of 2-aminotoluene was dissolved in 6 ml of NMP and cooled in an ice bath. 3.019 g (16.27 mmol) of 4-nitrobenzoic acid chloride in 10 ml of NMP solution was added to the solution drop-wise over 5 minutes and stirred for additional 30 minutes while bringing back to room temperature. The solution was poured into 500 ml of water and precipitate produced was recovered and washed thoroughly with water. The dried precipitate was purified through the silica gel chromatography (developing solvent: chloroform) and then re-crystallized from the solvent mixture of chloroform/hexane, and 3.604 g of 4-nitro-2'-methylbenzanilide shown in the structural formula 6 above was obtained in yellow needle shaped crystal (Yield: 87.4%).

IR (KBr, cm$^{-1}$): 3304, 1649, 1603 (w), 1586 (w), 1520 (s), 1454, 1343, 1308, 1109 (w), 856 (w), 841 (w), 758, 710 (w).

$^1$H-NMR δ(250 MHz, CDCl$_3$, ppm): 2.35 (3H, s), 7.18 (1H, m), 7.29 (2H, m), 7.7 (1H, bs), 7.9 (1H, bd), 8.05 (2H; d), 8.36 (2H, d).

3.00 g (11.7 mmol) of 4-nitro-2'-methylbenzanilide obtained in the reaction above was dissolved in the solvent mixture with 20 ml ethanol and 20 ml of THF, and 0.25 g of 5% Pd-carbon powder was dispersed in this solution. The solution was thoroughly deaerated under the reduced pressure at −78° C., and then stirred for 18 hours after the system was replaced with hydrogen gas and temperature was brought back to room temperature. Precipitate obtained after removing catalyst with Celite and concentrating yielded 2.51 g of 4-amino-2'-methylbenzanilide shown in the structural formula 7 above in light brown solid (Yield: 95.5%).

IR (KBr, cm$^{-1}$): 3476 (w), 3349, 3289 (w), 1624 (s), 1603, 1568 (w), 1526 (w), 1501 (s), 1453 (w), 1292, 1271, 1182, 843 (w), 747, 588 (w).

$^1$H-NMR δ(250 MHz, CDCl$_3$, ppm): 2.33 (3H, s), 4.03 (2H, bs), 6.71 (2H, d), 7.1 (1H, m), 7.2 (2H, m), 7.6 (1H, bs), 7.72 (2H, d)., 7.95 (1H, d).

4.76 g (21.0 mmol) of 4-amino-2'-methylbenzanilide obtained above was dissolved in 20 ml of NMP and cooled in an ice bath. 4.86 g (21.1 mmol) of 3,5-dinitro benzoic acid chloride in 10 ml of NMP solution was added to the solution drop-wise. The solution was stirred for 30 minutes while bringing back to room temperature and then poured into 800 ml of ice water. Precipitate produced was recovered by filtration and washed thoroughly with water, and dispersed in 600 ml of sodium hydrogen carbonate solution. Again precipitate was filtered and washed thoroughly. The precipitate obtained was dispersed in the solvent mixture with 50 ml of NMP and 150 ml of ethanol, washed by heating and filtered, and 7.30 g of 3,5-dinitro-4'-[N-(2-methylphenyl) carbamoyl] benzanilide shown in the structural formula 8 above were obtained in white powder (Yield: 82.3%).

IR (KBr, cm$^{-1}$): 3461, 3308, 3090 (w), 1684, 1651 (s), 1597, 1535 (s), 1454, 1400 (w), 1345, 1319, 1273, 1190 (w), 916 (w), 858 (w), 764,731, 588 (w)

$^1$H-NMR δ(500 MHz, DMSO-d$_6$, ppm): 2.26 (3H, s), 7.12 (1H, m), 7.22 (1H, m), 7.28 (1H, d, J=7.3 Hz), 7.36 (1H, t, J=7.3 Hz), 7.95 (2H, d, J=8.7 Hz), 8.05 (2 H, d J=8.7 Hz), 9.04 (1H, t, J=2.1 Hz), 9.21 (2H, d, J=2.0 Hz), 9.84 (1H, s), 11.07 (1H, s).

Result of elementary analysis: (Molecular formula: C$_{21}$H$_{16}$N$_4$O$_6$, Molecular weight: 420.38) Calculated value (%); C: 59.99, H: 3.84, N: 13.32. Observed value (%): C: 59.85, H: 3.73, N: 13.27.

5.00 g (11.9 mmol) of 3,5-dinitro-4'-[N-(2-methylphenyl) carbamoyl] benzanilide obtained in the reaction above was dissolved in the solvent mixture with 100 ml ethanol and 200 ml of NMP, and 0.500 g of 5% Pd-carbon powder was dispersed in this solution. The solution was thoroughly deaerated under the reduced pressure at −78° C., and then stirred for 6 hours after the system was replaced with hydrogen gas and temperature was brought back to room temperature. Precipitate obtained after removing catalyst with Celite and removing solvent by distillation under the reduced pressure was dispersed in the solvent mixture with 50 ml of ethyl acetate and 150 ml of ethanol, washed and filtered, and 4.03 g of 3,5-diamino-4'-[N-(2-methylphenyl) carbamoyl] benzanilide shown in the structural formula (IV) above was obtained in white powder (Yield: 94.0%).

IR (KBr, cm$^{-1}$): 3410, 3324 (br), 3218, 1645 (s), 1591 (s), 1518 (s), 1460, 1402, 1362, 1318, 1252, 1192 (w), 853, 750, 689 (w).

$^1$H-NMR δ(500 MHz, DMSO-d$_6$, ppm): 2.24 (3H, s), 4.95 (4H, s), 6.02 (1H, t, J=1.9 Hz), 6.32 (2H, d, J=1.9 Hz), 7.15 (1H, m), 7.21 (1H, m), 7.26 (1H, d, J=7.2 Hz), 7.34 (1H, d, J=7.3 Hz), 7.89 (2H, d, J=8.8 Hz), 7.95 (2H, d, J=8.8 Hz), 9.72 (1H, s), 10.19 (1H, s).

Result of elementary analysis: (Molecular formula: C$_{21}$H$_{20}$N$_4$O$_2$, Molecular weight: 360.41) Calculated value (%) C: 69.98, H: 5.59, N: 15.54. Observed value (%): C: 69.47, H: 5.66, N: 15.36.

EXAMPLE 37

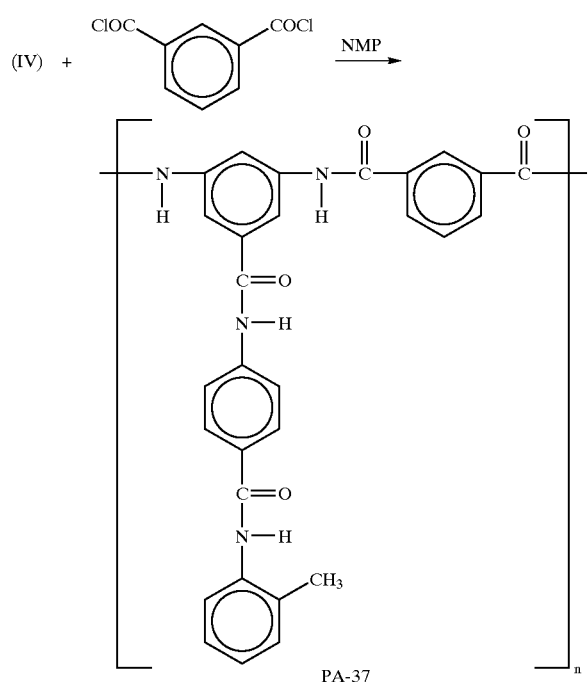

Under argon gas atmosphere, 1.02 g (5.0 mmol) of isophthalic acid dichloride and 1.80 g (5.0 mmol) of 3,5-diamino-4'-[N-(2methylphenyl) carbamoyl] benzanilide obtained in Reference 5 shown in the formula (IV) above were each dissolved to the concentration of 1.0 mol/l in NMP, and mixed at −78° C. and frozen. The liquid solution was then gradually heated to melt and stirred for 4 hours at room temperature. Reaction liquid solution thus obtained was diluted with 21.0 ml of NMP and then poured into excess methanol, and polymer precipitated were filtered and dried. The procedures described above were repeated and purified, and 1.24 g of polyamide shown in the structural formula PA-37 was obtained. Number-average molecular weight and weight-average molecular weight of PA-37 obtained through the gel permeation chromatography were 5.44×10$^3$ and 9.69×10$^3$, respectively.

EXAMPLE 38

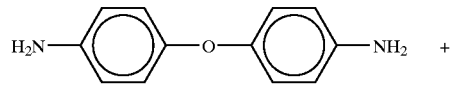

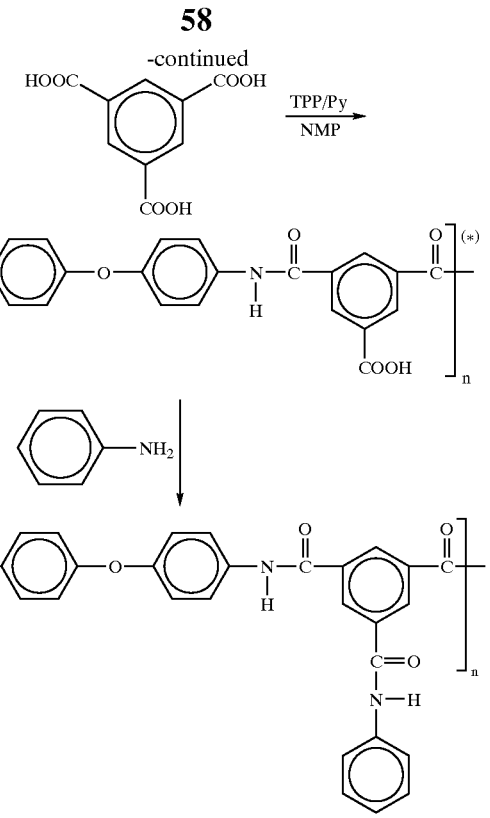

Multi-ramified Polyamide (PA-38)

Under argon gas atmosphere, 1.05 g (5.0 mmol) of trimesic acid and 1.00 g (5.0 mmol) of 4,4'-diaminodiphenylether were dissolved in 50 ml of NMP, and 6.0 ml of Py and 8.0 ml of TPP were added into this liquid solution and stirred for 4 hours after heated to 80° C. Polyamide (*) shown in the structural formula above can be obtained by these processes ((*) the structure above was shown in this way for convenience, but they have in fact multi-ramified structure). 0.5 g of aniline was then added to the reaction solution and stirred for additional 13 hours at 80° C. Reaction solution thus obtained was poured into excess methanol, and polymer precipitated were filtered and dried. The procedures above were repeated and purified, and 2.15 g of multi-ramified type polyamide shown in the structural formula PA-38 (the structure above was shown in this way for convenience, but they have in fact multi-ramified structure) above was obtained. Number-average molecular weight and weight-average molecular weight of PA-38 obtained through the gel permeation chromatography were 1.94×10$^4$ and 1.96×10$^5$, respectively.

EXAMPLE 39

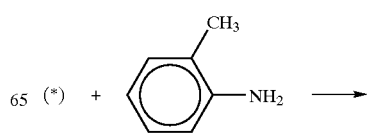

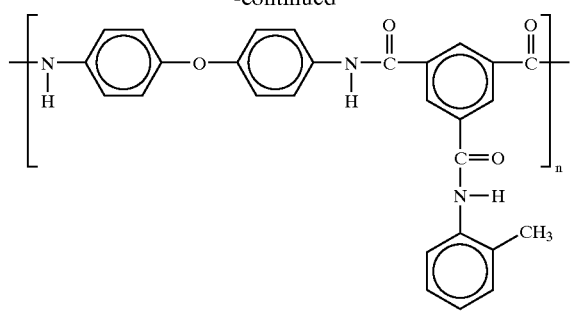

Multi-ramified Polyamide
(PA-39)

0.6 g of o-tolidine was added to the reaction solution of multi-ramified polyamide (*) obtained by the similar procedure as in Example 38 and stirred for 14 hours at 80° C. Reaction solution thus obtained was poured into excess methanol, and polymer precipitated were filtered and dried. The procedures above were repeated and purified, and 2.07 g of multi-ramified type polyamide shown in the structural formula PA-39 (the structure above was shown in this way for convenience, but they have in fact multi-ramified structure) above was obtained. Number-average molecular weight and weight-average molecular weight of PA-39 obtained through the gel permeation chromatography were $1.51 \times 10^4$ and $1.02 \times 10^5$, respectively.

Reference 6

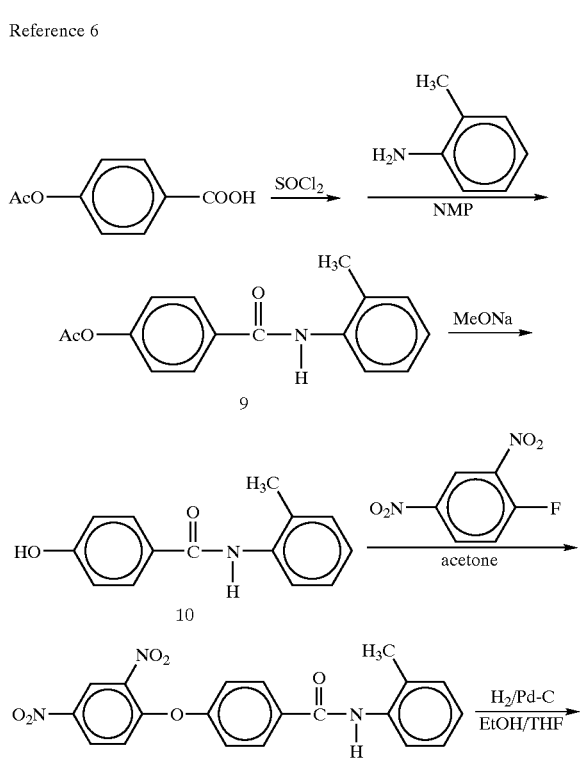

EXAMPLE 40

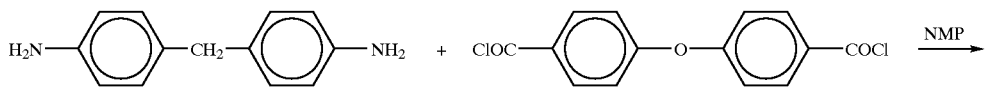

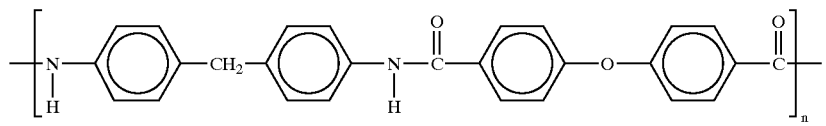

PA-40

Under argon gas atmosphere, 2.95 g (10.0 mmol) of 4,4'-di (chlorocarbonyl) diphenylether and 1.98 g (10.0 mmol) of 4,4'-diaminodiphenyl methane were each dissolved to the concentration of 1.0 mol/l in NMP, and mixed at −78° C. and frozen. The liquid solution was then gradually heated to melt and stirred for 4 hours at room temperature. Reaction liquid solution thus obtained was diluted with 37 ml of NMP and then poured into excess methanol, and polymer precipitated were filtered and dried. The procedures described above were repeated and purified, and 4.68 g of polyamide shown in the structural formula PA-41 above was obtained. Number-average molecular weight and weight-average molecular weight of PA-41 obtained through the gel permeation chromatography were $1.62 \times 10^4$ and $3.77 \times 10^4$, respectively.

-continued

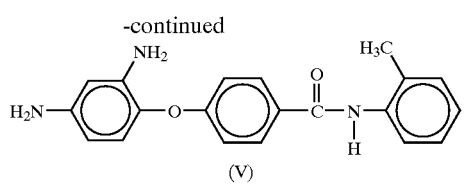

(V)

3.000 g (16.65 mmol) of 4-acetoxybenzoic acid and 5 ml of thionyl chloride were mixed together and stirred for two hours at 50° C. after the addition of a drop of DMF. After thionyl chloride was removed by distillation under the reduced pressure, 5 ml of NMP was added in an ice bath. After stirring for 10 minutes in the ice bath after the addition of 1.784 g (16.65 mmol) of 2-aminotoluene, then the solution was poured into 400 ml of iced water. Precipitate formed was thoroughly washed to yield 3.634 g of 4-acetoxy-2'-methylbenzanilide shown in the structural formula 9 above in colorless solid (Yield: 81.04%).

IR (KBr, cm$^{-1}$): 3285, 1759, 1649 (s), 1603 (w), 1586 (w), 1524, 1505, 1456, 1370 (w), 1314, 1202 (s), 1169, 1019 (w), 914 (w), 750 (w), 685 (w).

$^1$H-NMR δ(250 MHz, CDCl$_3$, ppm): 2.36 (3H, s), 2.37 (3H, s), 7.15 (1H, m), 7.2–7.3 (4H, m), 7.63 (1H bs), 7.93–7.96 (3H, m).

3.625 g (13.46 mmol) of 4-acetoxy-2'-methylbenzanilide obtained in the reaction above was dissolved into the solvent mixture with 30 ml of acetone and 10 ml of methanol and cooled to 0° C. 15 ml of sodium methoxide (1 mol/l) was drop-wise added into this solution. The solution was made weakly acidic by the addition of 1N hydrochloric acid and then solvent was removed by distillation. Precipitate was thoroughly washed with water and dried to yield 1.592 g of 4-hydroxy-2'-methylbenzanilide shown in the structural formula 10 above in colorless solid (Yield: 52.04%).

IR (KBr, cm$^{-1}$): 3264 (bs), 1620 (s), 1599 (s), 1576, 1537, 1505, 1441, 1377 (w), 1312, 1273 (s), 1229,1173,1111 (w), 847 (w), 750, 588 (w). 1H-NMR δ(250 MHz, CDCl$_3$, ppm): 2.35 (3H, s), 6.96 (2H, d, J=8.8 Hz), 7.1–7.3 (3H, m), 7.6 (1H, d), 7.95 (2H, d, J=8.8 Hz), 8.83 (1H, bs), 8.95 (1H, s).

0.990 g (4.356 mmol) of 4-hydroxy-2'-methylbenzanilide and 0.811 g (4.358 mmol) of 2,4-dinitrofluorobenzene were dissolved into 20 ml of acetone. The solution was stirred for one hour at reflux temperature after the addition of 0.6 g (4.3 mmol) of potassium carbonate. The reaction solution was filtered and precipitate was thoroughly washed with acetone. Filtrate was concentrated and purified through column chromatography (developing solvent: chloroform) to yield 1.553 g of 4-(2,4-dinitrophenoxy)-2'-methybenzanilide shown in the structural formula 11 above in light yellow solid (Yield: 90.63%).

IR (KBr, cm$^{-1}$): 3281 (w), 3086 (s), 1649 (s), 1603, 1526 (s), 1458 (w), 1372, 1356, 1318 (w), 1281, 1198 (w), 909 (w), 866 (w), 837 (w), 743 (w), 503 (w).

$^1$H-NMR δ(250 MHz, Acetone-d$_6$, ppm) 2.37 (3H, s), 7.13–7.32 (3H, m), 7.4–7.5 (3H, m), 7.60 (1H, d, J=7.5 Hz), 8.22 (2H, d, J=8.8 Hz), 8.58 (1H, dd, J=2.8, 9.0 Hz), 8.94 (1H, d, J=2.8 Hz), 9.16 (1H, bs).

1.55 g (3.90 mmol) of 4-(2,4-dinitrophenoxy)-2'-methylbenzanilide was dissolved into the solvent mixture with 70 ml THF and 30 ml of ethanol, and 0.166 g of 5% Pd-carbon powder was added into this solution. The solution was thoroughly deaerated under the reduced pressure at −78° C., and then stirred for 15 hours after the system was replaced with hydrogen gas and temperature was brought back to room temperature. The solution was concentrated after removing catalyst with Celite to yield 1.26 g of 4-(2,4-diaminophenoxy)-2'-methylbenzanilide shown in the structural formula (V) above in light brown solid (Yield: 96.7%).

IR (KBr, cm$^{-1}$) 3349 (br), 2955 (w), 1626 (s), 1605 (s), 1499 (s), 1456, 1314 (w), 1231 (s), 1167, 851, 754, 596 (w).

$^1$H-NMR δ(250 MHz, CDCl3, ppm): 2.14 (3H, s), 4.52 (2H, bs), 4.68 (2H, bs), 5.78 (1H, dd, J=2.5, 8.4 Hz), 5.99 (1H, d, J=2.5 Hz), 6.50 (1H, d, J=8.4 Hz), 6.84 (2H, d, J=8.8 Hz), 7.05–7.26 (4H, m), 7.86 (2H, d, J=8.8 Hz), 9.64 (1 H, s).

EI-MS (m/z): 333 (M$^+$), 227 (M-toluylamino)$^+$, 199 (M-CONHC$_7$H$_7$)$^+$, 123 (2,4-diaminophenoxyl)$^+$, 106 (toluylanilino)$^+$, Result of elementary analysis: (Molecular formula: C$_{20}$H$_{19}$N$_3$O$_2$, Molecular weight: 333.39) Calculated value (%); C: 72.05, H: 5.74, N: 12.60. Observed value (%): C: 71.78, H: 6.14, N: 11.62.

EXAMPLE 41

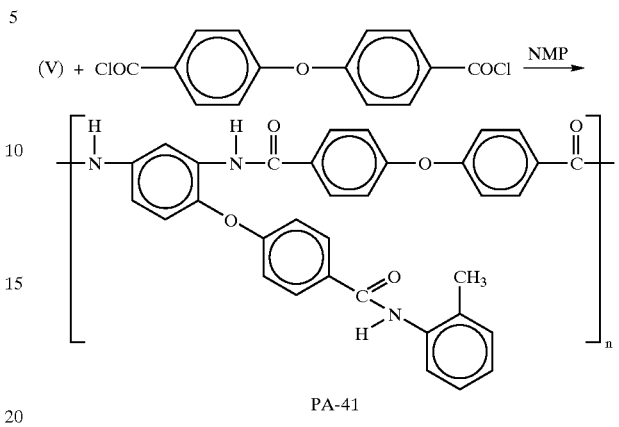

PA-41

Under argon gas atmosphere, 1.48 g (5.0 mmol) of 4,4'-di (chlorocarbonyl) diphenylether and 1.67 g (5.0 mmol) of 4-(2,4-diaminophenox)-2'-methylbenzanilide obtained in Reference 6 shown in the formula (V) above were each dissolved to the concentration of 1.0 mol/l in NMP, and mixed at −78° C. and frozen. The liquid solution was then gradually heated to room temperature to melt and stirred for one hour at room temperature. Reaction liquid solution thus obtained was diluted with 24 ml of NMP and then poured into excess methanol, and polymer precipitated were filtered and dried. The procedures described above were repeated and purified, and 2.84 g of polyamide shown in the structural formula PA-41 above was obtained. Number-average molecular weight and weight-average molecular weight of PA-41 obtained through the gel permeation chromatography were 1.02×10$^4$ and 1.92×10$^4$, respectively.

EXAMPLE 42

Under argon gas atmosphere, 36.3 mg (0.91 mmol) of sodium hydroxide (oil, 60%) was dispersed in 12 ml of DMSO and light yellow homogenous solution was obtained after stirring for one hour at 70° C. The solution was cooled to room temperature and 0.60 g of polyamide PA-1 obtained in Example 1 was dissolved into the solution and stirred for additional 4 hours. 0.52 g (3.33 mmol) of iodoethane was then added at room temperature and stirred for additional two hours, and precipitate obtained after the solution was poured into excess methanol, filtered and dried to yield 0.57 g of polymer. $^1$H-NMR spectrum of polymer obtained was taken and revealed that the product was polyamide (called PA-42 hereafter) in which 27 mole % of amide radical at N position of the structure shown in PA-1 was substituted with ethyl group. Number-average molecular weight and weight-average molecular weight of PA-42 obtained through the gel permeation chromatography were 1.36×10$^4$ and 2.66×10$^4$, respectively.

EXAMPLE 43

Under argon gas atmosphere, 48.4 mg (1.21 mmol) of sodium hydroxide (oil, 60%) was dispersed in 10 ml of DMSO and light yellow homogenous solution was obtained after stirring for one hour at 70° C. The solution was cooled to room temperature and 0.50 g of polyamide PA-1 obtained in Example 1 was dissolved into the solution and stirred for additional 4 hours, and then 0.57 g (3.35 mmol) of 2-iodopropane was added at room temperature and stirred for additional four hours at 50° C., and precipitate obtained after the solution was poured into excess methanol, filtered and dried to yield 0.53 g of polymer. $^1$H-NMR spectrum of polymer obtained was taken and revealed that the product was plyamide (called PA-43 hereafter) in which 7.8 mole % of amide radical at N position of the structure shown in PA-1 was substituted with isopropyl group. Number-average molecular weight and weight-average molecular weight of PA-43 obtained through the gel permeation chromatography were $1.45 \times 10^4$ and $3.04 \times 10^4$, respectively.

EXAMPLE 44

Under argon gas atmosphere, 36.3 mg (0.91 mmol) of sodium hydroxide (oil, 60%) was dispersed in 12 ml of DMSO and light yellow homogenous solution was obtained after stirring for one hour at 70° C. The solution was cooled to room temperature and then 0.60 g of polyamide PA-1 obtained in Example 1 was dissolved into the solution and stirred for additional 4 hours. 0.44 g (3.63 mmol) of allyl-bromide was then added and stirred for additional two hours at room temperature, and precipitate obtained after the solution was poured into excess methanol, filtered and dried to yield 0.58 g of polymer. $^1$H-NMR spectrum of polymer obtained was taken and revealed that the product was plyamide (called PA-44 hereafter) in which 23 mole % of amide radical at N position of the structure shown in PA-1 was substituted with allyl group. Number-average molecular weight and weight-average molecular weight of PA-44 obtained through the gel permeation chromatography were $1.66 \times 10^4$ and $3.40 \times 10^4$, respectively.

EXAMPLE 45

Under argon gas atmosphere, 36.3 mg (0.91 mmol) of sodium hydroxide (oil, 60%) was dispersed in 12 ml of DMSO and light yellow homogenous solution was obtained after stirring for one hour at 70° C. The solution was cooled to room temperature and then 0.60 g of polyamide PA-1 obtained in Example was dissolved into the solution and stirred for additional 4 hours. 0.62 g (3.63 mmol) of benzyl bromide was then added and stirred for additional two hours at room temperature, and precipitate obtained after the solution was poured into excess methanol, filtered and dried to yield 0.64 g of polymer. $^1$H-NMR spectrum of polymer obtained was taken and revealed that the product was polyamide (called PA-45 hereafter) in which 23 mole % of amide radical at N position of the structure shown in PA-1 was substituted with benzyl group. Number-average molecular weight and weight-average molecular weight of PA-45 obtained through the gel permeation chromatography were $1.60 \times 10^4$ and $3.26 \times 10^4$, respectively.

EXAMPLE 46

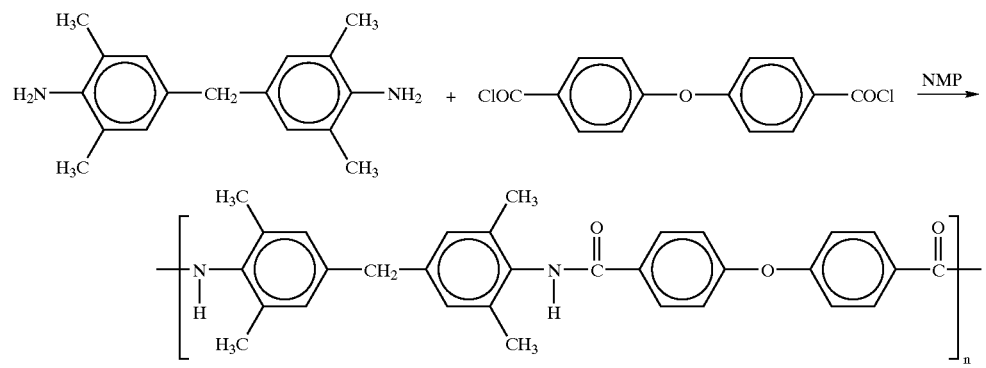

Under argon gas atmosphere, 1.48 g (5.0 mmol) of 4,4'-di(chlorocarbonyl) diphenylether and 1.57 g (5.0 mmol) of 3,3'5,5'-tetramethyl-4,4'-diaminodiphenylmethane were each dissolved to the concentration of 1.0 mol/l in NMP, and mixed at −78° C. and frozen. The liquid solution was then gradually heated to melt and stirred for 4 hours at room temperature. Reaction liquid solution thus obtained were diluted with 38 ml of NMP and then poured into excess methanol, and polymer precipitated were filtered and dried. The procedures described above were repeated and purified, and 2.68 g of polyamide shown in the structural formula PA-46 was obtained. Number-average molecular weight and weight-average molecular weight of PA-46 obtained through the gel permeation chromatography were $1.43 \times 10^4$ and $2.49 \times 10^4$, respectively.

EXAMPLE 47

Under argon gas atmosphere, 36.3 mg (0.91 mmol) of sodium hydroxide (oil, 60%) was dispersed in 12 ml of DMSO and light yellow homogenous solution was obtained after stirring for one hour at 70° C. The solution was cooled to room temperature and then 0.60 g of polyamide PA-1 obtained in Example 1 was dissolved into the solution and stirred for additional 4 hours. 1.28 g (3.63 mmol) of 1-iodohexadecane was then added and stirred for additional 4 hours at room temperature, and precipitate obtained after the solution Was poured into excess methanol/hexane solvent mixture, filtered and dried to yield 0.59 g of polymer. $^1$H-NMR spectrum of polymer obtained was taken and revealed that the product was polyamide (called PA-47 hereafter) in which 19 mole % of amide radical at N position of the structure shown in PA-1 was substituted with hexadecyl group. Number-average molecular weight and weight-average molecular weight of PA-47 obtained through the gel permeation chromatography were $1.59 \times 10^4$ and $3.36 \times 10^4$, respectively.

EXAMPLE 48

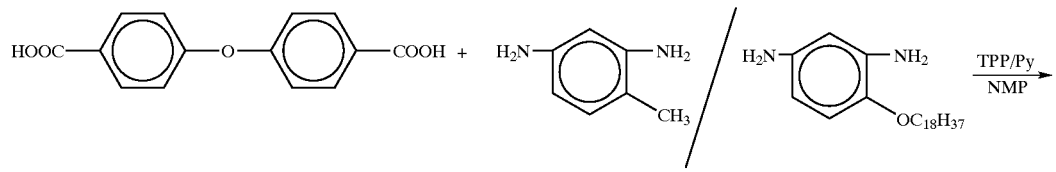

PA-48 (x/y = 18.5/81.5)

Under argon gas atmosphere, 1.37 g (5.31 mmol) of 4,4'-dicarboxydiphenylether and 0.40 g (1.06 mmol) of 1-octadodecyloxy-2,4-diaminobenzene as well as 0.52 g (4.25 mmol) of 4-methyl-m-phenylenediamine were dissolved in 6.00 ml of NMP, and 1.30 ml of Py and 4.20 ml of TPP were added into this liquid solution and stirred for 17 hours after heated to 100° C. Obtained reaction liquid solution was diluted with 10 ml of NMP and then poured into excess methanol, and polymer precipitated were filtered and dried. The procedures above were repeated and purified, and 2.04 g of polyamide shown in the structural formula PA-48 was obtained. $^1$H-NMR spectrum of PA-48 was taken and revealed that x/y copolymerization ratio was 81.5/18.5. Number-average molecular weight and weight-average molecular weight of PA-45 obtained through the gel permeation chromatography were $9.30\times10^3$ and $2.02\times10^4$, respectively.

EXAMPLE 49

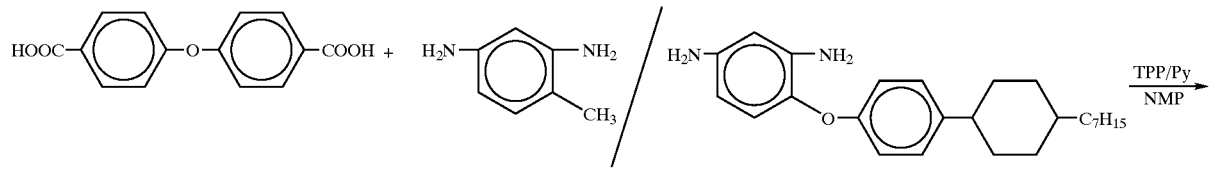

PA-49 (x/y = 79.9/20.1)

Under argon gas atmosphere, 1.36 g (5.26 mmol) of 4,4'-dicarboxydiphenylether and 0.40 g (1.05 mmol) of 4-(4-trans-n-heptylcyclohexylphenoxy)-1,3-diaminobenzene as well as 0.51 g (4.20 mmol) of 4-methyl-m-phenylenediamine were dissolved in 6.00 ml of NMP, and 1.30 ml of Py and 4.20 ml of TPP were added into this liquid solution and stirred for 17 hours after heated to 100° C. Obtained reaction liquid solution was diluted with 10 ml of NMP and then poured into excess methanol, and polymer precipitated were filtered and dried. The procedures above were repeated and purified to yield 2.05 g of polyamide shown in the structural formula PA-49. $^1$H-NMR spectrum of PA-49 was taken and revealed that x/y copolymerization ratio was 79.9/20.1. Number-average molecular weight and weight-average molecular weight of PA-49 obtained through

EXAMPLE 50

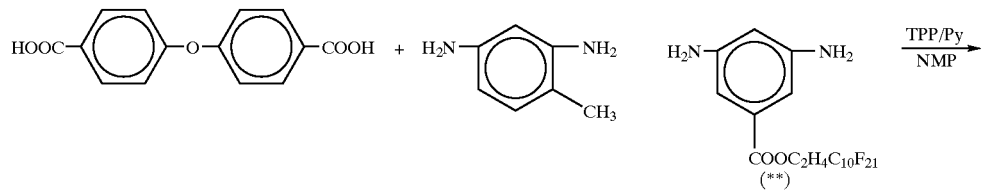

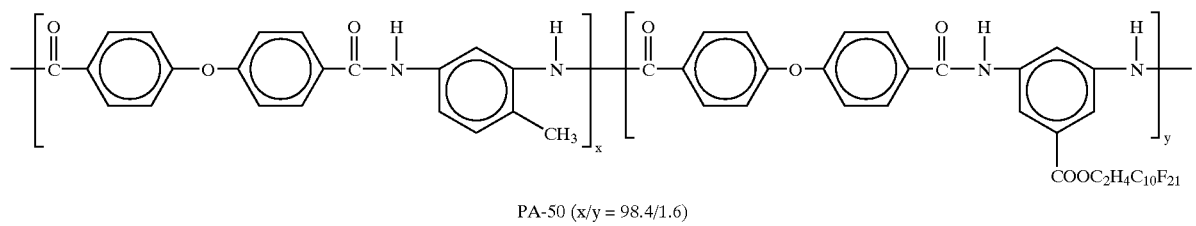

PA-50 (x/y = 98.4/1.6)

Under argon gas atmosphere, 0.30 g (1.16 mmol) of 4,4'-dicarboxydiphenylether and 0.14 g (1.14 mmol) of 4-methyl-m-phenylenediamine as well as 0.012 g (0.02 mmol) of diamine compound above (**) were dissolved in 1.20 ml of NMP, and 0.30 ml of Py and 0.90 ml of TPP were added into this liquid solution and stirred for 6 hours after heated to 100° C. Obtained reaction liquid solution was diluted with 3 ml of NMP and then poured into excess methanol, and precipitated polymer were filtered and dried. The procedures above were repeated and purified to yield 0.38 g of polyamide shown in the structural formula PA-50. $^{1}$H-NMR spectrum of PA-50 was taken and revealed that x/y copolymerization ratio was 98.4/1.6. Number-average molecular weight and weight-average molecular weight of PA-50 obtained through gel permeation chromatography were $8.49 \times 10^{3}$ and $1.58 \times 10^{4}$, respectively.

EXAMPLE 51

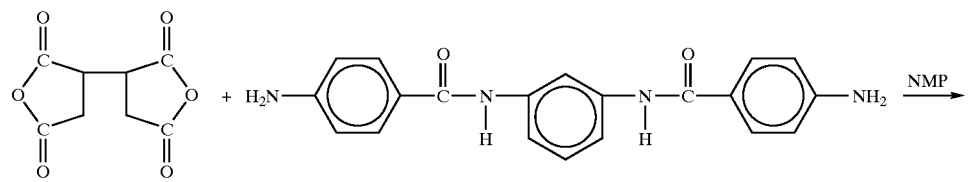

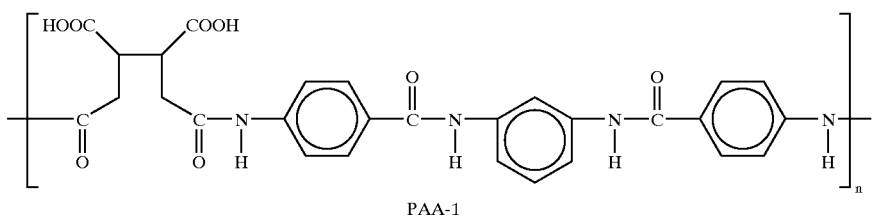

PAA-1

Under flowing nitrogen gas, 1.04 g (3.0 mmol) of 1,3-di[4-aminobenzamide] benzene and 0.59 g (3.0 mmol) of 1,2,3,4-butanetetracarboxylic acid di-anhydride were reacted in 9.13 ml of NMP for three hours at room temperature to prepare PAA-1 of polyamide acid shown in the structural formula above. Number-average molecular weight and weight-average molecular weight of PAA-1 obtained through the gel permeation chromatography were $3.35 \times 10^{3}$ and $5.21 \times 10^{3}$, respectively.

EXAMPLE 52

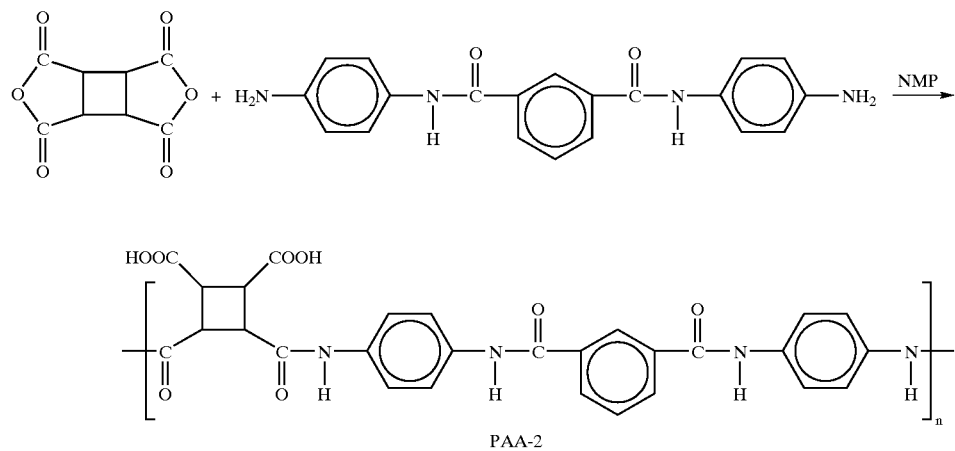

Under flowing nitrogen gas, 3.46 g (10 mmol) of 1,4-di 1(4-aminophenyl carbamoyl] benzene and 1.92 g (9.8 mmol) of 1,2,3,4-cyclobutanetetracarboxylic acid di-anhydride (abbreviated as CBDA hereafter) were reacted in 30.62 ml of NMP for six hours at room temperature to prepare PAA-2 of polyamide acid shown in the structural formula above. Number-average molecular weight and weight-average molecular weight of PAA-2 obtained through the gel permeation chromatography were $7.12 \times 10^3$ and $1.65 \times 10^4$, respectively.

EXAMPLE 53

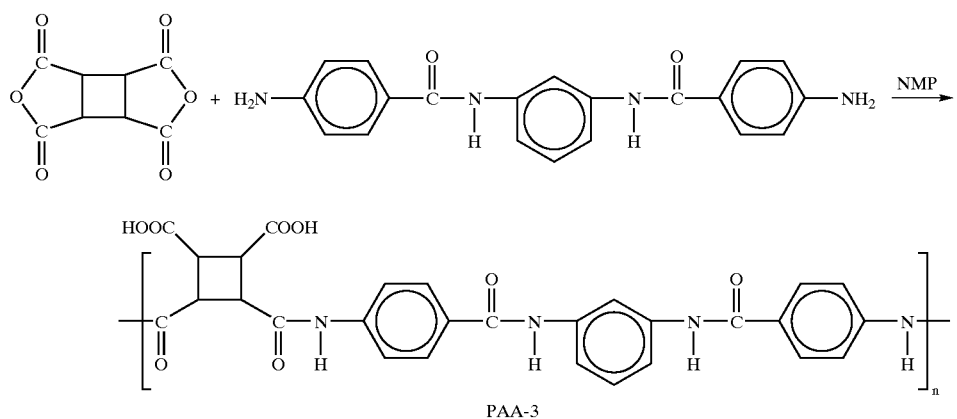

Under flowing nitrogen gas, 1.04 g (3.0 mmol) of 1,3-di [4-aminobenzamide] benzene and 0.58 g (2.94 mmol) of CBDA were reacted in 9.16 ml of NMP for six hours at room temperature to prepare PAA-3 of polyamide acid shown in the structural formula above. Number-average molecular weight and weight-average molecular weight of PAA-3 obtained through the gel permeation chromatography were $3.13 \times 10^4$ and $5.45 \times 10^4$, respectively.

EXAMPLE 54

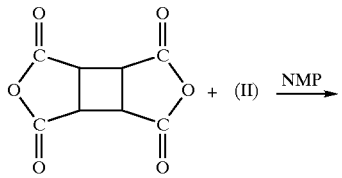

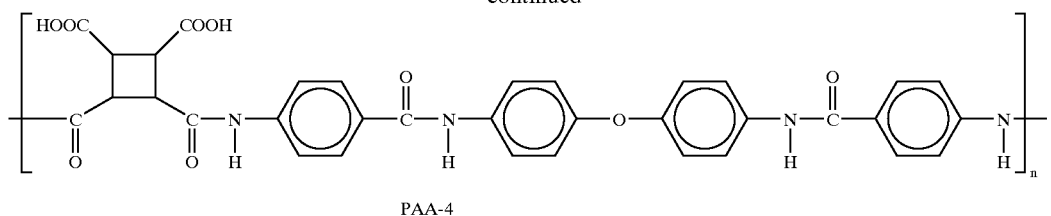

PAA-4

Under flowing nitrogen gas, 1.01 g (2.3 mmol) of 4,4'-di(4-aminobenzamide) diphenylether obtained in Reference 3 shown in the formula (II) and 0.44 g (2.25 mmol) of CBDA were reacted in 8.00 ml of NMP for six hours at room temperature to prepare PAA-4 of polyamide acid shown in the structural formula above. Number-average molecular weight and weight-average molecular weight of PAA-4 obtained through the gel permeation chromatography were $1.50 \times 10^4$ and $3.04 \times 10^4$, respectively.

EXAMPLE 55

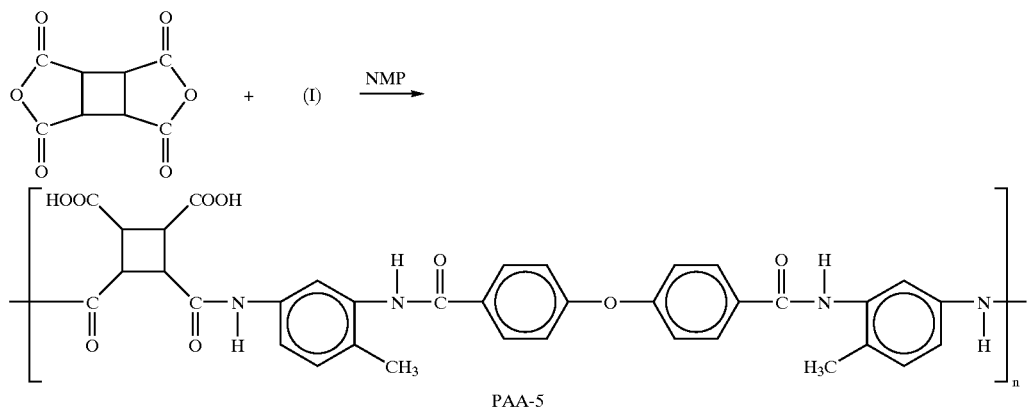

PAA-5

Under flowing nitrogen gas, 0.98 g (2.1 mmol) of 4,4'-di[N-(2-methyl-5-aminophenyl) carbonylamino] diphenylether obtained in Reference 2 shown in the formula (I) and 0.40 g (2.06 mmol) of CBDA were reacted in 7.84 ml of NMP for six hours at room temperature to prepare PM-5 of polyamide acid shown in the structural formula above. Number-average molecular weight and weight-average molecular weight of PAA-5 obtained through the gel permeation chromatography were $6.64 \times 10^4$ and $1.08 \times 10^5$, respectively.

Reference 7

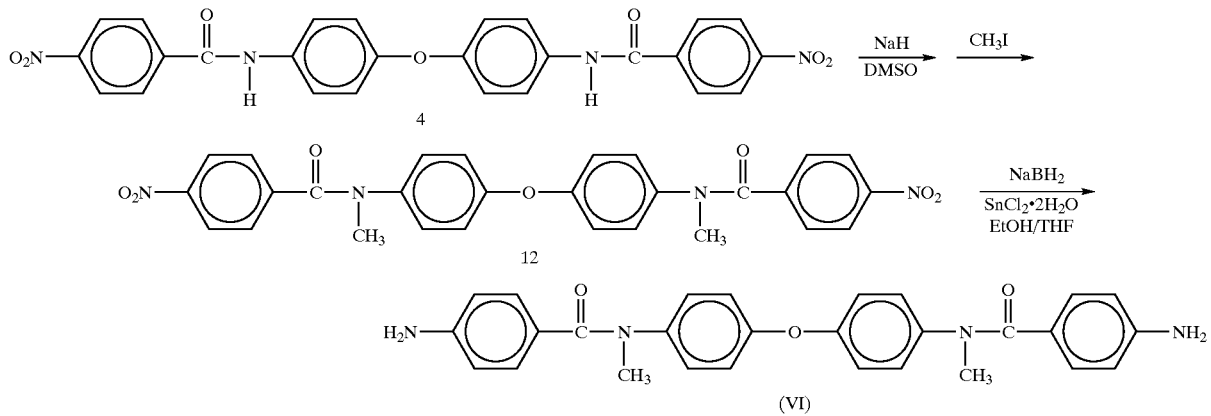

Under argon gas atmosphere, 1.64 g (40 mmol) of sodium hydroxide (oil, 60%) was dispersed in 100 ml of DMSO and light yellow homogenous solution after stirring for one hour at 70° C. was obtained. The solution was cooled to room temperature and 7.00 g (14.0 mmol) of dinitro compound 4 obtained in Reference 3 was dissolved into the solution and stirred for 4 hours at room temperature. 6.08 g (40 mmol) of iodomethane was then added at room temperature to this solution and the solution was stirred for additional 18 hours, and precipitate was obtained after the solution was poured into 200 ml of water, filtered and dried. 3.56 g of 4,4'-di (N-methyl-4-nitrobenzamide) diphenylether shown in the structural formula 12 above was obtained in light yellow powder after purification through the silica gel chromatography (development solvent: chloroform/ethyl acetate (Yield: 48.3%).

$^1$H-NMR δ(250 MHz, CDCl$_3$, ppm): 3.52 (6H, s), 6.82 (4H, d), 7.00 (4H, d), 7.48 (4H, d), 8.08 (4H, d).

2.10 g (3.99 mmol) of 4,4'-di (N-methyl-4-nitrobenzamide) diphenylether was dissolved into the solvent mixture with 50 ml of ethanol and 25 ml of THF and 10.0 g (44.4 mmol) of tin dichloride dihydrate was added. The mixture was heated to 65° C. and 378 mg (10 mmol) of sodium boron hydroxide in 50 ml of ethanol was added drop-wise over 4 hours and stirred. The reaction solution was then poured into 300 ml of water and neutralized with 10% sodium hydroxide solution, and precipitate was obtained by filtration. THF was added to this precipitate and soluble matter was extracted by refluxing overnight, and then THF was removed and precipitate was washed with ethanol to yield 1.15 g of 4,4'-di (N-methyl-4-aminobenzamide) diphenylether shown in the structural formula (VI) above in white powder (Yield: 62.0%).

IR (KBr, cm$^{-1}$): 3452, 3333, 3120, 2937, 1363, 1620, 1600.

$^1$H-NMR δ(250 MHz, DMSO-d$_6$, ppm): 3.26 (6H, s), 5.40 (4H, bs), 6.30 (4H, d), 6.80 (4H, d), 6.94 (4H, d), 7.10 (4H, d).

Result of elementary analysis: (Molecular formula: C$_{28}$H$_{26}$N$_4$O$_3$, Molecular weight: 466.53) Calculated value (%); C: 72.08, H: 5.62, N: 12.00. Observed value (%): C: 71.60, H: 5.65, N: 11.76.

EXAMPLE 56

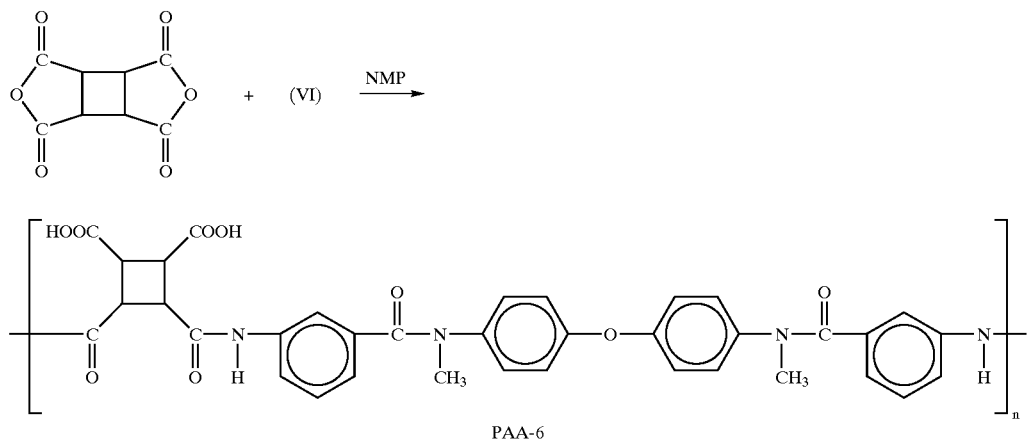

PAA-6

Under flowing nitrogen gas, 0.66 g (1.5 mmol) of 4,4'-di (N-methyl-4 aminobenzamide) diphenylether obtained in Reference 7 shown in the formula (VI) and 0.29 g (1.47 mmol) of CBDA were reacted in 5.38 ml of NMP for six hours at room temperature to prepare PAA-6 of polyamide acid shown in the structural formula above. Number-average molecular weight and weight-average molecular weight of PAA-6 obtained through the gel permeation chromatography were 2.31×10$^4$ and 3.60×10$^5$, respectively.

EXAMPLE 57

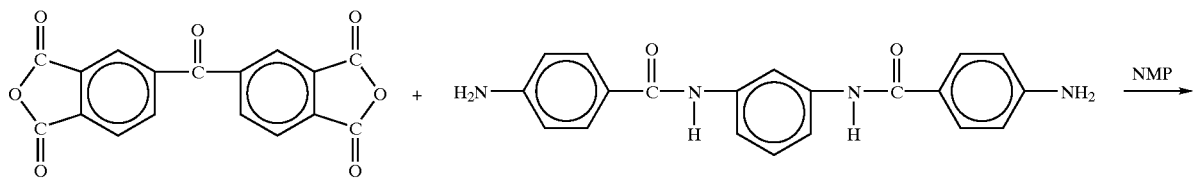

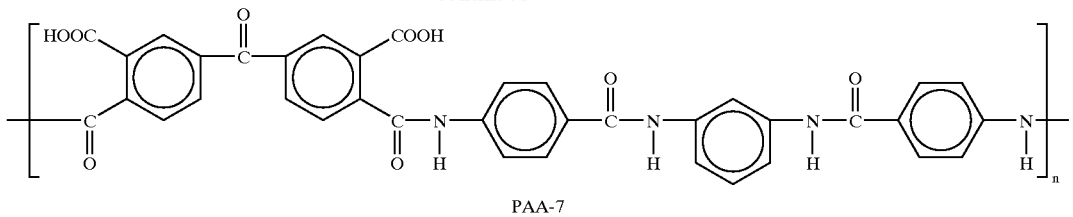

PAA-7

Under flowing nitrogen gas, 1.04 g (3.0 mmol) of 1,3-di[4-aminobenzamide]benzene and 0.96 g (2.97 mmol) of 3,3',4,4'-benzophenonetetracarboxylic acid dianhydnide were reacted in 11.31 ml of NMP for three hours at room temperature to prepare PAA-7 of polyamide acid shown in the structural formula above. Number-average molecular weight and weight-average molecular weight of PMA-7 obtained through the gel permeation chromatography were $1.60 \times 10^4$ and $3.08 \times 10^4$, respectively.

EXAMPLE 58

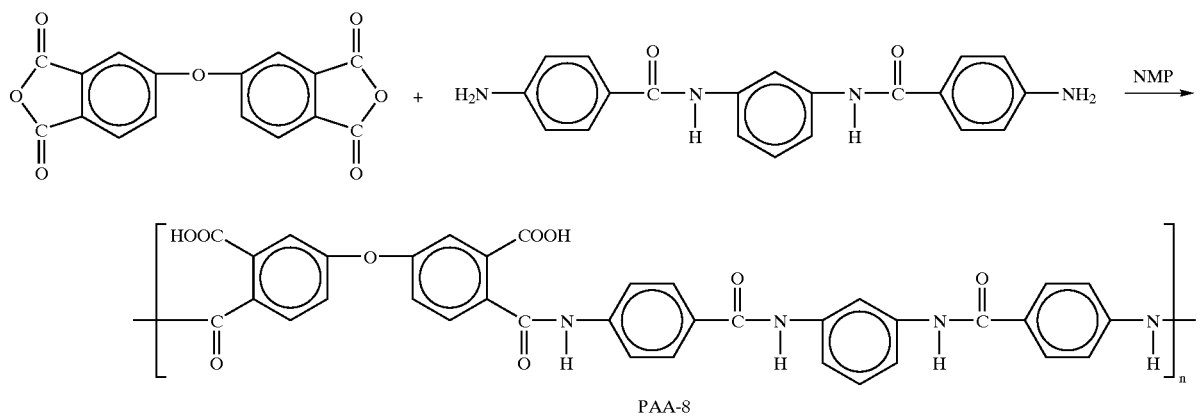

PAA-8

Under flowing nitrogen gas, 1.04 g (3.0 mmol) of 1,3-di[4-aminobenzamide] benzene and 0.93 g (3.0 mmol) of bis (3,4-dicarboxyphenyl) ether dianhydride were reacted in 11.16 ml of NMP for three hours at room temperature to prepare PAA-8 of polyamide acid shown in the structural formula above. Number-average molecular weight and weight-average molecular weight of PAA-8 obtained through the gel permeation chromatography were $1.82 \times 10^4$ and $3.33 \times 10^4$, respectively.

EXAMPLE 59

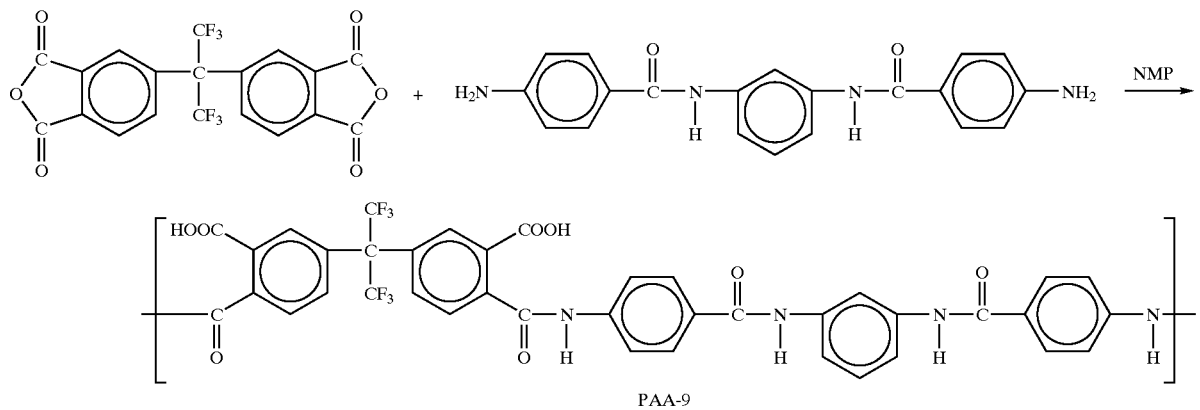

PAA-9

Under flowing nitrogen gas, 1.04 g (3.0 mmol) of 1,3-di [4-aminobenzamide] benzene and 1.33 g (3.0 mmol) of 1,1,1,3,3,3-hexafluoro-2,2-bis (3,4-dicarboxyphenyl) propane dianhydride were reacted in 13.44 ml of NMP for three hours at room temperature to prepare PAA-9 of polyamide acid shown in the structural formula above. Number-average molecular weight and weight-average molecular weight of PAA-9 obtained through the gel permeation chromatography were $2.37 \times 10^4$ and $4.22 \times 10^4$, respectively.

EXAMPLE 60

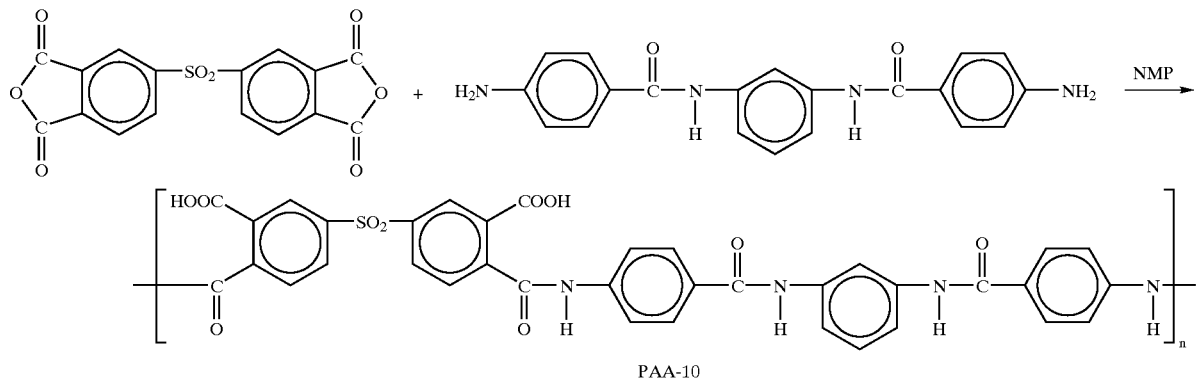

PAA-10

Under flowing nitrogen gas, 1.04 g (3.0 mmol) of 1,3-di [4-aminobenzamide] benzene and 1.07 g (3.0 mmol) of bis (3,4-dicarboxyphenyl) sulfone dianhydride were reacted in 11.98 ml of NMP for three hours at room temperature to prepare PAA-10 of polyamide acid shown in the structural formula above. Number-average molecular weight and weight-average molecular weight of PAA-10 obtained through the gel permeation chromatography were $1.81 \times 10^4$ and $3.40 \times 10^4$, respectively.

EXAMPLE 61

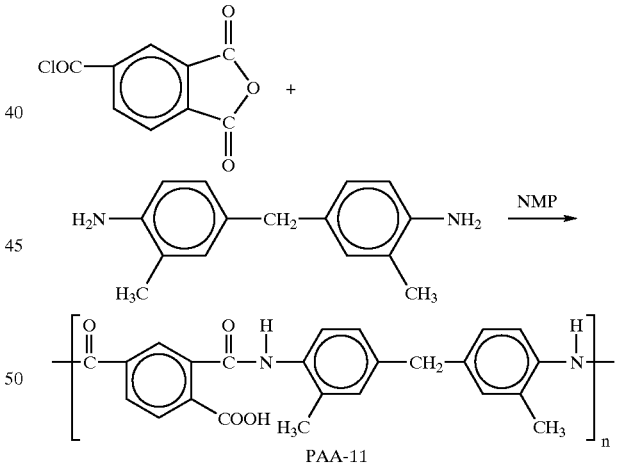

PAA-11

Under argon gas atmosphere, 2.26 g (10 mmol) of 4,4'-diamino-3,3'-dimethyldiphenylmethane and 2.10 g (10 mmol) of trimellitic acid-anhydride acid chloride were dissolved in 24.71 ml of NMP, and stirred for 6 hours after heated to 100° C. Obtained reaction liquid solution was diluted with 45.6 ml of NMP and then poured into excess methanol, and polymer precipitated were filtered and dried. The procedures above were repeated and purified, and 3.88 g of polyamide shown in the structural formula PAA-11 was obtained. Number-average molecular weight and weight-average molecular weight of PA-50 obtained through the gel permeation chromatography were $6.81 \times 10^4$ and $1.15 \times 10^4$, respectively.

EXAMPLE 62

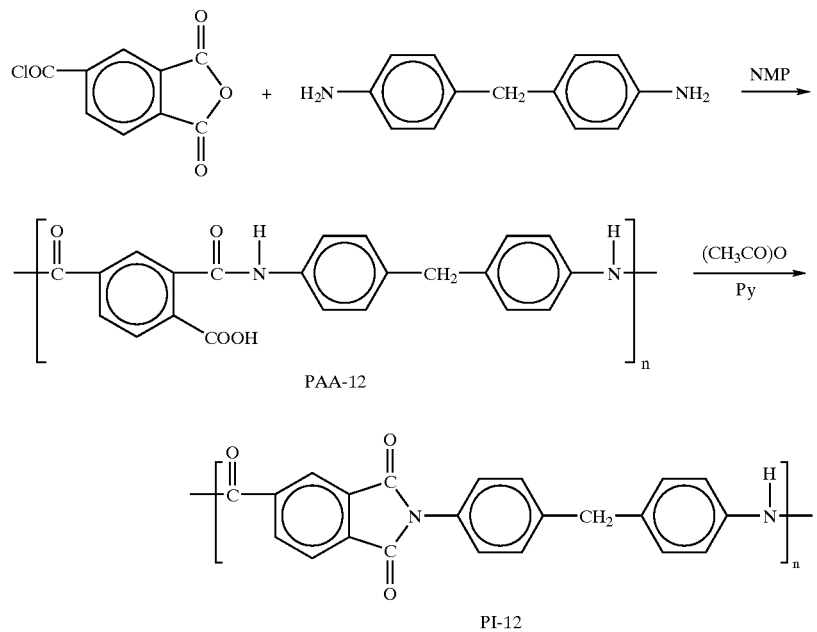

Under argon gas atmosphere, 1.98 g (10 mmol) of 4,4'-diaminodiphenylmethane and 2.10 g (10 mmol) of trimellitic acid-anhydride acid chloride were dissolved in 22.53 ml of NMP, reacted for 6 hours at room temperature to prepare PAA-12 of polyamide acid shown in the structural formula above. Obtained reaction liquid solution was diluted with 7.3 ml of NMP, and 9.50 ml of anhydride acetic acid and 4.90 ml of Py were added and stirred for three hours after heated to 40° C. The reaction solution was then poured into methanol, and polymer precipitated were filtered and dried. The procedures above were repeated and purified, and 3.26 g of polyimide shown in the structural formula PI-12 above was obtained. Number-average molecular weight and weight-average molecular weight of PI-12 obtained through the gel permeation chromatography were $6.89 \times 10^3$ and $1.06 \times 10^4$, respectively.

EXAMPLE 63

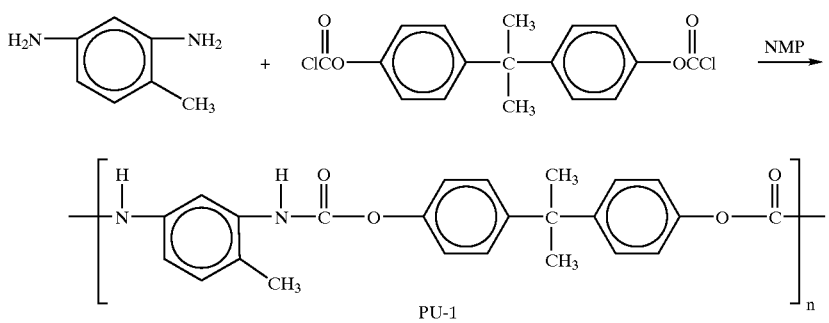

Under argon gas atmosphere, 1.77 g (5.0 mmol) of bisphenol A bis (chloroformate) and 0.61 g (5.0 mmol) of 4-methyl-m-phenylenediamine were dissolved in 13.14 ml of NMP, and stirred for 14 hours at room temperature. Obtained reaction liquid solution was diluted with 18 ml of NMP, and then poured into excess methanol, and polymer precipitated were filtered and dried. The procedures above were repeated and purified, and 1.14 g of polyurethane shown in the structural formula PU-1 above was obtained. Number-average molecular weight and weight-average molecular weight of PU-1 obtained through the gel permeation chromatography were $4.26 \times 10^4$ and $5.64 \times 10^3$, respectively.

EXAMPLE 64

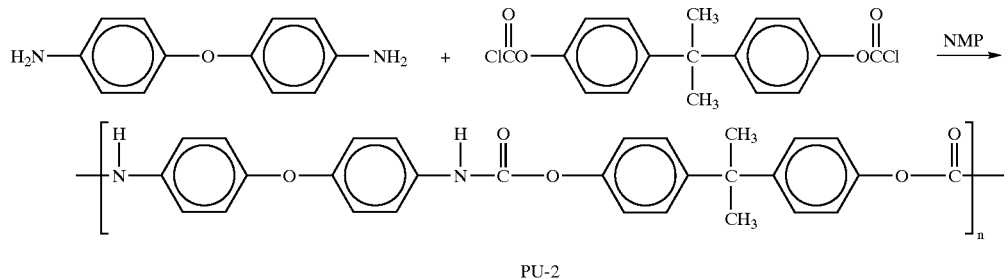

PU-2

Under argon gas atmosphere, 1.77 g (5.0 mmol) of bisphenol A bis (chloroformate) and 1.00 g (5.0 mmol) of 4,4'-diaminodiphenylether were dissolved in 15.30 ml of NMP, and stirred for two hours between −78° C. and room temperature. Obtained reaction liquid solution was diluted with 21 ml of NMP, and then poured into excess methanol, and polymer precipitated were filtered and dried. The procedures above were repeated and purified, and 1.83 g of polyurethane shown in the structural formula PU-2 above was obtained. Number-average molecular weight and weight-average molecular weight of PU-2 obtained through the gel permeation chromatography were $5.63 \times 10^3$ and $8.70 \times 10^3$, respectively.

EXAMPLE 65

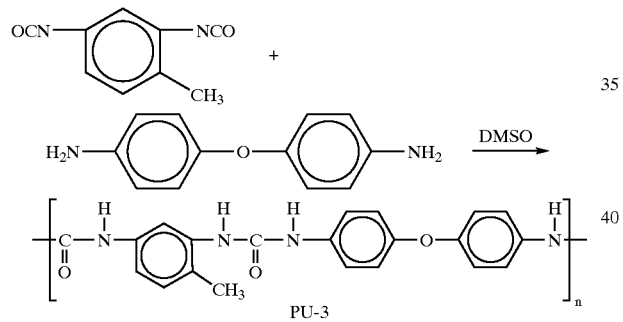

PU-3

Under argon gas atmosphere, 1.74 g (10.0 mmol) of 4-methyl-1,3-phenylenediisocyanate and 2.00 g (10.0 mmol) of 4.4'-diaminodiphenylether were dissolved in 23.60 ml of DMSO, and stirred for 15 minutes after heated to 60° C. Obtained reaction liquid solution was diluted with 26 ml of DMSO, and then poured into excess methanol, and polymer precipitated were filtered and dried. The procedures above were repeated and purified, and 2.77 g of polyurea shown in the structural formula PU-3 above was obtained. Number-average molecular weight and weight-average molecular weight of PU-3 obtained through the gel permeation chromatography were $1.83 \times 10^4$ and $5.40 \times 10^4$, respectively.

EXAMPLE 66

Under argon gas atmosphere, 85.5 mg (2.14 mmol) of sodium hydroxide (oil, 60%) was dispersed in 20 ml of DMSO and light yellow homogenous solution after stirring for one hour at 70° C. was obtained. The solution was cooled to room temperature and 1.0 g (2.67 mmol) of PU-3 of polyurea obtained in Example 65. 0.91 g (6.41 mmol) of iodomethane was then added at room temperature and stirred for another two hours, and precipitate obtained after the solution was poured into excess methanol, filtered and dried to yield 0.93 g of polymer. $^1$H-NMR spectrum of polymer was taken and revealed that the product was polyurea (called PU-4 hereafter) in which 19 mole % of urea radical at N position of the structure shown in PU-3 was substituted with methyl group. Number-average molecular weight and weight-average molecular weight of PU-4 obtained through the gel permeation chromatography were $9.79 \times 10^3$ and $2.04 \times 10^4$, respectively.

EXAMPLE 67

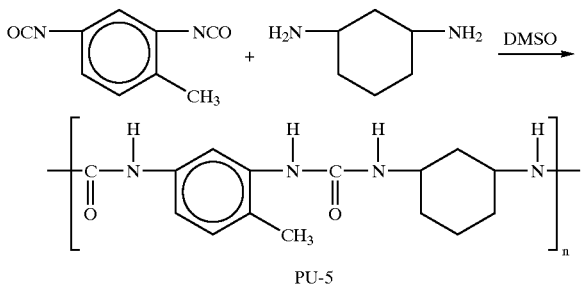

PU-5

Under argon gas atmosphere, 3.05 g (17.5 mmol) of 4-methyl-1,3-phenylenediisocyanate and 2.00 g (17.5 mmol) of 1,3-diaminocyclohexane were dissolved in 17 ml of DMSO, and stirred for 15 minutes after heated to 60° C. Obtained reaction liquid solution was diluted with 17 ml of DMSO to yield 35 ml of DMSO solution containing 5.05 g of polyurea shown in the structural formula PU-5 above. Number-average molecular weight and weight-average molecular weight of PU-5 obtained through the gel permeation chromatography were $8.91 \times 10^3$ and $1.73 \times 10^4$, respectively.

EXAMPLE 68

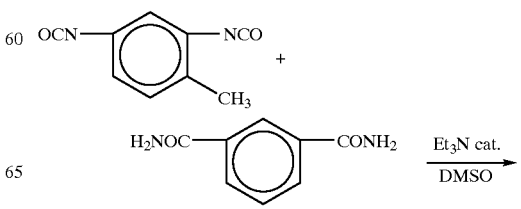

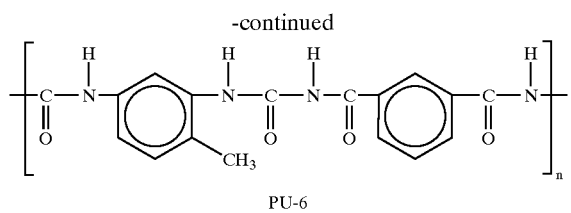

PU-6

Under argon gas atmosphere, 1.74 g (10.0 mmol) of 4-methyl-1,3-phenylenediisocyanate and 1.64 g (10.0 mmol) of isophthalic acid diazide were dissolved in 15 ml of DMSO and 8.36 ml of triethylamine was also added as a catalyst into the solution, and the solution was stirred for 14 hours after heated to 120° C. Obtained reaction liquid solution was diluted with 24 ml of DMSO, and then poured into excess methanol, and polymer precipitated were filtered and dried. The procedures above were repeated and purified, and 2.67 g of polymer shown in the structural formula PUT above was obtained. Number-average molecular weight and weight-average molecular weight of PU-6 obtained through the gel permeation chromatography were $2.41 \times 10^3$ and $3.40 \times 10^3$, respectively.

EXAMPLE 69

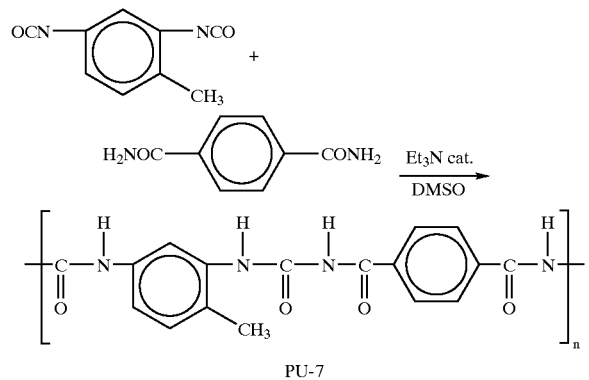

PU-7

Under argon gas atmosphere, 1.74 g (10.0 mmol) of 4-methyl-1,3-phenylenediisocyanate and 1.64 g (10.0 mmol) of terephthalic acid diazide were dissolved in 15 ml of DMSO and 8.36 ml of triethylamine was also added as a catalyst into the solution, and the solution was stirred for 14 hours after heated to 120° C. Obtained reaction liquid solution was diluted with 24 ml of DMSO, and then poured into excess methanol, and polymer precipitated were filtered and dried. The procedures above were repeated and purified, and 2.54 g of polymer shown in the structural formula PU-7 above was obtained. Number-average molecular weight and weight-average molecular weight of PU-7 obtained through the gel permeation chromatography were $2.39 \times 10^3$ and $3.11 \times 10^3$, respectively.

EXAMPLE 70

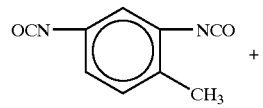

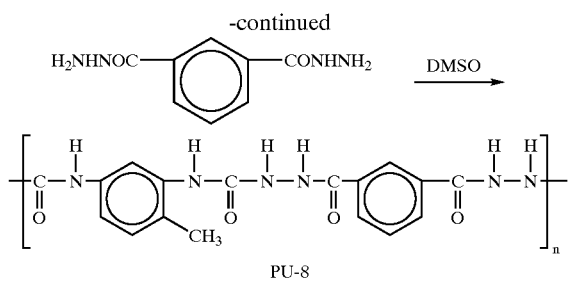

PU-8

Under argon gas atmosphere, 1.74 g (10.0 mmol) of 4-methyl-1,3-phenylenediisocyanate and 1.94 g (10.0 mmol) of isophthalic acid dihydrazide were dissolved in 22.30 ml of DMSO and stirred for 20 minutes after heated to 120° C. Obtained reaction liquid solution was diluted with 26 ml of DMSO, and then poured into excess methanol, and polymer precipitated were filtered and dried. The procedures above were repeated and purified, and 3.50 g of polymer shown in the structural formula PU-8 above was obtained. Number-average molecular weight and weight-average molecular weight of PU-8 obtained through the gel permeation chromatography were $4.54 \times 10^3$ and $7.96 \times 10^3$, respectively.

EXAMPLE 71

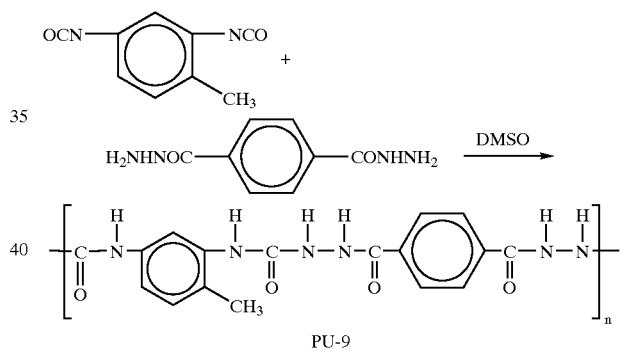

PU-9

Under argon gas atmosphere, 1.74 g (10.0 mmol) of 4-methyl-1,3-phenylenediisocyanate and 1.94 g (10.0 mmol) of terephthalic acid dihydrazide were dissolved in 22.30 ml of DMSO and stirred for 20 minutes after heated to 120° C. Obtained reaction liquid solution was diluted with 26 ml of DMSO, and then poured into excess methanol, and polymer precipitated were filtered and dried. The procedures above were repeated and purified, and 3.46 g of polymer shown in the structural formula PU-9 above was obtained. Number-average molecular weight and weight-average molecular weight of PU-9 obtained through the gel permeation chromatography were $3.55 \times 10^3$ and $6.03 \times 10^3$, respectively.

EXAMPLE 72

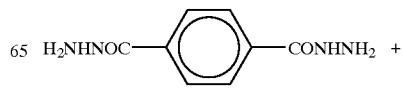

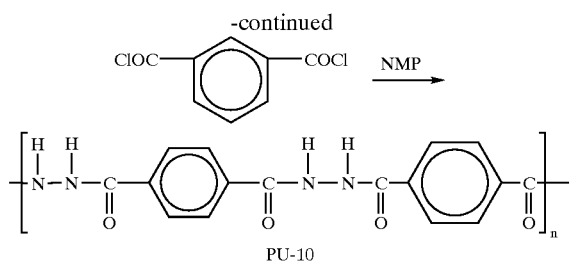

PU-10

Under argon gas atmosphere, 0.523 g (2.57 mmol) of isophthalic acid dicholoride and 0.500 g (2.57 mmol) of terephthalic acid dihydrazide were dissolved in 5.0 ml of MNP and stirred over 4 hours between −78° C. and room temperature. The solution was then poured into excess methanol, and polymer precipitated were filtered and dried. The procedures above were repeated and purified, and 0.58 g of polymer shown in the structural formula PU-10 above was obtained. Number-average molecular weight and weight-average molecular weight of PU-10 obtained through the gel permeation chromatography were $5.07 \times 10^3$ and $8.15 \times 10^3$, respectively.

EXAMPLE 73

Under argon gas atmosphere, 168 mg (7.01 mmol) of sodium hydroxide (oil, 60%) was dispersed in 20 ml of DMSO and light yellow homogenous solution after stirring for one hour at 70° C. was obtained. The solution was cooled to room temperature and then 17 ml of DMSO solution containing PU-5 of polyurea obtained in Example 67 was added and stirred for additional 4 hours at room temperature. 2.98 g (21.0 mmol) of iodomethane was then added at room temperature and stirred for another two hours, and precipitate was obtained after the solution was poured into excess methanol, filtered and dried to yield 1.93 g of polymer. $^1$H-NMR spectrum of polymer was taken and revealed that the product was polyurea (called PU-11 hereafter) in which 16 mole % of urea radical at N position of the structure shown in PU-5 was substituted with methyl group. Number-average molecular weight and weight-average molecular weight of PU-11 obtained through the gel permeation chromatography were $1.33 \times 10^4$ and $2.82 \times 10^4$, respectively.

EXAMPLE 74–123

PA-1 to PA-50 of polyamide obtained through Example 1 to Example 50 were dissolved into the solvent mixture with NMP and butyl-cellosolve with the desired mixing ratio (ratio by weight), and the solution was adjusted to desired solid concentration thereof. Then, the solution was spin-coated with the desired number of rotation over the glass substrate and dried for 5 minutes at 80° C., and heat-treated for one hour at 180° C., leading to the uniform polyamide film with 1,000 Å in thickness with any polyamide solution tested. Wavelength with 240 nm–280 nm or 300 nm–330 nm of polarized ultraviolet rays from an ultra high-pressure mercury-vapor lamp with 700 W output was time-irradiated over these polyamide polymer films obtained through the band-pass filter (Christiansen filter) and polarizing plate. Liquid crystal cells were prepared with a pair of substrates after they were irradiated with polarized ultraviolet rays under the exactly same condition and with their polyamide film sides facing each other in such a way that the direction of irradiated polarized ultraviolet rays became parallel to each other, and pasted together interposed by 6 μm polymer fine particles. These cells were kept on the hot plate that was maintained beyond the critical anisotropic temperature for liquid crystals and liquid crystals (ZL1-2293 produced by Merck and Co.) were injected. Liquid crystals thus prepared were rotated under the Crossed Nicol of polarizing microscope after they were cooled to room temperature and uniform alignment of the products were confirmed with the observation of clear brightness and darkness without absolutely any shortcomings for any polyamide polymer films tested. The mixing ratio of NMP and BC in each polyamide solution, total solid contents and the number of spincoat rotation for PA-1 to PA-50 are shown in Table 3, and the duration of irradiation with polarized ultraviolet rays when liquid crystal cells were prepared with each polyamide polymer films are shown in Table 4.

In addition, the liquid crystal cells of polyamide PA-1 to PA-50 above prepared under each condition were heat-treated for one hour at 120° C. in an oven and then cooled to room temperature. These liquid crystal cells were rotated under the Crossed Nicol of polarizing microscope and the uniform alignment of the products observed before heat-treatment were confirmed to have been maintained with the observation of clear brightness and darkness without absolutely any defects for any cells tested.

TABLE 3

Mixing ratio of NMP and BC, total solid content and rotation of spincoat for polyamide solution.

| Experiment | Polyamide No. | Mixing ratio of NMP and BC | Total solid content (%) | Rotation of spincoat (rpm) |
|---|---|---|---|---|
| 74 | PA-1 | 80:20 | 5.0 | 4,000 |
| 75 | PA-2 | 90:10 | 5.0 | 3,200 |
| 76 | PA-3 | 90:10 | 5.0 | 3,000 |
| 77 | PA-4 | 80:20 | 6.0 | 3,100 |
| 78 | PA-5 | 90:10 | 6.0 | 2,500 |
| 79 | PA-6 | 90:10 | 6.0 | 2,700 |
| 80 | PA-7 | 80:20 | 5.0 | 2,000 |
| 81 | PA-8 | 80:20 | 5.0 | 2,000 |
| 82 | PA-9 | 80:20 | 5.0 | 2,000 |
| 83 | PA-10 | 80:20 | 5.0 | 2,000 |
| 84 | PA-11 | 80:20 | 6.0 | 3,300 |
| 85 | PA-12 | 80:20 | 7.0 | 2,500 |
| 86 | PA-13 | 80:20 | 7.0 | 2,300 |
| 87 | PA-14 | 80:20 | 6.0 | 2,700 |
| 88 | PA-15 | 80:20 | 6.0 | 2,700 |
| 89 | PA-16 | 80:20 | 7.0 | 3,000 |
| 90 | PA-17 | 80:20 | 5.0 | 2,000 |
| 91 | PA-18 | 90:10 | 6.0 | 2,600 |
| 92 | PA-19 | 80:20 | 5.0 | 2,000 |
| 93 | PA-20 | 80:20 | 6.0 | 2,600 |
| 94 | PA-21 | 80:20 | 6.0 | 3,200 |
| 95 | PA-22 | 80:20 | 5.0 | 2,900 |
| 96 | PA-23 | 80:20 | 5.0 | 3,300 |
| 97 | PA-24 | 80:20 | 5.0 | 3,400 |
| 98 | PA-25 | 80:20 | 5.0 | 3,000 |
| 99 | PA-26 | 80:20 | 5.0 | 4,300 |
| 100 | PA-27 | 80:20 | 5.0 | 2,600 |
| 101 | PA-28 | 80:20 | 5.0 | 3,200 |
| 102 | PA-29 | 80:20 | 5.0 | 3,900 |
| 103 | PA-30 | 80:20 | 5.0 | 2,800 |
| 104 | PA-31 | 80:20 | 5.0 | 2,700 |
| 105 | PA-32 | 90:10 | 6.0 | 3,000 |
| 106 | PA-33 | 80:20 | 6.0 | 3,000 |
| 107 | PA-34 | 80:20 | 5.0 | 3,300 |
| 108 | PA-35 | 90:10 | 5.0 | 2,300 |
| 109 | PA-36 | 80:20 | 5.0 | 3,500 |
| 110 | PA-37 | 80:20 | 6.0 | 2,000 |
| 111 | PA-38 | 80:20 | 5.0 | 3,000 |
| 112 | PA-39 | 80:20 | 5.0 | 2,600 |
| 113 | PA-40 | 80:20 | 6.0 | 3,700 |
| 114 | PA-41 | 80:20 | 6.0 | 2,000 |
| 115 | PA-42 | 80:20 | 5.0 | 3,200 |
| 116 | PA-43 | 80:20 | 5.0 | 3,300 |
| 117 | PA-44 | 80:20 | 5.0 | 3,500 |

TABLE 3-continued

Mixing ratio of NMP and BC, total solid content and rotation of spincoat for polyamide solution.

| Experiment | Polyamide No. | Mixing ratio of NMP and BC | Total solid content (%) | Rotation of spincoat (rpm) |
|---|---|---|---|---|
| 118 | PA-45 | 80:20 | 5.0 | 3,500 |
| 119 | PA-46 | 80:20 | 5.0 | 3,000 |
| 120 | PA-47 | 80:20 | 5.0 | 3,200 |
| 121 | PA-48 | 70:30 | 6.0 | 2,800 |
| 122 | PA-49 | 70:30 | 6.0 | 3,300 |
| 123 | PA-50 | 70:30 | 6.0 | 2,700 |

TABLE 4

Irradiation duration of polarized ultraviolet rays for the preparation of liquid crystal cells with each polyamide polymer film.

| | | Irradiation duration of polarized ultraviolet rays (sec.) | |
|---|---|---|---|
| Experiment | Polyamide No. | Wavelength (240–280 nm) | Wavelength (300–330 nm) |
| 74 | PA-1 | 720 | 27 |
| 75 | PA-2 | 720 | 27 |
| 76 | PA-3 | 720 | 27 |
| 77 | PA-4 | 720 | 27 |
| 78 | PA-5 | 3600 | 90 |
| 79 | PA-6 | 720 | 27 |
| 80 | PA-7 | 3600 | 90 |
| 81 | PA-8 | — | 450 |
| 82 | PA-9 | 720 | 450 |
| 83 | PA-10 | 540 | 45 |
| 84 | PA-11 | 360 | 45 |
| 85 | PA-12 | — | 90 |
| 86 | PA-13 | — | 450 |
| 87 | PA-14 | — | 45 |
| 88 | PA-15 | 720 | 45 |
| 89 | PA-16 | 720 | 450 |
| 90 | PA-17 | 720 | 90 |
| 91 | PA-18 | 3,600 | 45 |
| 92 | PA-19 | 180 | 450 |
| 93 | PA-20 | 720 | 90 |
| 94 | PA-21 | 720 | 450 |
| 95 | PA-22 | 180 | 45 |
| 96 | PA-23 | 180 | 14 |
| 97 | PA-24 | 360 | 45 |
| 98 | PA-25 | 360 | 90 |
| 99 | PA-26 | 720 | 23 |
| 100 | PA-27 | 54 | — |
| 101 | PA-28 | 72 | — |
| 102 | PA-29 | 54 | — |
| 103 | PA-30 | 54 | — |
| 104 | PA-31 | 720 | 18 |
| 105 | PA-32 | 720 | 23 |
| 106 | PA-33 | 720 | 18 |
| 107 | PA-34 | 1,440 | 180 |
| 108 | PA-35 | 1,080 | 180 |
| 109 | PA-36 | 720 | 90 |
| 110 | PA-37 | 1,440 | 90 |
| 111 | PA-38 | 720 | 180 |
| 112 | PA-39 | 720 | 135 |
| 113 | PA-40 | 180 | 23 |
| 114 | PA-41 | 1,440 | 90 |
| 115 | PA-42 | 1,080 | 45 |
| 116 | PA-43 | 720 | 45 |
| 117 | PA-44 | 1,060 | 45 |
| 118 | PA-45 | 1,080 | 45 |
| 119 | PA-46 | 144 | — |
| 120 | PA-47 | 3,600 | — |
| 121 | PA-48 | — | 90 |
| 122 | PA-49 | — | 450 |
| 123 | PA-50 | 720 | 450 |

EXAMPLE 124–135

Polyamide acid PAA-1 to PAA-11 obtained in Example 51–Example 61 were dissolved into the mixed solvent with NMP and BC (80:20 ratio by weight) and the solution having desired solid concentration of each polyamide acid were prepared. These solution were applied by a spincoat to a glass substrate with desired number of rotation, dried for 5 minutes at 80° C., converted to polyimide PI-1–PI-11 by the heat treatment for one hour at 250° C., and the uniform polyimide polymer films with 1,000 Å in film thickness were obtained. On the other hand, the uniform polyimide film with 1,000 Å in film thickness was also obtained for PI-12 with the similar method except for heat treatment for one hour at 180° C. Each polyimide polymer films thus obtained were irradiated with 240–280 nm or 300–330 nm of polarized ultraviolet rays for desired time as in Example 74–Example 123 and the liquid crystal cells were prepared. These liquid crystal cells were rotated under the Crossed Nicol of polarizing microscope and uniform alignment of the products were confirmed with the observation of clear brightness and darkness without absolutely any defects for any polyimide polymer films tested. The total solid contents and the number of spincoat rotation for each polyamide acid PAA-1 to PAA-11 or polyimide solution PI-12 are shown in Table 5, and the duration of irradiation with polarized ultraviolet rays when the liquid crystal cells were prepared with each polyamide polymer films are shown in Table 6.

In addition, the liquid crystal cells of polyimide PI-1 to PI-12 above prepared under each condition were heat-treated for one hour at 120° C. in an oven and cooled to room temperature. These liquid crystal cells were rotated under the Crossed Nicol of polarizing microscope and the uniform alignment of the products observed before heat-treatment were confirmed to have been maintained with the observation of clear brightness and darkness without absolutely any defects for any cells tested.

TABLE 5

Total solid content and the number of spincoat rotation for polyamide acid and polyimide.

| Experiment | Polyamide acid and polyimide No. | Total solid content | Number of spincoat rotation |
|---|---|---|---|
| 124 | PAA-1 | 7.0 | 4,500 |
| 125 | PAA-2 | 6.0 | 2,400 |
| 126 | PAA-3 | 5.0 | 4,500 |
| 127 | PAA-4 | 5.0 | 3,100 |
| 128 | PAA-5 | 5.0 | 4,700 |
| 129 | PAA-6 | 7.0 | 3,000 |
| 130 | PAA-7 | 5.0 | 4,900 |
| 131 | PAA-8 | 5.0 | 3,200 |
| 132 | PAA-9 | 5.0 | 4,500 |
| 133 | PAA-10 | 6.0 | 3,800 |
| 134 | PAA-11 | 5.0 | 2,300 |
| 135 | PAA-12 | 6.0 | 2,700 |

TABLE 6

Irradiation duration of polarized ultraviolet rays for the preparation of liquid crystal cells with each polyimide polymer film.

| | | Irradiation duration of polarized ultraviolet rays (sec.) | |
|---|---|---|---|
| Experiment | Polyimide No. | Wavelength (240–289 nm) | Wavelength (300–330 nm) |
| 124 | PI-1 | 720 | 180 |
| 125 | PI-2 | 2,160 | 270 |
| 126 | PI-3 | 360 | 45 |
| 127 | PI-4 | 360 | 90 |
| 128 | PI-5 | 180 | 90 |
| 129 | PI-6 | 360 | 450 |
| 130 | PI-7 | 1,440 | 270 |
| 131 | PI-8 | 720 | 180 |
| 132 | PI-9 | 720 | 90 |
| 133 | PI-10 | 1,440 | 180 |
| 134 | PI-11 | 720 | 450 |
| 135 | PI-12 | 360 | 450 |

EXAMPLES 36–146

Polymer PU-1–PU-11 having similar amide radical of polyurethane and polymer as obtained in Example 63–to Example 73 were dissolved into the mixed solvent with NMP and BC (80:20 ratio by weight) and the solution having desired concentration of each component were prepared. These solution were the spincoat to a glass substrate with desired number of rotation, dried for 5 minutes at 80° C., and heat treated for one hour at 180° C., and the uniform polymer films with 1,000 Å in film thickness were obtained. Each polymer film thus obtained was irradiated with 240–280 nm of polarized ultraviolet rays for desired time as in Example 74–Example 135 and the liquid crystal cells were prepared. These liquid crystal cells were rotated under the Crossed Nicol of the polarizing microscope and the uniform alignment of the products were confirmed with the observation of clear brightness and darkness without absolutely any shortcomings for any polymer films tested. The total solid contents and the number of spincoat rotation for polymer PU-1 to PU-11 are shown in Table 7, and the duration of irradiation with polarized ultraviolet rays when liquid crystal cells were prepared with each polymer films are shown in Table 8.

Thereafter, the liquid crystal cells of polymer PU-1 to PU-11 above prepared under each condition were heat-treated for one hour at 120° C. in an oven and cooled to room temperature. These liquid crystal cells were rotated under the Crossed Nicol of polarizing microscope and the uniform alignment of the products observed before heat-treatment were confirmed to have been maintained with the observation of clear brightness and darkness without absolutely any defects for any cells tested.

TABLE 7

Total solid content and the number of spincoat rotation for polymer solution having radical similar to amide.

| Experiment | Polymer No. having radical similar to amide | Total solid content | Number of spincoat rotation |
|---|---|---|---|
| 136 | PU-1 | 6.0 | 2,700 |
| 137 | PU-2 | 6.0 | 2,200 |
| 138 | PU-3 | 5.0 | 3,200 |
| 139 | PU-4 | 6.0 | 2,800 |
| 140 | PU-5 | 7.0 | 3,300 |
| 141 | PU-6 | 7.0 | 2,000 |
| 142 | PU-7 | 7.0 | 2,000 |
| 143 | PU-8 | 6.0 | 2,300 |
| 144 | PU-9 | 6.0 | 2,000 |
| 145 | PU-10 | 6.0 | 2,000 |
| 146 | PU-11 | 7.0 | 2,800 |

TABLE 8

Irradiation duration of polarized ultraviolet rays for the preparation of liquid crystal cells with each polymer having radical similar to amide film.

| Experiment | Polymer No. having radical similar to amide | Irradiation duration of polarized ultraviolet rays (sec.) Wavelength (240–289 nm) |
|---|---|---|
| 136 | PU-1 | 180 |
| 137 | PU-2 | 3,600 |
| 138 | PU-3 | 72 |
| 139 | PU-4 | 144 |
| 140 | PU-5 | 360 |
| 141 | PU-6 | 720 |
| 142 | PU-7 | 360 |
| 143 | PU-8 | 3,600 |
| 144 | PU-9 | 180 |
| 145 | PU-10 | 1,440 |
| 146 | PU-11 | 1,440 |

COMPARATIVE EXAMPLE 1

6·6 nylon (molecular weight ca. 20,000, glass transition temperature 45° C.) was dissolved in m-cresol to prepare the solution with a total solid concentration of 4%. The solution was applied on the glass substrate by spincoating at 5,000 rpm, followed by drying for 5 minutes at 120° C. and heat treating for one hour at 180° C., the polyamide polymer film with 1,000 Å in thickness were prepared. Polarized ultraviolet rays of wavelength 240 nm–280 nm for one hour or 300 nm–330 nm for 15 minutes were irradiated to this 6·6 nylon film just like in Examples and the liquid crystal cells were prepared. These cells were rotated under the Crossed Nicol of polarizing microscope and they did not show any brightness and darkness as well as no alignment of liquid crystal.

COMPARATIVE EXAMPLE 2

1.83 g (10.0 mmol) of adipic acid chloride and 1.08 g (10.0 mmol) of m-phenylenediamine were dissolved in 20.29 ml of NMP, and 1.94 ml of Py was added to this solution and stirred for three hours from −78° C. to room temperature. After diluting the obtained solution with 15 ml of NMP, the solution was poured into methanol and polymer precipitated were filtered and dried. The procedures above were repeated and purified to yield 2.18 g of polyamide. Number-average molecular weight and weight-average molecular weight of the polyamide obtained through the gel permeation chromatography were $1.09 \times 10^4$ and $2.62 \times 10^4$, respectively.

The polyamide was made into the solution with the total solid concentration of 5% by dissolving in the mixed solvent with NMP and BC (9:1 ratio by weight). The solution was applied on the glass substrate by spincoating at 3,000 rpm, followed by drying for 5 minutes at 80° C. and heat treating for one hour at 180° C., the polyamide polymer film with 1,000 Å in thickness was prepared. Polarized ultraviolet rays of wavelength 240 nm–280 nm for one hour or 300 nm–330 nm for 15 minutes were irradiated to this polyamide film just like in Examples and the liquid crystal cells were prepared. These cells were rotated under the Crossed Nicol of polarizing microscope and they did not show any brightness and darkness as well as no alignment of liquid crystal.

COMPARATIVE EXAMPLE 3

Under flowing nitrogen gas, 2.03 g (10.0 mmol) of isophthalic acid chloride and 0.88 g (10.0 mmol) of 1,4-diaminobutane were dissolved in 20.29 ml of NMP, and 1.94 ml of Py was added to this solution and stirred for three hours from −78° C. to room temperature. After diluting the obtained solution with 15 ml of NMP, the solution was poured into methanol and polymer precipitated were filtered and dried. The procedures above were repeated and purified to yield 2.07 g of polyamide. Number-average molecular weight and weight-average molecular weight of the polyamide obtained through the gel permeation chromatography were $6.53 \times 10^3$ and $1.30 \times 10^5$, respectively.

This polyamide was made into the solution with the total solid concentration of 4% by dissolving in m-cresol. The solution was applied on the glass substrate by spincoating at 5,000 rpm, followed by drying for 5 minutes at 120° C. and heat treated for one hour at 180° C., the polyamide polymer film with 1,000 Å in thickness was prepared. Polarized ultraviolet rays of wavelength 240 nm–280 nm for one hour or 300 nm–330 nm for 15 minutes were irradiated to this polyamide film just like in Examples and the liquid crystal cells were prepared. These cells were rotated under the Crossed Nicol of polarizing microscope and they did not show any brightness and darkness as well as no alignment of liquid crystal.

COMPARATIVE EXAMPLE 4

Under flowing nitrogen gas, 2.14 g (9.8 mmol) of pyromellitic dianhydride and 2.00 g (10.0 mmol) of 4,4'-diaminodiphenylether were dissolved in 27.60 ml of NMP and reacted for two hours at room temperature to prepare polyimide precursor solution. Polymerization reaction went without difficulty and with uniformity. Number-average molecular weight and weight-average molecular weight of the polyimide precursor obtained through the gel permeation chromatography were $3.45 \times 10^4$ and $5.73 \times 10^4$, respectively.

The polyimide precursor was made into the solution with the total solid concentration of 4% by dissolving in the mixed solvent with NMP and BC (4:1 ratio by weight). The solution was applied on the glass substrate by spincoating at 4,000 rpm, followed by drying for 5 minutes at 80° C. and heat treated for one hour at 250° C., the polyimide polymer film with 1,000 Å in thickness was prepared. Polarized ultraviolet rays of wavelength 240 nm–280 nm for one hour or 300 nm–330 nm for 15 minutes were irradiated to this polyimide film just like in Examples and the liquid crystal cells were prepared. These cells were rotated under the Crossed Nicol of polarizing microscope and they did have many defects with some degree of brightness and darkness, and liquid crystal-alignment was not uniform.

COMPARATIVE EXAMPLE 5

Polyvinyl cinnamate (molecular weight of ca. 20,000) was made into the solution with the total solid concentration of 2 weight % by dissolving in the mixed solvent with monochlorobenzene and dichloromethane. The solution was applied on the glass substrate by spincoating at 2,000 rpm, followed by drying for 5 minutes at 80° C. and heat treated for one hour at 100° C., the coat film with 1,000 Å in thickness was prepared. Polarized ultraviolet rays of wavelength 300 nm–330 nm for 60 seconds were irradiated to this polyvinyl cinnamate film just like in Examples and the liquid crystal cells were prepared. These liquid crystal cells were rotated under the Crossed Nicol of polarizing microscope and the uniform alignment of the products were confirmed with the observation of clear brightness and darkness without absolutely any defect, but these liquid crystal cells after having heat-treated for one hour at 120° C. in an oven and cooled to room temperature showed many defects when observed under the Crossed Nicol of polarizing microscope and the alignment observed before heat-treatment have been confirmed to have lost and the alignment was not in order any longer.

COMPARATIVE EXAMPLE 6

Under flowing nitrogen gas, 1.92 g (9.8 mmol) of CBDA and 4.10 g (10.0 mmol) of 2,2-bis [4-(4-aminophenoxy) phenyl] propane were dissolved in 40.13 ml of NMP and reacted for three hours at room temperature to prepare polyimide precursor solution. Polymerization reaction went without difficulty and with uniformity. Number-average molecular weight and weight-average molecular weight of the polyimide precursor obtained through the gel permeation chromatography were $2.74 \times 10^4$ and $4.19 \times 10^4$, respectively.

The polyimide precursor was made into the solution with the total solid concentration of 4% by dissolving in the mixed solvent with NMP and BC (4:1 ratio by weight). The solution was applied on the glass substrate by spincoating at 4,300 rpm, followed by drying for 5 minutes at 80° C. and heat treated for one hour at 250° C., the polyimide polymer film with 1,000 Å in thickness was prepared. Polarized ultraviolet rays of wavelength 240 nm–280 nm for 12 minutes were irradiated to this polyimide film just like in Examples and the liquid crystal cells were prepared. These liquid crystal cells were rotated under the Crossed Nicol prism of polarizing microscope and the uniform alignment of the products were confirmed with the observation of clear brightness and darkness without absolutely any shortcomings, but these liquid crystal cells after having heat-treated for one hour at 120° C. in an oven and cooled to room temperature showed various defects when observed under the Crossed Nicol of polarizing microscope and the alignment observed before heat-treatment have been confirmed to have lost and the alignment was not in order any longer.

COMPARATIVE EXAMPLE 7

Under flowing nitrogen gas, 1.92 g (9.8 mmol) of CBDA and 2.40 g (10.0 mmol) of diamine compound (III) shown in Example 34 above were dissolved in 23.86 ml of NMP and reacted for 6 hours at room temperature to prepare polyimide precursor solution. Polymerization reaction went without difficulty and with uniformity. Number-average molecular weight and weight-average molecular weight of the polyimide precursor obtained through the gel permeation chromatography were $6.64 \times 10^4$ and $1.08 \times 10^5$, respectively.

The polyimide precursor was made into the solution with the total solid concentration of 4% by dissolving in the mixed solvent with NMP and BC (4:1 ratio by weight). The solution was applied on the glass substrate by spincoating at 4,300 rpm, followed by drying for 5 minutes at 80° C. and heat treated for one hour at 250° C., the polyimide polymer film with 1,000 Å in thickness was prepared. Polarized ultraviolet rays of wavelength 240 nm–280 nm for one hour or 300 nm–33 nm for 15 minutes were irradiated to this polyimide film just like in Examples and the liquid crystal cells were prepared. These liquid crystal cells were rotated under the Crossed Nicol of polarizing microscope and some degree of brightness and darkness were observed with various defects and the alignment was not in order at all.

COMPARATIVE EXAMPLE 8

Under flowing nitrogen gas, 1.92 g (9.8 mmol) of CBDA and 3.60 g (10.0 mmol) of diamine compound (IV) shown in Example 38 were dissolved in 24.96 ml of NMP and reacted for 6 hours at room temperature to prepare polyimide precursor solution. Polymerization reaction went without difficulty and with uniformity. Number-average molecular weight and weight-average molecular weight of the polyimide precursor obtained through the gel permeation chromatography were $6.73 \times 10^3$ and $1.17 \times 10^4$, respectively.

The polyimide precursor was made into the solution with the total solid concentration of 6% by dissolving in the mixed solvent with NMP and BC (4:1 ratio by weight). The solution was applied on the glass substrate by spincoating at 2,400 rpm, followed by drying for 5 minutes at 80° C. and heat treated for one hour at 250° C., the polyimide polymer film with 1,000 Å in thickness was prepared. Polarized ultraviolet rays of wavelength 240 nm–280 nm for one hour or 300 nm–33 nm for 15 minutes were irradiated to this polyimide film just like in Examples and the liquid crystal cells were prepared. These liquid crystal cells were rotated under the Crossed Nicol of polarizing microscope and some degree of brightness and darkness were observed with many defects and the alignment was not in order at all.

Industrial Applicability

Thin polymer film formed with a liquid crystal-alignment agent in the present invention on the substrate can achieve uniform and stable alignment of liquid crystal molecules by the light or electron rays without rubbing action required in the past. In addition, the alignment thereof achieved high heat stability and high light resistance. Therefore, the practical industrial productivity of liquid crystal elements can be improved with the particular use of the liquid crystal-aligning agent in the present invention.

What is claimed is:

1. A liquid crystal alignment agent used in a method for alignment of liquid crystal molecules that form a liquid crystal alignment film comprising irradiating a thin alignment film formed on a substrate with polarized light or electron rays and aligning the liquid crystal molecules on the substrate without any rubbing treatment, said liquid crystal alignment agent comprising a polymer compound selected from the group consisting of polyurethane and a polyurea comprising a structure selected from the group consisting of the general formulae (1)–(7) below

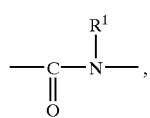  (1)

-continued

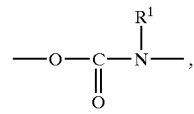  (2)

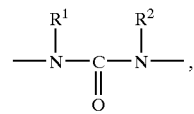  (3)

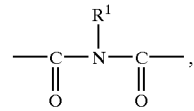  (4)

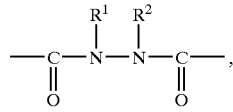  (5)

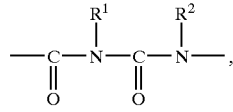  (6)

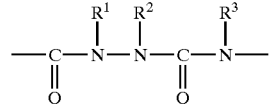  (7)

wherein, $R^1$, $R^2$ and $R^3$ are independently of each other hydrogen, alkyl, substituted alkyl, aryl or propargyl;

the polymer compound main chain has a number-average molecular weight of 1,000–300,000; and said structure makes a direct bond with either a divalent or trivalent aromatic group at both ends or with a divalent or trivalent aromatic group at one end and a divalent or trivalent alicyclic hydrocarbon group at the other end.

2. The liquid crystal alignment agent according to claim 1, wherein the main chain or a side chain of the polymer have no functional groups shown in the general formula (8)–(17) below

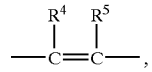  (8)

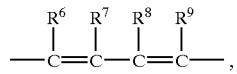  (9)

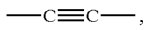  (10)

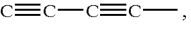  (11)

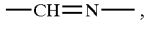  (12)

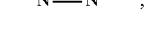  (13)

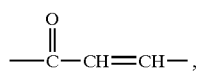  (14)

(15)
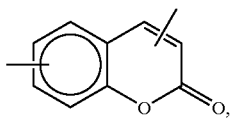

(16)
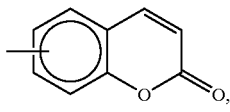

(17)
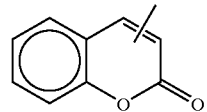

wherein $R^4$, $R^5$, $R^6$, $R^7$, $R^8$ and $R^9$ are independently of each other hydrogen, halogen, alkyl, substituted alkyl, substituted alkoxy, carboxyl, alkoxycarbonyl or a cyano group as a substituent group that may lead to a dimerization reaction or an isomerization reaction by the irradiation with light or electron rays.

3. A liquid crystal alignment agent according to claim 1, wherein said polymer compound is polyurethane having a repeating unit comprising of the general formula (57) below

(57)
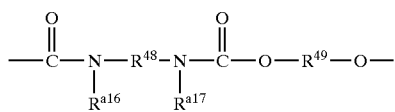

wherein, $R^{48}$ and $R^{49}$ are independently of each other selected from the radicals shown in the formula (58)–(69) below

(58)
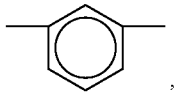

(59)
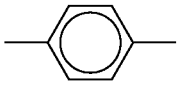

(60)
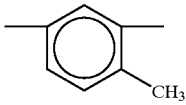

(61)
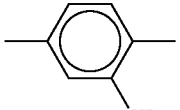

(62)
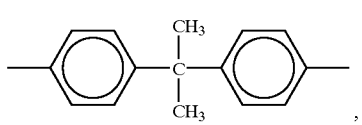

(63)
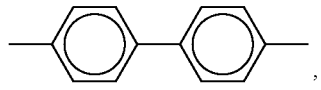

(64)
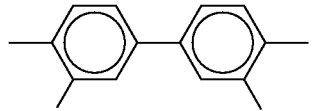

(65)
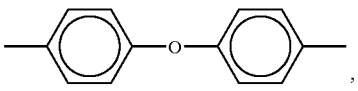

(66)
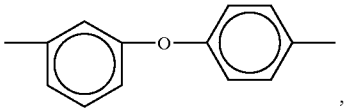

(67)
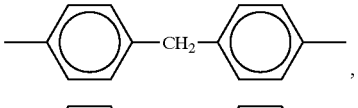

(68)
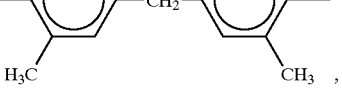

(69)
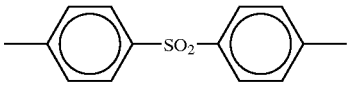

wherein, $R^{a16}$ and $R^{a17}$ are independently of each other hydrogen, alkyl, substituted alkyl, aryl or propargyl.

4. A liquid crystal alignment agent according to claim 1, wherein said polymer compound is polyurea having a repeating unit of the general formula (70) below

(70)
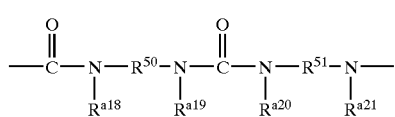

wherein, $R^{50}$ and $R^{51}$ are independently of each other selected from formula (58)–(69) above; and $R^{a18}$–$R^{a21}$ are independently of each other hydrogen alkyl, substituted alkyl, aryl or propargyl.

5. A liquid crystal device using the liquid crystal alignment agent according to claim 1.

6. A liquid crystal alignment method characterized by the use of the liquid crystal alignment agent according to claim 1, wherein polarized light or electron rays are irradiated over a thin polymer film formed on a surface of a substrate, achieving liquid crystal alignment without rubbing action.

7. A liquid crystal alignment agent used in a method for alignment of liquid crystal molecules that form a liquid crystal alignment film comprising irradiating a thin alignment film formed on a substrate with polarized light or electron rays and aligning the liquid crystal molecules on the substrate without any rubbing treatment, said liquid crystal alignment agent comprising a polymer compound fulfilling all of the following conditions (A), (B), and (C):

(A) the polymer compound has in the main chain thereof a structure selected from the group consisting of general formulae (1)–(7), the structure makes a direct bond with either a divalent or trivalent aromatic group at both ends or with a divalent or trivalent aromatic group at one end and a divalent or trivalent alicyclic hydrocarbon group at the other end:

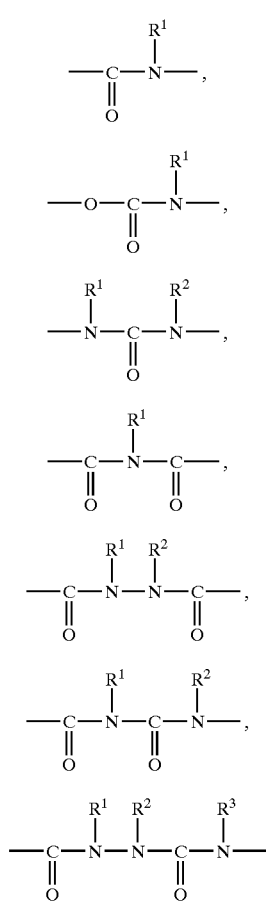

wherein, $R^1$, $R^2$ and $R^3$ are independently of each other hydrogen, alkyl, substituted alkyl, aryl or propargyl;

(B) the polymer compound is a polyamide having a repeating unit comprising of a general formula (18) or of a general formulae (19l) and (19b):

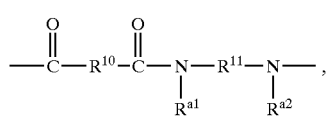

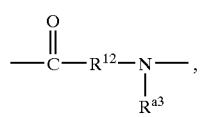

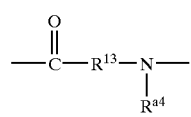

wherein, $R^{10}$, $R^{21}$, $R^{12}$ and $R^{13}$ are divalent organic radicals in the general formula (20)–(23)

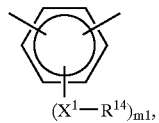

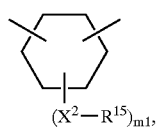

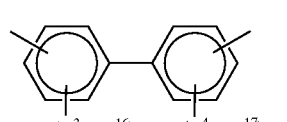

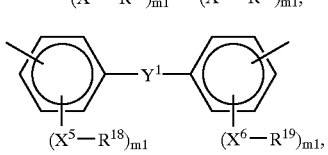

wherein, $X^1$, $X^2$, $X^3$, $X^4$, $X^5$ and $X^6$ are independently of each other single bond, O, $CO_2$, OCO, $CH_2O$, NHCO or CONH;

$R^{14}$, $R^{15}$, $R^{16}$, $R^{17}$, $R^{18}$ and $R^{19}$ are independently of each other hydrogen, halogen, $C_1$–$C_{24}$ alkyl, $C_1$–$C_{24}$ alkyl containing fluorine, aryl, propargyl, phenyl or substituted phenyl;

$Y^1$ is O, S, CO, $CO_2$, $SO_2$, $CH_2$, NH, NHCO, $Y^2$—$Ar^1$—$Y^3$, $Y^4$—$(CH_2)n^1$—$Y^5$ or $Y^6$—$Ar^2$—$R^{20}$—$Ar^3$—$Y^7$;

$Y^2$, $Y^3$, $Y^4$, $Y^5$, $Y^6$ and $Y^7$ are independently of each other O, S, CO, $CO_2$, $SO_2$, $CH_2$, NH or NHCO;

$n^1$ is an integer of 1–10;

$R^{20}$ is $C_1$–$C_5$ straight or branched lower alkylene, fluoroalkylene or alkylenedioxy; and $Ar^1$, $Ar^2$ and $Ar^3$ are independently of each other divalent organic radical in general formula (24), (25) or (26) below

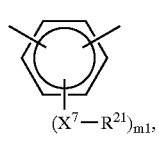

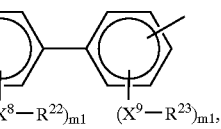

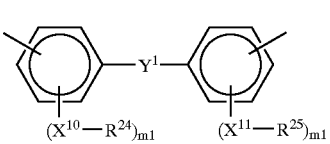

wherein, $X^7$, $X^8$, $X^9$, $X^{10}$ and $X^{11}$ are independently of each other single bond, O, $CO_2$, OCO, $CH_2O$, NHCO or CONH;

$R^{21}$, $R^{22}$, $R^{23}$, $R^{24}$ and $R^{25}$ are independently of each other hydrogen, halogen, $C_1$–$C_{24}$ alkyl, $C_1$–$C_{24}$ alkyl containing fluorine, aryl, propargyl, phenyl or substituted phenyl;

$m^1$ is an integer of 1–4, and $m^2$ is an integer of 1–3;

with the proviso that when $R^{14}$, $R^{15}$, $R^{16}$, $R^{17}$, $R^{18}$, $R^{19}$, $R^{21}$, $R^{22}$, $R^{23}$, $R^{24}$ and $R^{25}$ are either hydrogen or halogen, then $X^1$, $X^2$, $X^3$, $X^4$, $X^5$, $X^6$, $X^7$, $X^8$, $X^9$, $X^{10}$ and $X^{11}$ are single bond; and $R^{a1}$, $R^{a2}$, $R^{a3}$ and $R^{a4}$ are independently of each other hydrogen, alkyl, substituted alkyl, aryl or propargyl; and (C) the polymer compound has a number-average molecular weight of 1,000–300,000.

8. The liquid crystal alignment agent according to claim 7, wherein $R^{10}$ or $R^{11}$ in the general formula (18) or $R^{12}$ and $R^{13}$ in the general formula (19a) and (19b) are independently of each other a radical selected from formulae (27)–(41) below

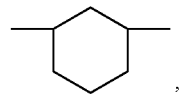
(27)

(28)

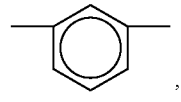
(29)

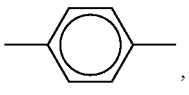
(30)

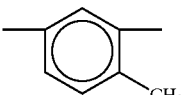
(31)

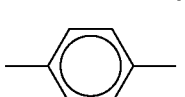
(32)

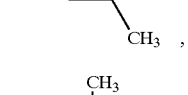
(33)

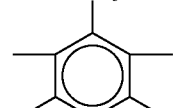
(34)

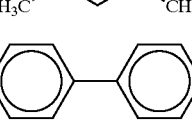
(35)

-continued

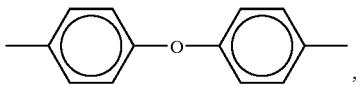
(36)

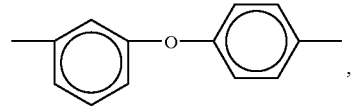
(37)

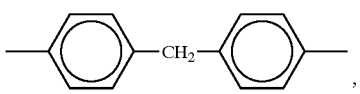
(38)

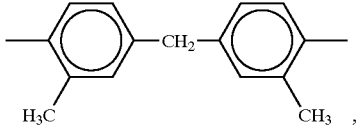
(39)

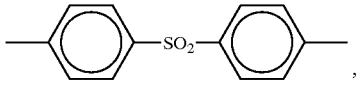
(40)

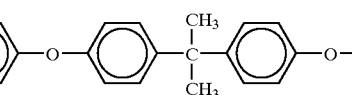
(41)

9. The liquid crystal alignment agent according to claim 7, wherein the main chain or a side chain of the polymer have no functional group of general formulae (8)–(17) below

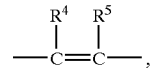
(8)

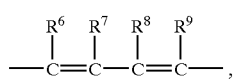
(9)

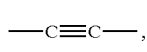
(10)

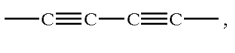
(11)

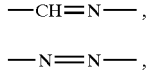
(12)

(13)

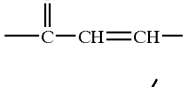
(14)

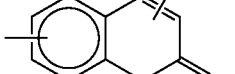
(15)

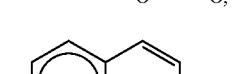
(16)

-continued (17)

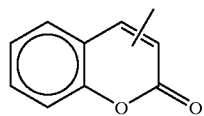

wherein $R^4$, $R^5$, $R^6$, $R^7$, $R^8$ and $R^9$ are independently of each other hydrogen, halogen, alkyl, substituted alkyl, substituted alkoxy, carboxyl, alkoxycarbonyl or a cyano group as a substituent group that may lead to a dimerization reaction or an isomerization reaction by the irradiation with light or electron rays.

10. A liquid crystal device using the liquid crystal alignment agent according to claim 7.

11. A liquid crystal alignment method charaterized by the use of the liquid crystal alignment according to claim 7, wherein polarized light or electron rays are irradiated over a thin polymer film formed on a surface of a substrate, achieving liquid crystal alignment without rubbing action.

12. A liquid crystal alignment method characterized by the use of the liquid crystal alignment agent according to claim 7, wherein light or electron rays are irradiated over a thin polymer film formed on a surface of a substrate, achieving liquid crystal alignment without rubbing action.

13. A liquid crystal alignment agent used in a method for alignment of liquid crystal molecules that form a liquid crystal alignment film comprising irradiating a thin alignment film formed on a substrate with polarized light or electron rays and aligning the liquid crystal molecules on the substrate without any rubbing treatment, said liquid crystal alignment agent comprising a polymer compound fulfilling all of the following conditions (A), (B), and (C):

(A) the polymer compound has in the main chain thereof a structure selected from the group consisting of general formulae (1)–(7), the structure makes a direct bond with either a divalent or trivalent aromatic group at both ends or with a divalent or trivalent aromatic group at one end and a divalent or trivalent alicyclic hydrocarbon group at the other end:

(1)

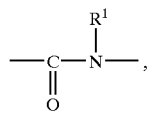

(2)

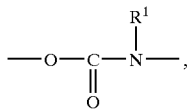

(3)

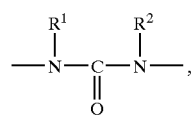

(4)

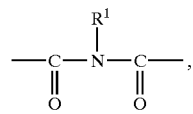

(5)

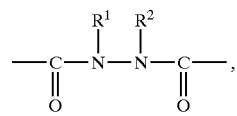

(6)

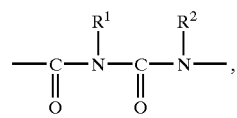

(7)

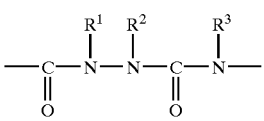

wherein, $R^1$, $R^2$ and $R^3$ are independently of each other hydrogen, alkyl, substituted alkyl, aryl or propargyl;

(B) the polymer compound is a polyimide precursor or a polyimide obtained by chemical heat or imidization of the polyimide precursor, with a repeating unit comprising of a general formula (42a) or (42b):

(42a)

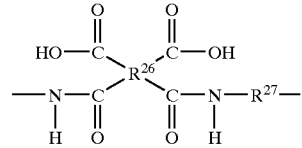

(42b)

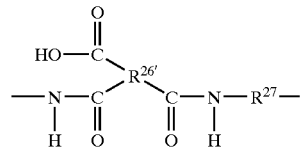

wherein, $R^{26}$ is a tetravalent organic radical;

$R^{26'}$ is a trivalent organic radical; and $R^{27}$ is a divalent organic radical containing an amide radical bonded with a divalent or trivalent aromatic or alicyclic hydrocarbon group, wherein $R^{27}$ in the general formula (42a) and (42b) above is selected from the general formula (43)–(48) below (43)

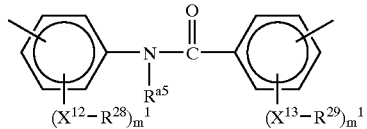

(44)

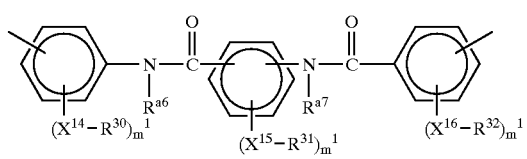

(45)
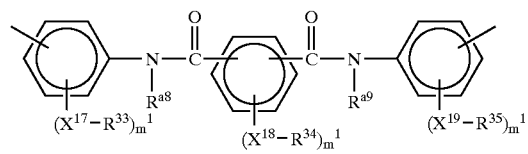

(46)
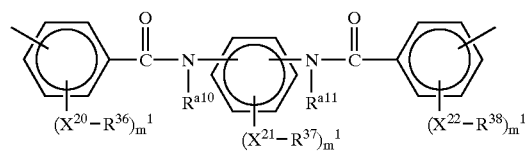

(47)
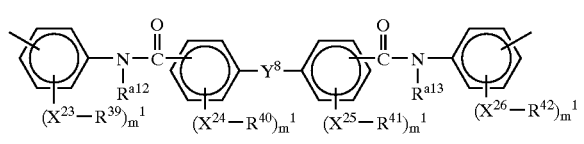

(48)
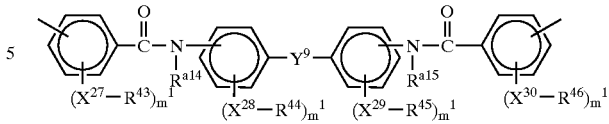

wherein,
$X^{12}$–$X^{30}$ are independently of each other single bond, O, $CO_2$, OCO or $CH_2O$;
$R^{28}$–$R^{46}$ are independently of each other hydrogen, halogen, $C_1$–$C_{24}$ alkyl, $C_1$–$C_{24}$ alkyl containing fluorine, aryl, propargyl, phenyl or substituted phenyl;
$R^{a5}$–$R^{a15}$ are independently of each other hydrogen, alkyl, substituted alkyl, aryl or propargyl;
$Y^8$ and $Y^9$ are O, S, $SO_2$, $CH_2$, NH, NHCO or CONH; and $m^1$ is an integer of 1–4; with the proviso that when $R^{28}$–$R^{46}$ are hydrogen or halogen, then $X^{12}$–$X^{30}$ are single bond; and (C) the polymer compound has a number-average molecular weight of 1,000–300,000.

14. The liquid crystal alignment agent according to claim 13, wherein the radical for $R^{27}$ in the general formulae (42a) and (42b) above is selected from the formulae (49)–(56) below

(49)
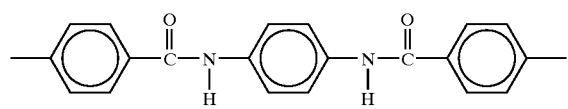

(50)
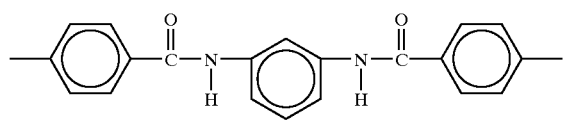

(51)
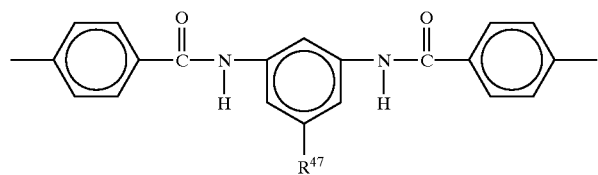

(52)
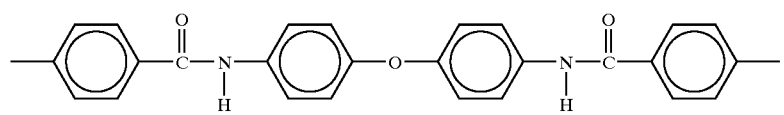

(53)
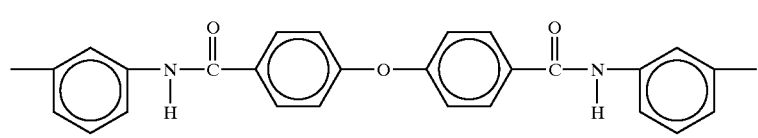

(54)
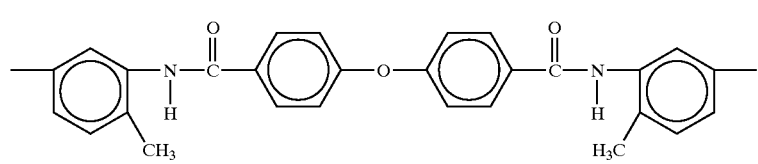

(55)
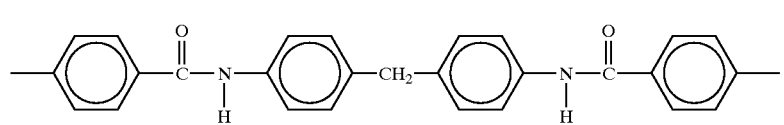

(56)

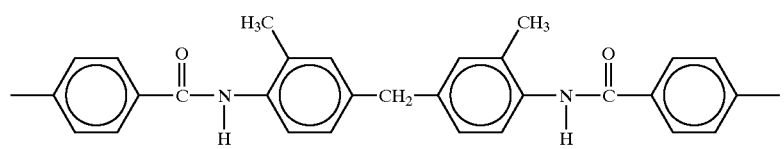

wherein, $R^{47}$ is halogen, $C_1$–$C_{24}$ alkyl, $C_1$–$C_{24}$ alkoxy or $C_1$–$C_{24}$ alkoxycarbonyl.

15. The liquid crystal alignment agent according to claim 13, wherein the main chain or a side chain of the polymer have no functional group of general formulae (8)–(17) below

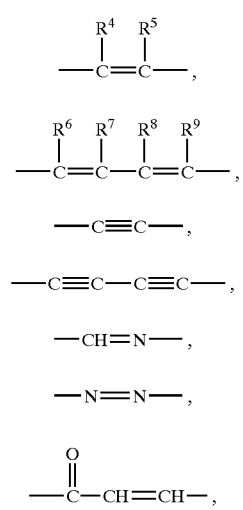

(8)

(9)

(10)

(11)

(12)

(13)

(14)

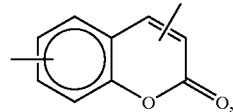

(15)

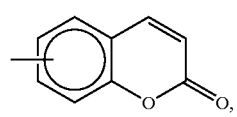

(16)

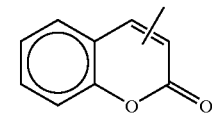

(17)

wherein $R^4$, $R^5$, $R^6$, $R^7$, $R^8$ and $R^9$ are independently of each other hydrogen, halogen, alkyl, substituted alkyl, substituted alkoxy, carboxyl, alkoxycarbonyl or a cyano group as a substituent group that may lead to a dimerization reaction or an isomerization reaction by the irradiation with light or electron rays.

16. A liquid crystal device using the liquid crystal alignment agent according to claim 13.

* * * * *

UNITED STATES PATENT AND TRADEMARK OFFICE
CERTIFICATE OF CORRECTION

PATENT NO. : 6,808,766 B1
DATED : October 26, 2004
INVENTOR(S) : Yukihiro Miyama et al.

It is certified that error appears in the above-identified patent and that said Letters Patent is hereby corrected as shown below:

Column 97,
Line 50, change "(191)" to -- (19a) --;

Column 98,
Line 2, change "$R^{21}$" to -- $R^{11}$ --;
Lines 6-9, formula (20), change "m1" to -- $m^1$ --;
Lines 11-14, formula (21), change "m1" to -- $m^1$ --;
Lines 16-20, formula (22), change "m1" (both occurrences) to -- $m^1$ --;
Lines 21-25, formula (23), change "m1" (both occurrences) to -- $m^1$ --;
Lines 47-51, formula (24), change "m1" to -- $m^1$ --;
Lines 53-57, formula (25), change "m1" (both occurrences) to -- $m^1$ --;
Lines 58-62, formula (26), change "m1" (both occurrences) to -- $m^2$ --;

Lines 58-62, formula (26), replace with 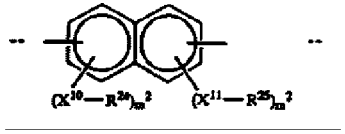

Signed and Sealed this

Twenty-sixth Day of April, 2005

JON W. DUDAS
*Director of the United States Patent and Trademark Office*